United States Patent
Takahashi et al.

(10) Patent No.: US 9,799,044 B2
(45) Date of Patent: Oct. 24, 2017

(54) CONTROL METHOD, AND CONTROL SYSTEM

(71) Applicant: Panasonic Intellectual Property Corporation of America, Torrance, CA (US)

(72) Inventors: Masaki Takahashi, Oaska (JP); Toru Tanigawa, Oaska (JP); Kento Ogawa, Osaka (JP); Katsufumi Inoue, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 452 days.

(21) Appl. No.: 14/564,036

(22) Filed: Dec. 8, 2014

(65) Prior Publication Data
US 2015/0186903 A1  Jul. 2, 2015

(30) Foreign Application Priority Data
Dec. 26, 2013 (JP) .................................. 2013-268776

(51) Int. Cl.
*G06Q 30/02* (2012.01)
*G01S 17/89* (2006.01)
*G01S 17/02* (2006.01)
*G01S 17/36* (2006.01)
*G01S 17/42* (2006.01)
*G01S 7/00* (2006.01)
*G01S 7/481* (2006.01)
*G01S 7/497* (2006.01)
*G01S 7/51* (2006.01)

(52) U.S. Cl.
CPC .......... *G06Q 30/0201* (2013.01); *G01S 7/003* (2013.01); *G01S 7/4817* (2013.01); *G01S 7/497* (2013.01); *G01S 7/51* (2013.01); *G01S 17/026* (2013.01); *G01S 17/36* (2013.01); *G01S 17/42* (2013.01); *G01S 17/89* (2013.01)

(58) Field of Classification Search
CPC .......................... G06Q 30/0267; G06Q 30/02
See application file for complete search history.

(56) References Cited

U.S. PATENT DOCUMENTS

2003/0234347 A1* 12/2003 Akagi ...................... F16P 3/144
                                                                        250/221
2005/0201826 A1* 9/2005 Zhang ................. G06Q 30/0267
                                                                        404/2

FOREIGN PATENT DOCUMENTS

JP          2009-98929       *  5/2009       ............. G06Q 10/00
JP          2009-098929         5/2009

OTHER PUBLICATIONS

JP2009-98929 translation.*

* cited by examiner

Primary Examiner — Luke D Ratcliffe
(74) Attorney, Agent, or Firm — Greenblum & Bernstein, P.L.C.

(57) ABSTRACT

When there are no customers in a store, a laser is scanned along an aisle between product shelving units installed in the store, and if that laser is reflected midway in the optical path, it is determined that there is an object in the sensing range according to the laser. The determination result is then notified to a user by a site that corresponds to the position where the laser has been reflected being marked in a layout image that represents the product shelving units, displayed on a terminal device.

20 Claims, 40 Drawing Sheets

| SHELVING UNIT IDENTIFIER | EXCLUSION DESIGNATION INFORMATION GROUP | | | |
|---|---|---|---|---|
| | EXCLUSION DESIGNATION INFORMATION 1 | EXCLUSION DESIGNATION INFORMATION 2 | · · · | EXCLUSION DESIGNATION INFORMATION k |
| A01 | $(x11, z11)$ TO $(x12, z12)$ | $(x21, z21)$ TO $(x22, z22)$ | · · · | $(xk1, zk1)$ TO $(xk2, zk2)$ |
| A02 | $(x'11, z'11)$ TO $(x'12, z'12)$ | | · · · | |
| ⋮ | ⋮ | | | |

ICON REPRESENTING
NOTIFICATION OF ABNORMALITY

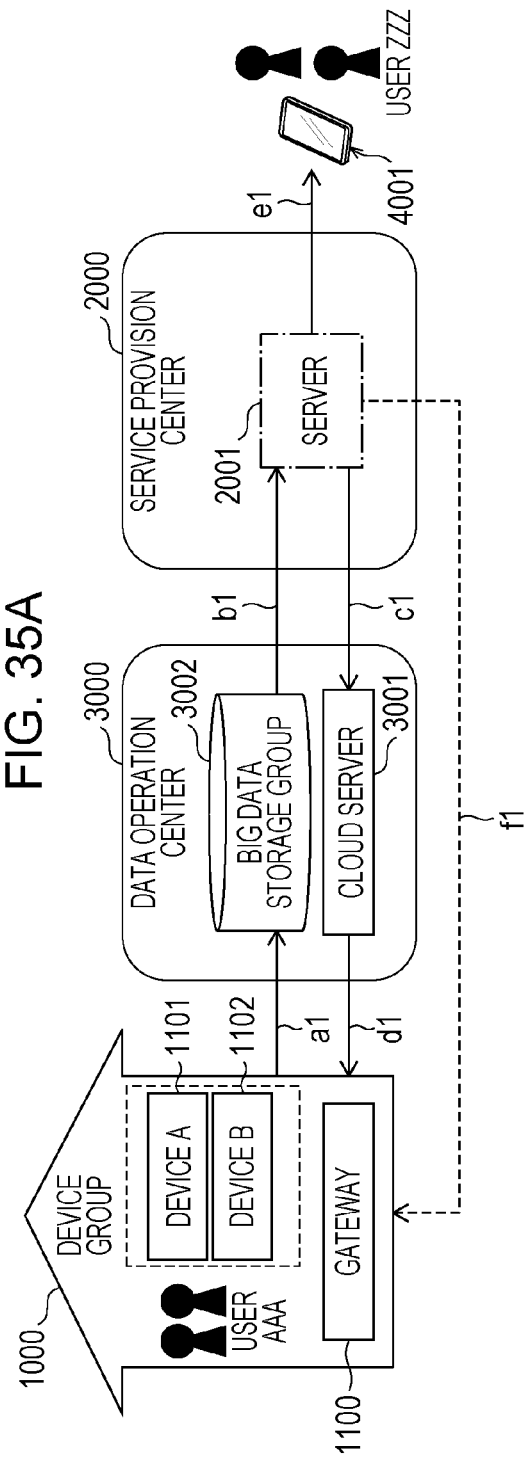
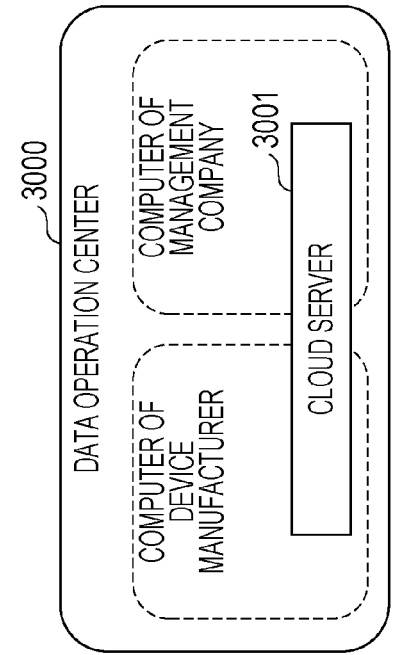
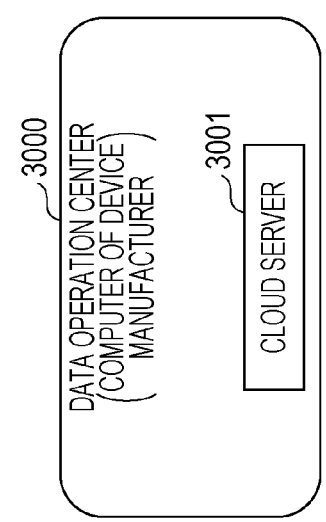
FIG. 35A
FIG. 35C
FIG. 35B

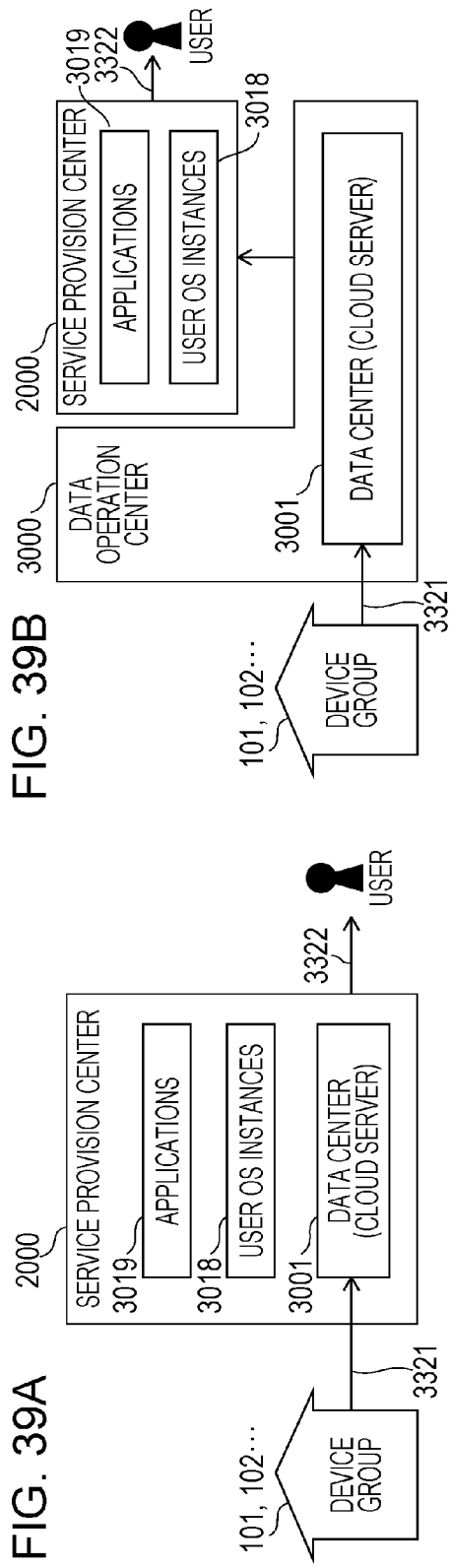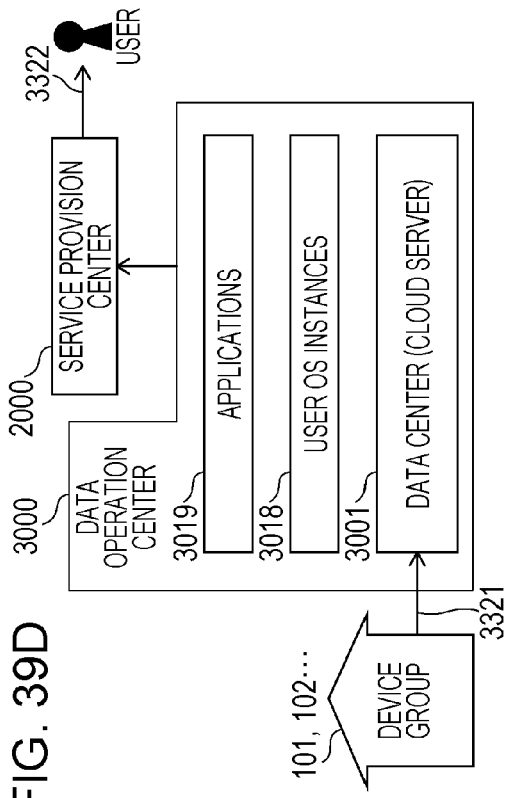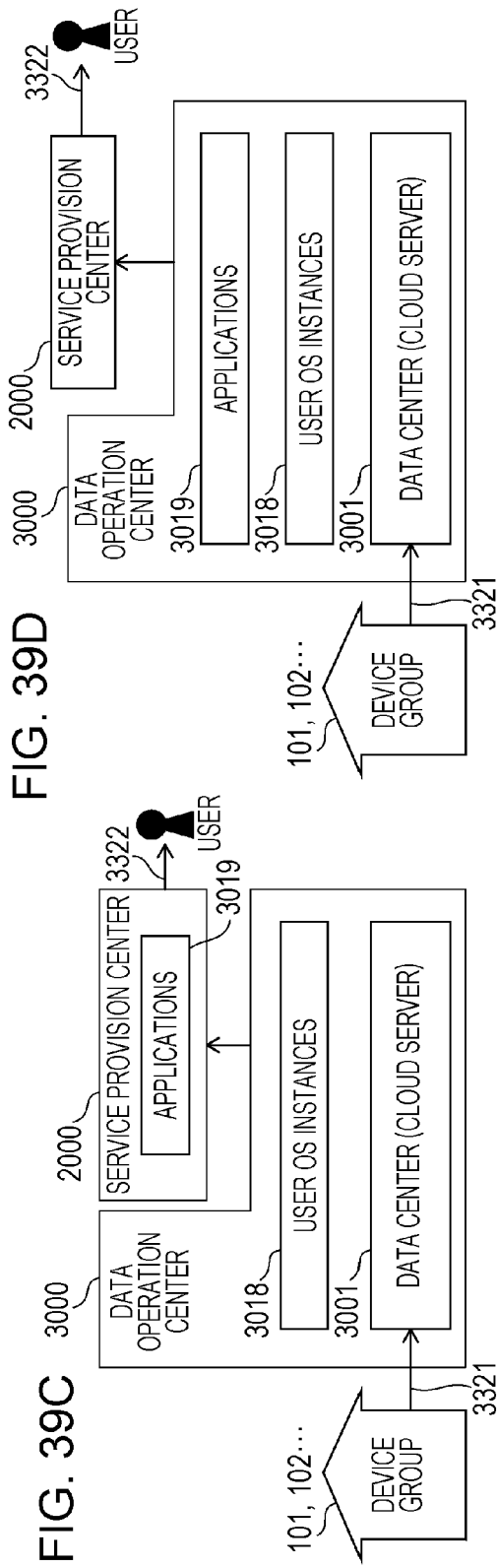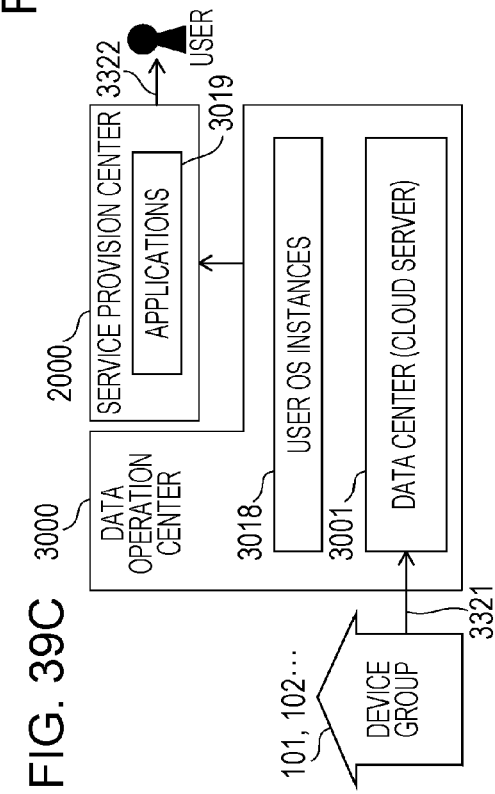

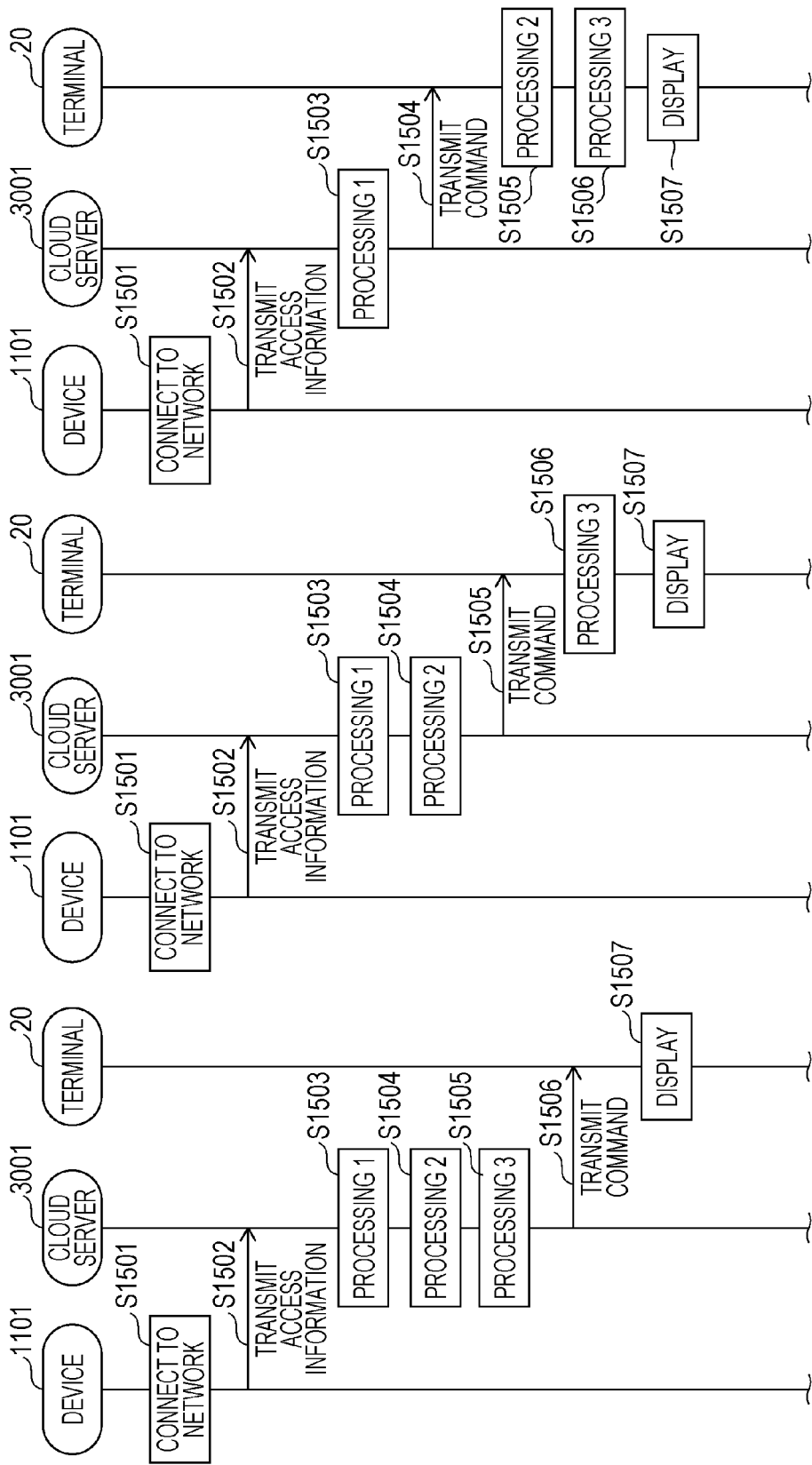

CONTROL METHOD, AND CONTROL SYSTEM

BACKGROUND

1. Technical Field

The present disclosure relates to a control method for a computer system that detects access to a product shelving unit installed in a store, and collects information regarding the behavior of customers.

2. Description of the Related Art

In marketing surveys carried out in stores, there is a demand for information regarding the behavior of customers in the vicinity of product shelving units to be collected and converted into statistics. When information regarding the behavior of customers in the vicinity of a product shelving unit is to be collected, the use of a range measurement sensor is most suitable (for example, Japanese Unexamined Patent Application Publication No. 2009-98929).

SUMMARY

However, further improvement was required in the aforementioned Japanese Unexamined Patent Application Publication No. 2009-98929.

In one general aspect, the techniques disclosed here feature a control method used in a computer system including a sensor that detects the presence of an object in a predetermined sensing range in a store, and a terminal device, the control method including: controlling the sensor to emit a laser, along an aisle between product shelving units installed in the store and to scan the laser reflected from the aisle; determining that there is the object in the sensing range if the emitted laser is reflected from a position in an optical path of the emitted laser leading from the sensor to the aisle, a first distance from the sensor to the position being shorter than a second distance from the sensor to the aisle; and notifying a first inspection result, which is the determination that there is the object, to a user. In the computer system, the first inspection result is notified to the user by a site corresponding to the position where the emitted laser is reflected, the site being marked in a layout image representing the product shelving units, displayed on the terminal device.

These general and specific aspects may be implemented using a system, a method, and a computer program, and any combination of systems, methods, and computer programs.

According to the aforementioned aspect, it is possible for further improvement to be realized.

BRIEF DESCRIPTION OF THE DRAWINGS

FIG. 9 is a drawing depicting an example of the data structure of an exclusion designation information table.

FIG. 35A is a diagram depicting a computer system for implementing sensor control.

FIG. 35B is a drawing depicting a configuration in which computers of a device manufacturer corresponds to a data operation center.

FIG. 35C is a drawing depicting an example in which computers of both or either one of a device manufacturer and another management company correspond to a data operation center.

FIG. 39A is a drawing depicting service model 1 (type where a company itself serves as a data center).

FIG. 39B is a drawing depicting service model 2 (IaaS-utilizing type).

FIG. 39C is a drawing depicting service model 3 (PaaS-utilizing type).

FIG. 39D is a drawing depicting service model 4 (SaaS-utilizing type).

FIG. 40A is a drawing depicting a mode in which a plurality of processing is carried out in one batch by a cloud server.

FIG. 40B is a drawing depicting a sequence in which one item of processing from among the plurality of processing is executed at the information terminal device side.

FIG. 40C is a drawing depicting a sequence in which two items of processing from among the plurality of processing are executed at the information terminal device side.

Figure 1:
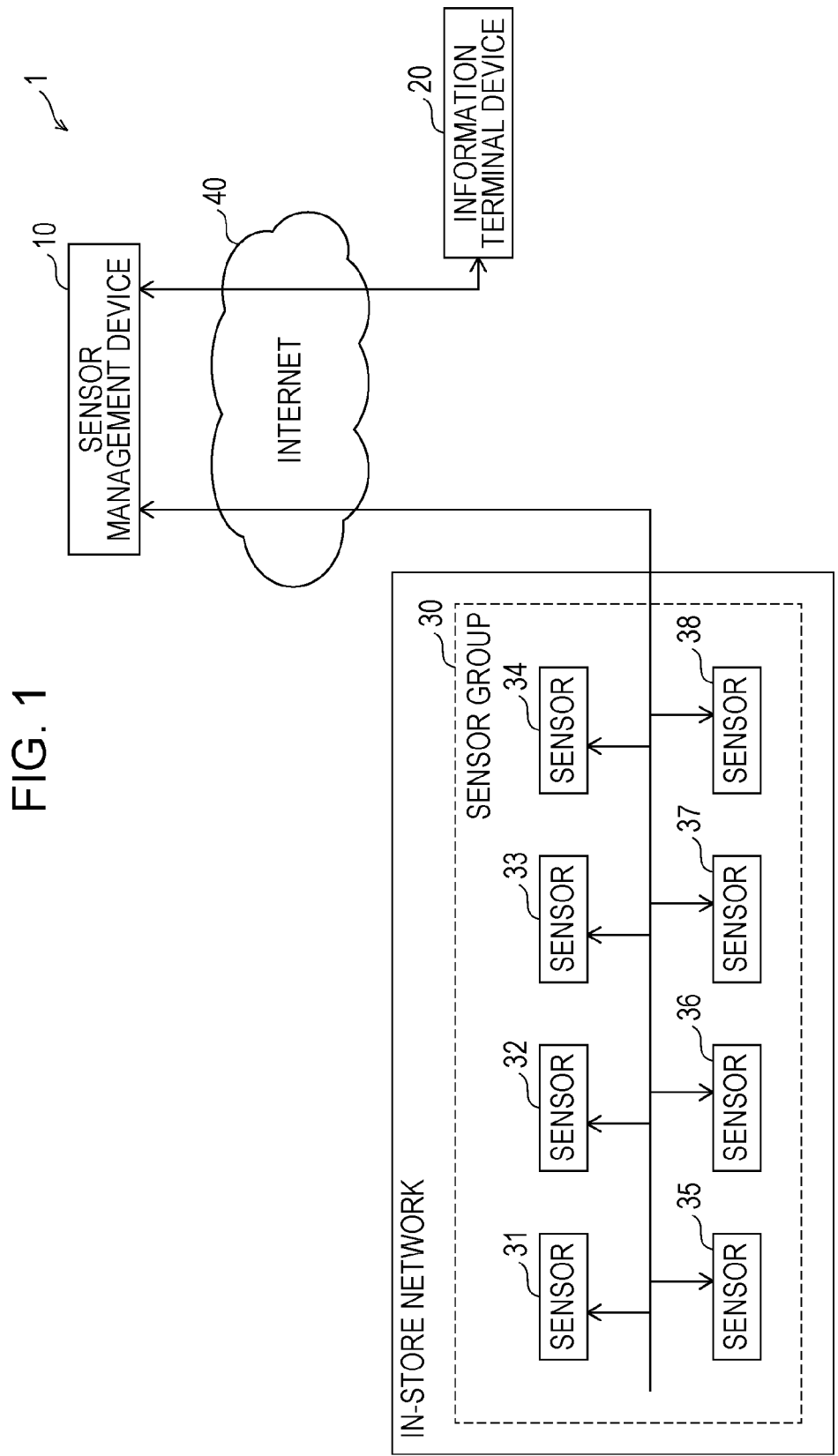
FIG. 1 is a drawing depicting an overview of a sensor control system.

DETAILED DESCRIPTION (Findings that Formed the Basis for the Present Disclosure)

The inventors found that the following problems occur in the technique disclosed in the aforementioned Japanese Unexamined Patent Application Publication No. 2009-98929.

A range measurement sensor that is used in a marketing survey carried out in a store is attached to a ceiling, for example, and emits laser light from the ceiling toward an aisle to carry out scanning, thereby forming a sensing curtain constituted by laser light. This sensing curtain forms a triangular shape in which the position of the center is the apex and the aisle is the base. The angle of the apex of the sensing curtain is equal to a movable angle that specifies the movable range (sensing range) of a light-projecting element. In the sensing curtain, the range measurement sensor receives reflected laser light by using a light-receiving element. The distance to a reflecting object is measured by using the phase difference between the projected light waves when light is emitted, and the received light waves when light is received. If there are no customers, there is nothing obstructing the sensing curtain in front of the product shelving unit, and therefore the measured distance is the distance from the apex to the base (the distance to the aisle). Here, when the phase difference between the projected light waves and the received light waves is taken as Φ, the modulation frequency as f, and the light speed as c, the distance to a reflecting subject is given as $L=(c/4\pi f)\times\Phi$. If a hand is extended toward (accesses) a product shelving unit, laser light is reflected by that hand, and therefore the measured distance is shorter than the distance to the aisle. The measured distance being shorter is considered to indicate that the product shelving unit has been accessed by a customer, and it is therefore detected that a product shelving unit has been accessed. Thus, when considering the detection of customers, it is ideal for the sensing curtain to be in a position covering the front of the product shelving unit.

However, it is difficult to maintain the positional relationship in which the front side of the product shelving unit is covered by the sensing curtain, and even if the positional relationship thereof is maintained when the range measurement sensor is first installed, it is often the case that the position of the product shelving unit deviates slightly as time elapses day after day, and some or all of the product shelving unit comes to obstruct the sensing curtain. The occurrence of jamming due to the sensing curtain being obstructed leads to the collection of customer tendencies not been carried out correctly. In such case, a period occurs in which correct information is not collected (blank period). Thus, when jamming occurs, early recovery of the positional relationship between the range measurement sensor and the product shelving unit is required. However, when a request for adjustment is made to the manufacturer or building firm that installed the sensor, there is a risk that the restoration of the positional relationship may take time, and the blank period for the collection of customer tendencies may last for a long time.

In addition, it is feasible that a store employee may attempt to restore the positional relationship by adjusting the azimuth angle (panning direction) of the range measurement sensor. Furthermore, it is feasible that the elevation angle (tilt direction) of the sensor may also be adjusted. However, even if the azimuth angle and the elevation angle of the sensor are altered in an attempt to restore the positional relationship, there is a problem in that, because it is difficult to ascertain whether or not it is possible to restore the positional relationship by way of the azimuth angle and the elevation angle of the sensor, when a rash attempt is made to adjust the azimuth angle and the elevation angle of the sensor, it takes much longer for jamming to be resolved compared to when a service person is called out.

Therefore, the inventors investigated the following improvement measure in order to solve the aforementioned problem.

A control method used in a computer system including a sensor that detects the presence of an object in a predetermined sensing range in a store, and a terminal device, the control method comprising: controlling the sensor to emit a laser, along an aisle between product shelving units installed in the store and to scan the laser reflected from the aisle; determining that there is the object in the sensing range if the emitted laser is reflected from a position in an optical path of the emitted laser leading from the sensor to the aisle, a first distance from the sensor to the position being shorter than a second distance from the sensor to the aisle; and notifying a first inspection result, which is the determination that there is the object, to a user, wherein the first inspection result is notified to the user by a site corresponding to the position where the emitted laser is reflected, the site being marked in a layout image representing the product shelving units, displayed on the terminal device.

According to the present aspect, if it is determined that there is an abnormality in the sensing range, the location where that abnormality exists is reported to the user by displaying a mark at the site corresponding to the reflected position, from among the plurality of arrangement locations depicted in the layout image, and it is therefore possible for the user to easily determine in which arrangement position the abnormality has occurred in the layout image. For example, if the installation position of a product shelving unit has deviated, the laser emitted from the sensor hits the product shelving unit before reaching the aisle. If a position reflected midway in the optical path constitutes only part of the product shelving unit, it may be determined that restoration by adjusting the azimuth angle/elevation angle of the sensor is possible, and if the position reflected midway in the optical path extends across the entirety of the product shelving unit in the horizontal direction, it may be determined that restoration by adjusting the azimuth angle/elevation angle of the sensor is not possible. Thus, the user does not have to carry out unnecessary restoration attempts.

Hereinafter, an embodiment of the present disclosure is described with reference to the drawings.

1. Embodiment 1

1.1 Overview of Sensor Control System 1

Here, a sensor control system 1 which controls sensors that are installed in a store and detect access to product shelving units by customers is described.

As depicted in FIG. 1, the sensor control system 1 is configured from a sensor management device 10, an information terminal device 20, and a sensor group 30.

The sensor control system 1 has an ordinary mode and a calibration mode. The calibration mode is a mode for calibrating the installation state of a range measurement sensor in the case where a range measurement sensor is operated when there are no customers, and there is an abnormality in the sensing range. The ordinary mode is a mode for detecting access to product shelving units by customers.

In the ordinary mode, the sensor management device 10 manages which products of which product shelving units have been accessed by a customer, namely which products have been picked up, based on a distance measured by each range measurement sensor. Thus, the manager of the store is able to identify popular products, for example. Furthermore, in the calibration mode, the sensor management device 10 determines whether or not there is an abnormality in the sensing range of a range measurement sensor on the basis of the distance measured when there are no customers, and if it is determined that there is an abnormality, control is performed such that the installation state of that range measurement sensor is calibrated.

The information terminal device 20 is possessed by a user who carries out work in relation to the store, and receives the provision of information corresponding to measurement results of each range measurement sensor from the sensor management device 10.

The sensor group 30 is made up of a plurality of range measurement sensors (range measurement sensor 31, 32, . . . , and 38). The range measurement sensors scan laser light by causing an internal mirror to rotate, and scan a two-dimensional plane.

The above is a description regarding the schematic configuration of the sensor control system 1 including the sensor management device 10, the information terminal device 20, and the sensor group 30.

Figure 2:
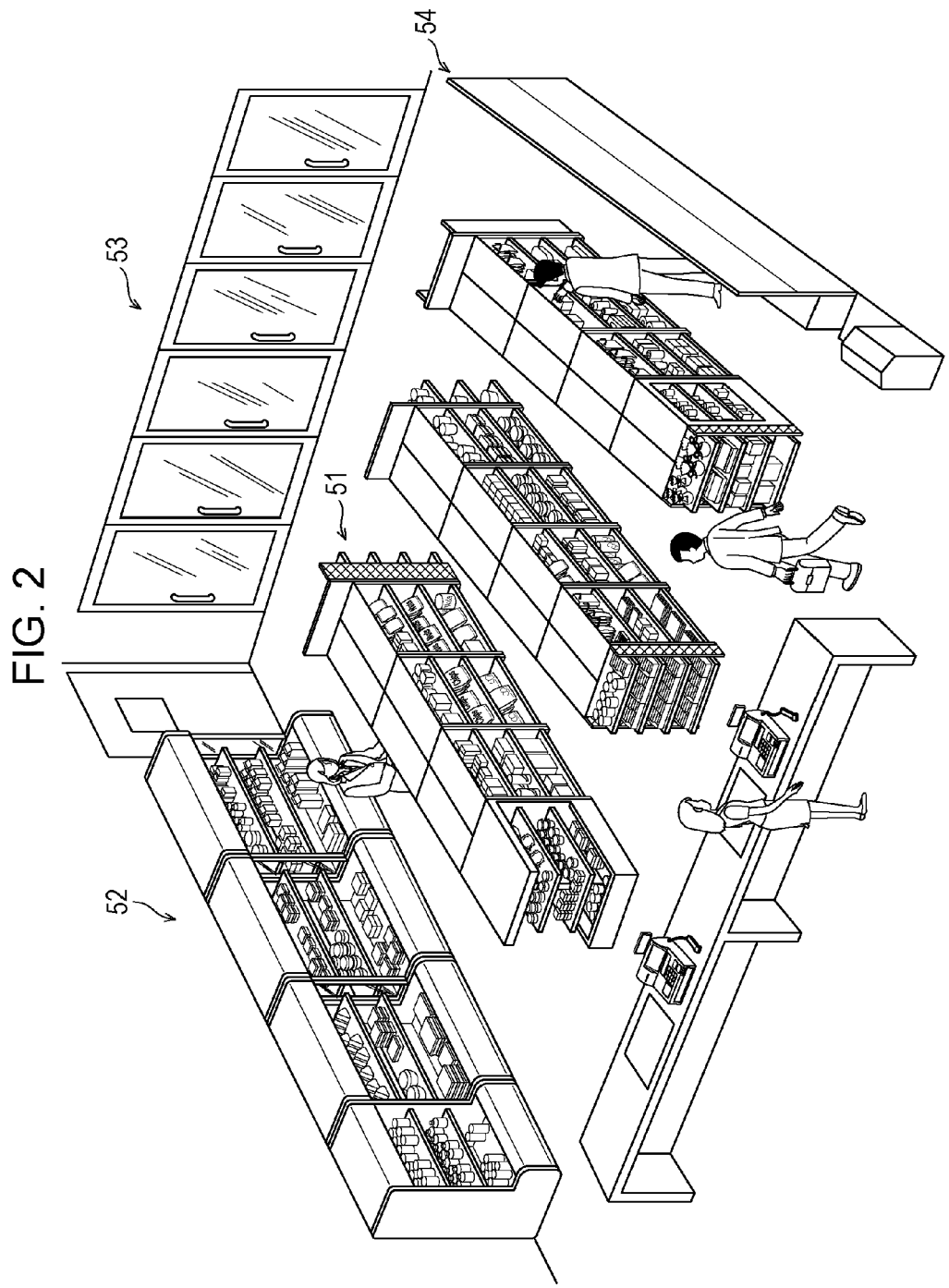
FIG. 2 is a drawing depicting an example of the inside of a store in which range measurement sensors are installed.

FIG. 2 depicts the inside of a store in which the range measurement sensors 31, 32, . . . , and 38 are installed. In the store of FIG. 2, there are four types of product shelving units, which are an ordinary-type product shelving unit 51, a low-temperature showcase-type product shelving unit 52, a refrigerator-type product shelving unit 53, and a bookshelf-type product shelving unit 54. Although there are differences in terms of function and shape, these types of product shelving units are similar in that product shelves for displaying and storing products are provided therein in a plurality of levels in the vertical direction, and product storage columns are provided side-by-side in a plurality of lines in the horizontal direction in each of those product shelves.

The front and/or the rear of the ordinary-type product shelving unit 51 face aisles. In a store or the like, a plurality of product shelving units are arranged in lines in the longitudinal direction thereof. A product shelving unit is made up of pillar members, beam members connected at approximate right angles to the pillar members, and a plurality of shelving boards fixed by the beam members. Each of the shelving boards is a product shelf for displaying and storing products, and product storage columns are provided side-by-side in a plurality of lines in the horizontal direction in each of those product shelves.

The low-temperature showcase-type product shelving unit 52 is for displaying products such as rice balls, box lunches, salads, side dishes, processed goods, milk, and milk beverages, and is configured from a display cabinet that is open at the front. Product shelves and product storage columns are formed in this display cabinet. A heat-insulating wall having an approximately U-shaped cross section is attached to both sides in this display cabinet. Furthermore, a cooler and a duct are provided in a vertical manner on the rear surface of the display cabinet. A blower is present inside the duct, and air that is sucked in from a duct suction port at the lower edge of an opening is fed to the cooler. The cooling air from the cooler is discharged from a discharge port at the upper edge of the opening of the display cabinet, and is fed to products displayed in the product storage columns of each product shelf in the display cabinet. Thus, the temperature of the products in the display cabinet is maintained at a low temperature.

The refrigerator-type product shelving unit 53 is a built-in product storage that is built into the wall surface of the store, and is mainly used for storing frozen products such as ice cream and frozen food, and beverage products such as alcohol, coffee, tea, water, and juice. Product shelves and product storage columns are formed in this product storage. The front of the product storage is formed entirely as an open portion, and this open portion is covered by a single-swing door. The single-swing door is glass, and it is possible to see the beverage products in the front row in each product storage column. The product storage columns of each product shelf in the product storage extend in the depth direction, and a plurality of beverage products are stored side-by-side in a line in the depth direction so as to be taken out one at a time.

The bookshelf-type product shelving unit 54 is formed long in the lateral left-right direction, is a bookshelf supported by a pair of supports, and is used for displaying magazines. A display stand for books for sale is provided between the supports at the front side of the bookshelf, and a sample stand for vertically-placed sample books is provided at the rear surface side. A flat-stacking display stand on which books are stacked in a flat manner is provided under the display stand. The display stand, the sample stand, and the flat-stacking display stand constitute product shelves.

The range measurement sensors 31, 32, . . . , and 38 are installed for each of the ordinary-type product shelving unit 51, the low-temperature showcase-type product shelving unit 52, the refrigerator-type product shelving unit 53, and the bookshelf-type product shelving unit 54.

Figure 3:
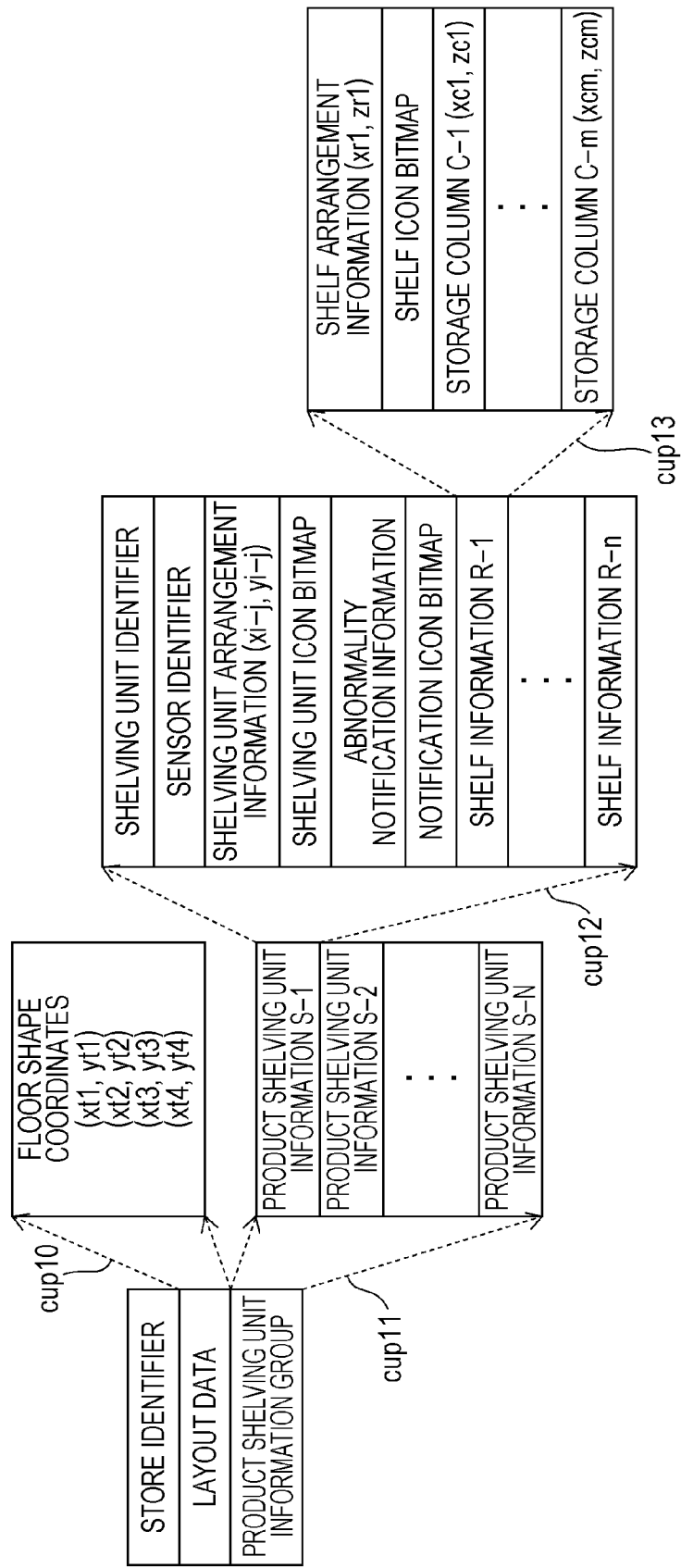
FIG. 3 is a drawing depicting an example of the data structure of store information.

The shelving unit arrangement in the store site is managed using a layout in which the site is represented using an X-Y coordinate system. Here, information (store information) for managing the store of FIG. 2 is described. The data structure of the store information is depicted in FIG. 3. As depicted in FIG. 3, the store information is made up of a store identifier, layout data, and a product shelving unit information group.

The store identifier is an identifier for uniquely identifying a store.

The layout data is a region that stores data representing the floor shape inside a store, and is made up of "floor shape coordinates" indicating the shape of a store floor, as indicated by the leadout lines cup10. The coordinates (Xt1, Yt1), (Xt2, Yt2), (Xt3, Yt3), and (Xt4, Yt4) depicted in FIG. 3 are an example of floor shape coordinates, and indicate where the four corners of the floor shape are in a screen coordinate system.

The product shelving unit information group is made up of a plurality of product shelving unit information belonging to a store, as indicated by the leadout lines cup11. The leadout lines cup12 are a close-up of the internal configuration of one item of product shelving unit information. As indicated by the leadout lines cup12, the product shelving unit information is made up of a "shelving unit identifier" for uniquely identifying a shelving unit, a "sensor identifier" for uniquely identifying a range measurement sensor that detects access to a product shelving unit identified by a shelving unit identifier, "shelving unit arrangement coordinates" indicating coordinates where a shelving unit icon is to be arranged, a "shelving unit icon bitmap" indicating a bitmap constituting a shelving unit icon, "abnormality notification information" indicating the necessity of an abnormality notification, a "notification icon bitmap" indicating a bitmap constituting an icon that notifies an abnormality, and "shelf information (R-1, R-2, . . . , and R-n)" relating to one or more shelves provided in a product shelving unit. Here, the shelving unit arrangement information (Xi-j, Yi-j) indicates "product shelving unit coordinates" where one product shelving unit icon is to be arranged in the screen coordinate system.

Figure 4A:
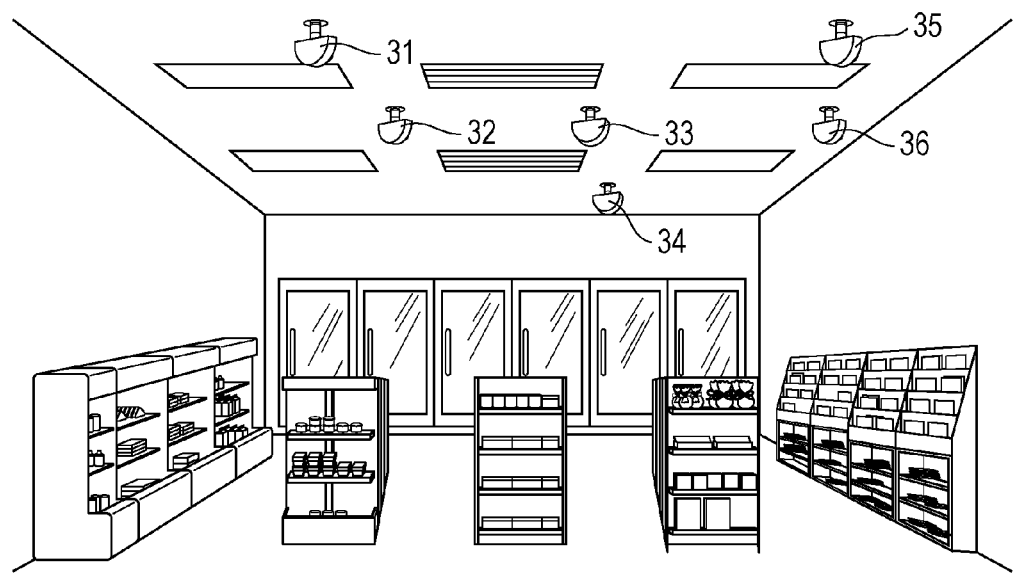
FIG. 4A is a drawing depicting an example of the ceiling of a store to which range measurement sensors have been attached.

The leadout lines cup13 are a close-up of the internal configuration of one item of shelf information. As indicated by the leadout lines cup13, shelf information is made up of "shelf arrangement information (Xr1, Zr1)" representing coordinates where a shelf icon is to be arranged, a "shelf icon bitmap" representing a bitmap constituting a shelf icon, and "storage columns (C-1, C-2, . . . , and C-m)" representing coordinates of a plurality of product storage columns arranged side-by-side in the horizontal direction in a shelf. Here, the coordinates of a product storage column (X, Y) indicate "separator position coordinates" for different products that are adjacent to each other. With the above layout, the arrangement of product shelving units in the store site is specified together with the three-dimensional arrangement of product storage columns of the product shelving units. Meanwhile, the range measurement sensor 31 is arranged in the ceiling of the store, in a position directly above a plane where a product shelving unit and an aisle meet. FIG. 4A depicts an example in which range measurement sensors are arranged in a ceiling.

Figure 4B:
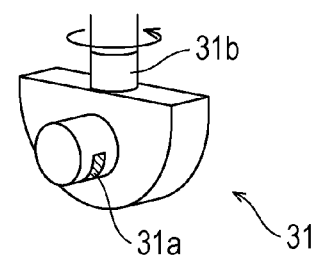
FIG. 4B is a drawing depicting the external appearance of a range measurement sensor.

The range measurement sensor 31 measures the distance from the range measurement sensor to an object with which laser light has collided, by the phase difference method regardless of the mode category. The phase difference method is a method for calculating a distance from the phase difference between projected light waves and received light waves. As depicted in FIG. 4A, the range measurement sensor 31 is arranged in the ceiling of the store, in a position directly above a plane where a product shelving unit and an aisle meet. The range measurement sensors are provided in positions directly above planes where product shelving units and aisles meet, in order to detect access by customers in each product shelving unit. As depicted in FIG. 4B, the range measurement sensor 31 is installed in the ceiling by way of a support 31b, and projects laser light from a light projection opening 31a for laser light. Here, the support 31b is able to rotate in the horizontal direction in order to change the azimuth angle for the sensing range of the range measurement sensor. Next, the internal configuration of the range measurement sensor 31 in FIG. 4B is described.

Figure 5:
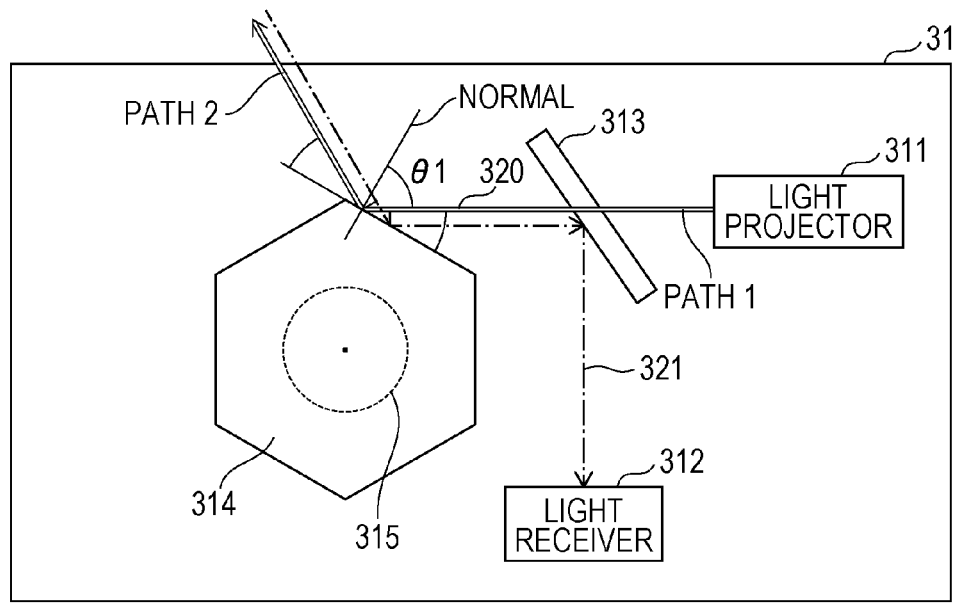
FIG. 5 is a block diagram depicting the internal configuration of a range measurement sensor.

FIG. 5 is a drawing depicting the internal configuration of the range measurement sensor 31. As depicted in FIG. 5, the range measurement sensor 31 is configured from: a light projector 311 that projects laser light 320; a light receiver 312 that receives a received laser 321 obtained due to the projected laser light being reflected; a half mirror 313 that passes the projected laser 320 emitted by the light projector 311, and also reflects the received laser 321 obtained by reflection, to lead the received laser 321 to the light receiver 312; a polygon mirror 314 that is a polyhedron in which the side surfaces are formed from mirror surfaces; and an electric motor 315 that step-rotates the polygon mirror 314 in a counterclockwise direction. In FIG. 5, the shape of the polygon mirror 314 is hexagonal; however, this is for the convenience of the description, and the shape may be octagonal or decagonal.

Figure 6A:
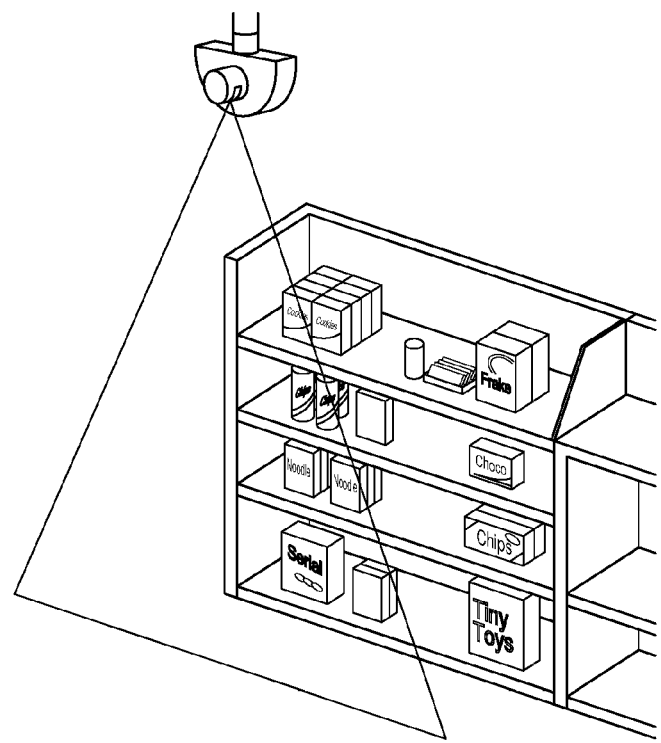
FIG. 6A is a drawing depicting an example of the case where there are no abnormalities in the sensing range of a range measurement sensor when there are no customers.

The mirror surfaces of the polygon mirror 314 alternately reflect projected beams and received beams due to the rotation of the aforementioned electric motor 315. Here, the step-rotation by the electric motor 315 refers to, each time the polygon mirror 314 is rotated a predetermined angle (1° for example, referred to as step angle α), that orientation being maintained for a very short period, and rotation being newly carried out once that very short period has elapsed. This step-rotation is carried out in order to prevent the orientation of the mirror varying when a projected laser is incident and when a received laser is incident. Each time this step-rotation is carried out once, the incidence angle of the projected beam onto the mirror surface become shallower by the step angle α. Likewise, the emission angle of the projected beam from the mirror surface also becomes shallower by the step angle α. In such case, the optical path of the projected beam is inclined by "2×step angle α" due to the one step-rotation of the polygon mirror 314. The same is also true for the received beam in that the optical path of the received beam is inclined by "2×step angle α" due to the one step-rotation of the polygon mirror 314. While one mirror of the polygon mirror 314 is reflecting a projected beam and a received beam, the step angle α varies within the range of 0 to 60°. In such case, the optical paths of the projected beam and the received beam widen within the range of 0 to 120°, and scanning of the projected beam is carried out within the range of 0 to 120° from the ceiling to the aisle. FIG. 6A depicts the scanning range of a projected beam produced by the rotation of the polygon mirror 314 inside the range measurement sensor 31 attached to the ceiling. The attachment position of the range measurement sensor 31 is directly above where the product shelving unit and the aisle meet, and therefore, due to the scanning, a sensing curtain produced by the range measurement sensor 31 is formed such that the product shelving unit is covered.

When the phase difference between the projected beam that is cast in this scanning range and the received beam is taken as Φ, the modulation frequency as f, and the light speed as c, the radial distance to a reflecting subject is given as L=(c/4πf)×Φ. With this equation, it is possible to specify the radial distance L to a reflection position, from the range measurement sensor 31 positioned in the ceiling. However, when a cart is traveling along the aisle and, for example, collides with the product shelving unit such that the position of the product shelving unit deviates from that depicted in the aforementioned layout, the positional relationship of FIG. 6A is not able to be maintained.

Figure 6B:
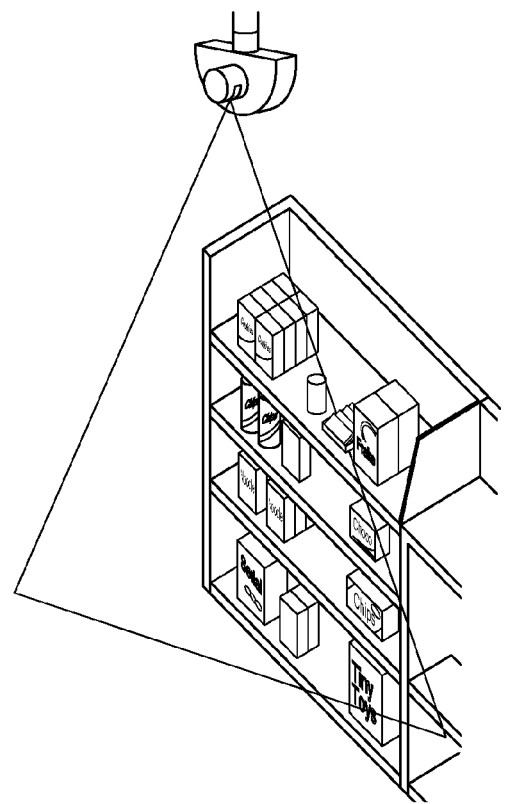
FIG. 6B is a drawing depicting an example of the case where there is an abnormality in the sensing range of a range measurement sensor when there are no customers.

FIG. 6A is a drawing depicting an example of the case where there are no abnormalities in the sensing range of a range measurement sensor when there are no customers, and FIG. 6B is a drawing depicting an example of the case where there is an abnormality in the sensing range of the range measurement sensor when there are no customers. As depicted in FIG. 6A, when there are no customers, ordinarily, laser light emitted from the range measurement sensor 31 reaches the installation surface (store floor) of the product shelving unit, and therefore the distance measured is ordinarily the distance from the range measurement sensor to the floor. However, in cases such as where, for some reason, the installation position of the product shelving unit has deviated, the laser light emitted by the range measurement sensor 31 sometimes hits a shelf of the product shelving unit before reaching the floor. In such cases, in the ordinary mode, usually, it is erroneously recognized that access has been made to a product arranged on the shelf, and normal management becomes no longer possible; therefore, it is determined that there is an abnormality in the sensing range.

Even in a state where the sensing curtain has the correct positional relationship, or even in a state where the sensing curtain is intersecting the product shelving unit, it is important to detect where the projected beam is reflected in an X-Z coordinate system in which the height direction of the product shelving unit is the Z axis and the width direction is the X axis. The sensor management device 10 specifies where the projected beam emitted by the range measurement sensor 31 has been reflected among the storage columns in the product shelving unit. Hereinafter, a description is given regarding the specifying of where the projected beam emitted by the range measurement sensor 31 has been reflected among the storage columns in the product shelving unit.

Figure 7A:
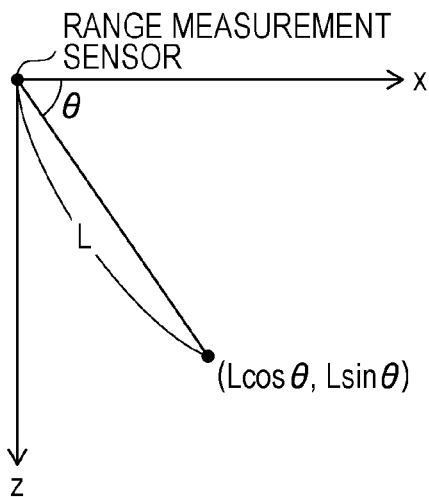
FIG. 7A is a drawing illustrating the calculation of a coordinate position (L cos θ, L sin θ) for which a range measurement sensor serves as a reference, on the basis of the distance from the range measurement sensor to an object, and an angle.
Figure 7B:
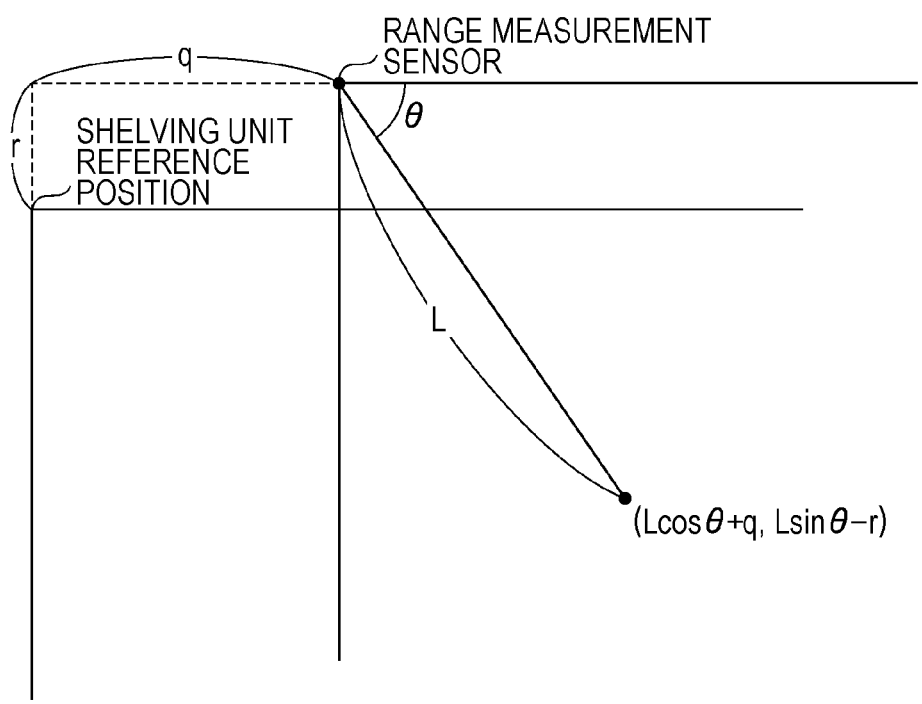
FIG. 7B is a drawing illustrating the conversion of a calculated coordinate position into a display coordinate system in which the left edge of the uppermost level of a product shelving unit serves as a reference.

FIG. 7A is a drawing in which a length L that is a detection result produced by the range measurement sensor 31, and an angle θ formed with the X axis are plotted in an X-Z coordinate system in which the height direction of the product shelving unit is the Z axis and the width direction is the X axis. Here, the length L and the angle θ are converted into a coordinate position (L cos θ, L sin θ) for which the range measurement sensor serves as a reference. The sensor management device 10 converts the acquired coordinate position (L cos θ, L sin θ) in a display coordinate system for which the left edge of the uppermost level of a product shelving unit serves as a reference. For example, as depicted in FIG. 7B, when the horizontal length from a position (shelving unit reference position), for which the left edge of the uppermost level of the product shelving unit serves as a reference, to the range measurement sensor is "q", and the vertical length is "r", the coordinates after conversion in the display coordinate system are (L cos θ+q, L sin θ−r). The shelf position information and the storage columns C-1, . . . , and C-m included in the product shelving unit information corresponding to the product shelving unit are used to specify in which storage column location of which shelf the coordinates (L cos θ+q, L sin θ−r) are included.

Here, the specifying of the angle θ is described. As previously mentioned, for example, when the polygon mirror 314 is hexagonal, the sensing range of the range measurement sensor 31 is 0 to 1200. Therefore, the angle depicted in FIG. 7A has a range of 30 to 150°. If the step angle is taken as 0° in the case of a 30° angle, the range measurement sensor 31 is able to use the step angle α (α is a value of 0 or more and 60 or less) that is varied by step-rotation, to calculate the angle as 30+2×α.

It is possible to detect into which storage column a hand has been extended by a customer in a state where the sensing curtain has the correct positional relationship, by converting the distance L and the angle θ into storage column coordinates as described above. Furthermore, even in a state where the sensing curtain is intersecting the product shelving unit and an abnormality has occurred, it is possible to know which storage column is intersecting the scanning range of the projected beam.

The processing performed by a sensor processing unit 106 will be described in detail with reference to the functional configuration of the sensor management device 10 that carries out the above processing.

1.2 Sensor Management Device 10

Figure 8:
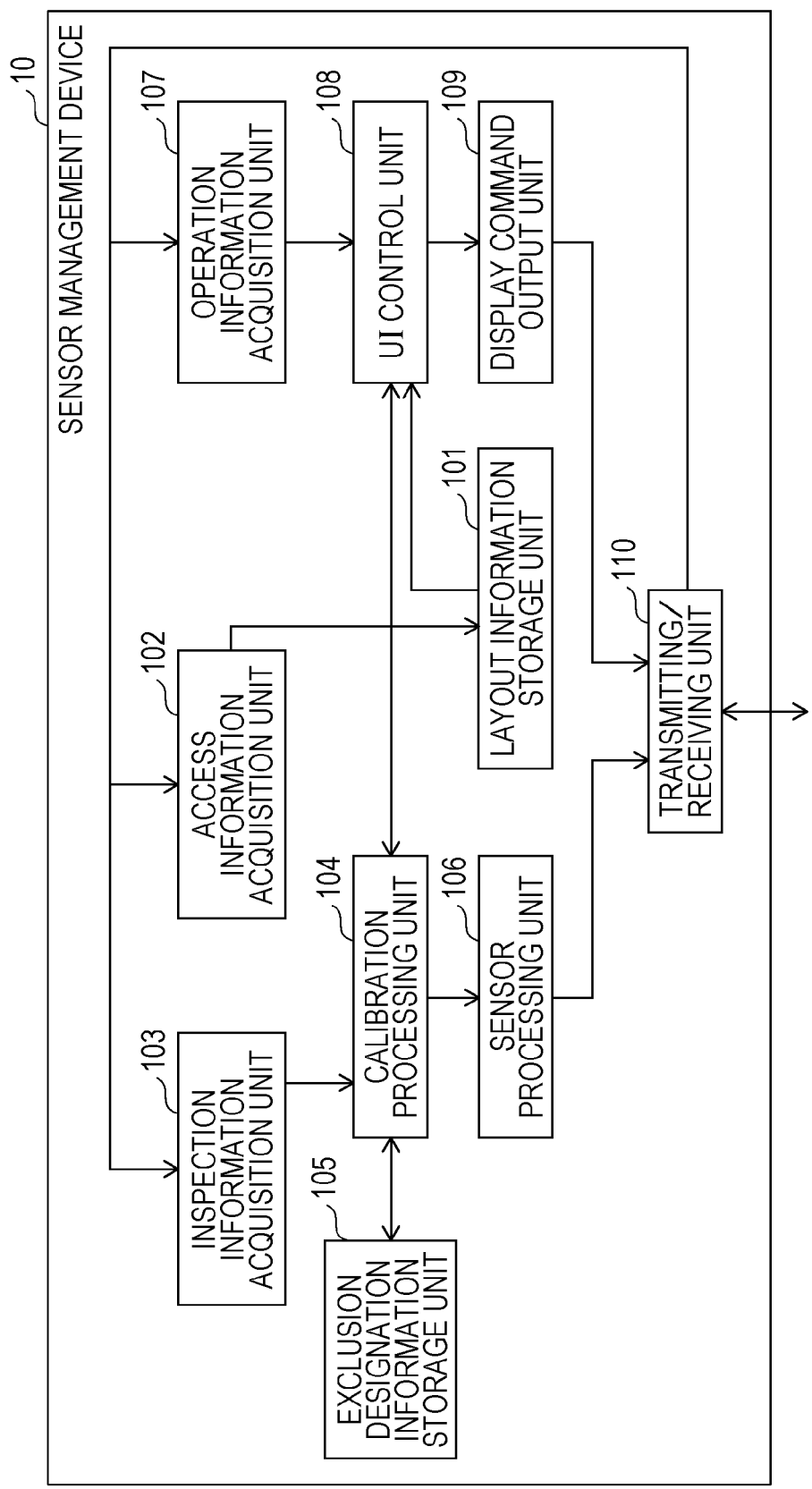
FIG. 8 is a block diagram depicting the configuration of a sensor management device.

As depicted in FIG. 8, the sensor management device 10 is configured from a layout information storage unit 101, an access information acquisition unit 102, an inspection information acquisition unit 103, a calibration processing unit 104, an exclusion designation information storage unit 105, a sensor processing unit 106, an operation information acquisition unit 107, a UI control unit 108, a display command output unit 109, and a transmitting/receiving unit 110.

The sensor management device 10 is configured including a processor, a memory, and a network interface card (NIC), and the functions of the access information acquisition unit 102, the inspection information acquisition unit 103, the calibration processing unit 104, the sensor processing unit 106, the operation information acquisition unit 107, the UI control unit 108, and the display command output unit 109 are realized by the processor executing a program stored in the memory. Furthermore, the transmitting/receiving of information via the Internet 40 carried out by the sensor management device 10 is carried out using the NIC.

(1) Layout Information Storage Unit 101

The layout information storage unit 101 is a memory region for storing store information, which is information associated with each store, and relates to the arrangement locations of a plurality of product shelving units installed in the corresponding store, and the arrangement locations of products in each product shelving unit.

When a display request for the arrangement locations of product shelving units (hereinafter, shelving unit display request) is issued from the information terminal device 20, the store information of a store to be displayed is read out.

Note that the data structure of store information has been described with FIG. 3, and therefore a description thereof has been omitted here.

(2) Access Information Acquisition Unit 102

The access information acquisition unit 102 has a function to, when in the ordinary mode, specify whether or not access has been made to a product arranged in a product shelving unit, based on access information generated by each range measurement sensor 31, . . . , and 38.

Hereinafter, the function of the access information acquisition unit 102 is described in detail.

The access information acquisition unit 102 successively acquires access information transmitted from a range measurement sensor. Here, access information is made up of a shelving unit identifier that identifies a product shelving unit, the light projection angle when laser light is emitted (hereinafter, simply referred to as the angle), and the distance measured at the angle. Here, the light projection angle is the angle θ depicted in FIG. 7A.

The access information acquisition unit 102 determines whether or not the acquired distance is the distance to the installation surface (floor) of the product shelving unit, and thereby specifies whether or not access has been made to a product arranged in the product shelving unit. Furthermore, if it is specified that access has been made to a product, when the same distance is continuously measured for a predetermined time (for example, 3 minutes) at the same angle, the access information acquisition unit 102 writes information (for example, the value "1") indicating that it is necessary to notify the user (the manager of the store), in abnormality notification information that is included in product shelving unit information of the corresponding store information.

Ordinarily, even with popular products, access is not always made by every customer, and invariably there are times when access is not made. Therefore, when the distance measured with respect to laser light emitted at a certain angle is not the distance to the floor, the same distance is not measured at the same angle continuously for a predetermined time. If the same distance is measured at the same angle continuously for a predetermined time, there is a high possibility of there being some kind of obstruction rather than a customer accessing a product, and it is therefore necessary to notify the user.

(3) Inspection Information Acquisition Unit 103

The inspection information acquisition unit 103 has a function to, in the calibration mode, acquire access information generated by each range measurement sensor 31, . . . , and 38. The carrying out of access detection by each range measurement sensor in the calibration mode is, hereinafter, referred to as a state inspection.

To be specific, when the inspection information acquisition unit 103 acquires, via the transmitting/receiving unit 110, access information transmitted from each range measurement sensor, the acquired access information is output to the calibration processing unit 104.

Furthermore, when the inspection information acquisition unit 103 receives a calibration completion notification indicating that calibration has been completed from a range measurement sensor that is targeted for calibration, the received calibration completion notification is output to the calibration processing unit 104.

(4) Calibration Processing Unit 104

The calibration processing unit 104 has a function to specify whether or not there is an abnormality in the sensing range of the range measurement sensor that is targeted for calibration, based on access information transmitted from the range measurement sensor, with respect to a product shelving unit associated with the range measurement sensor.

Hereinafter, the function of the calibration processing unit 104 is described in detail.

(4-1) Processing when Sensor Identifier is Received

The calibration processing unit 104 receives, from the UI control unit 108, a sensor identifier that uniquely identifies the range measurement sensor that is targeted for calibration, and the shelving unit identifier of the product shelving unit associated with that range measurement sensor, and from among the access information received from the inspection information acquisition unit 103, extracts access information including the shelving unit identifier received from the UI control unit 108.

(4-2) Abnormality Determination

The calibration processing unit 104 determines whether or not there is an abnormality in the sensing range of a range measurement sensor. To be specific, it is determined whether or not a distance indicated by the extracted access information is the distance to the floor in the sensing range of the range measurement sensor, and if not the distance to the floor, it is specified to which product storage column of which shelf the position indicated by the distance and the angle indicated by the access information corresponds. For example, the calibration processing unit 104 uses the measured distance to calculate a distance L that is based on the degree of reduction from the actual size of the product shelving unit to the size displayed by the information terminal device 20. If it is determined that there is an abnormality in the sensing range of the range measurement sensor, it is determined whether or not all of the coordinates (L cos θ+q, L sin θ−r) specified as positions where there is an abnormality are included in a range indicated by any of the exclusion designation information included in the exclusion designation information group corresponding to the received shelving unit identifier. Here, the exclusion designation information is information indicating a range that is excluded from being an inspection target for state inspection in the calibration mode. If it is determined that there are no abnormalities in the sensing range of the range measurement sensor, the calibration processing unit 104 outputs only a normal message transmission instruction to the UI control unit 108.

(4-3) When Applicable to the Designation of a Location to be Excluded

If it is determined that all of the specified coordinates are included in any of the exclusion designation information included in the exclusion designation information group, all of the specified coordinates are output to the UI control unit 108, and an instruction (hereinafter, normal message transmission instruction), by which a message (normal message) indicating that there are no abnormalities is transmitted to the information terminal device 20, is output to the UI control unit 108. If it is determined that at least one coordinate from among all of the specified coordinates is not included in any of the exclusion designation information included in the exclusion designation information group, all of the specified coordinates are output to the UI control unit 108, and the fact that there is abnormality is output to the UI control unit 108. If a specified coordinate is output to the UI control unit 108, the calibration processing unit 104 associates and outputs an exclusion designation flag that indicates whether or not that coordinate is included in the exclusion designation information. For example, the value of the exclusion designation flag is "1" if a specified coordinate is included in the exclusion designation information, and the value of the exclusion designation flag is "0" if not included. Moreover, when the calibration processing unit 104 receives exclusion designation information from the UI control unit 108, the exclusion designation information is written in the exclusion designation information storage unit 105.

(4-4) When Calibration Start is Instructed

When the calibration processing unit 104 receives a calibration start instruction from the UI control unit 108, it is determined whether or not all of the coordinates specified as positions where there is an abnormality are included in any of the exclusion designation information included in the exclusion designation information group, and if the determination result is negative, it is determined whether or not calibration is possible. A specific description of the determination as to whether calibration is possible is described later. If the determination is positive, namely it is determined that all of the specified coordinates are included in any of the exclusion designation information included in the exclusion designation information group, all of the specified coordinates and a normal message transmission instruction are output to the UI control unit 108. Here, the calibration processing unit 104 once again carries out the determination as to whether or not each of the specified coordinates is included in the exclusion designation information; however, because an exclusion designation information table T100 is updated whenever exclusion designation information is received from the information terminal device 20, there is a possibility that a determination may be made that is different from the determination initially made.

If it is determined that calibration is possible, the calibration processing unit 104 outputs to that effect to the sensor processing unit 106, and if calibration is not possible, the calibration processing unit 104 outputs to that effect to the UI control unit 108.

When the calibration processing unit 104 receives a calibration completion notification from the inspection information acquisition unit 103, the calibration processing unit 104 once again specifies whether or not there is an abnormality in the sensing range of the range measurement sensor that is targeted for calibration, based on access information acquired after the completion of calibration, with respect to the product shelving unit associated with the range measurement sensor.

(5) Exclusion Designation Information Storage Unit 105

The exclusion designation information storage unit 105 is a memory region that manages one or more items of exclusion designation information indicating a range that is excluded from being an inspection target for state inspection in the calibration mode, for each product shelving unit.

To be specific, the exclusion designation information storage unit 105 stores the exclusion designation information table T100 as depicted in FIG. 9.

The exclusion designation information table T100 is made up of shelving unit identifiers and an exclusion designation information group.

The shelving unit identifiers are identifiers for identifying a product shelving unit.

The exclusion designation information group is made up of one or more items of exclusion designation information (1, 2, . . . , and k). In the exclusion designation information, coordinates made up of the start point and the end point of a rectangular shape are included as information indicating a range to be excluded.

For example, in a product shelving unit identified by the shelving unit identifier "A01", the ranges indicated by each of a rectangle having the start point (x11, z11) and the end point (x12, z12), a rectangle having the start point (x21, z21) and the end point (x22, z22), . . . , and a rectangle having the start point (xk1, zk1) and the end point (xk2, zk2) are ranges that are excluded from state inspections. Furthermore, in a product shelving unit identified by the shelving unit identifier "A02", the range indicated by a rectangle having the start point (x'11, z'11) and the end point (x'12, z'12) is a range that is excluded from state inspections.

(6) Sensor Processing Unit 106

The sensor processing unit 106 has a function to generate a calibration command to carry out calibration, for a range measurement sensor that is targeted for calibration.

To be specific, when information indicating that calibration is possible is received from the calibration processing unit 104, the sensor processing unit 106 specifies whether to calibrate the azimuth angle for the sensing range in the left or right direction, based on the position where it has been determined that there is an abnormality. For example, if the location where it has been determined that there is an abnormality is on the right side when facing the front of the product shelving unit, it is specified that the range measurement sensor is to be turned to the right in the horizontal direction in order to calibrate the azimuth angle for the sensing range, and if the location where it has been determined that there is an abnormality is on the left side when facing the front of the product shelving unit, it is specified that the range measurement sensor is to be turned to the left in the horizontal direction in order to calibrate the azimuth angle for the sensing range.

The sensor processing unit 106 generates a calibration command that includes, as the destination, the sensor identifier received by the calibration processing unit 104 from the UI control unit 108, and is made up of the specified calibration content (for example, content such as the range measurement sensor being rotated to the right in the horizontal direction), and a calibration angle corresponding to the calibration content, and transmits the calibration command via the transmitting/receiving unit 110 to the range measurement sensor that is targeted for calibration. Here, the calibration angle is a predetermined angle (for example, 3°) when performing rotation in the horizontal direction in order to calibrate the installation state of the range measurement sensor.

(7) Operation Information Acquisition Unit 107

The operation information acquisition unit 107 has a function to acquire information relating to an operation received by the information terminal device 20 from the user.

The operation information acquisition unit 107 acquires any of shelving unit display request information, mode change instruction information, exclusion designation instruction information, exclusion designation end information, calibration processing start instruction information, and calibration processing end instruction information, in accordance with the operation of the information terminal device 20 of the user, as information relating to the operation, and outputs the acquired information to the UI control unit 108.

Hereinafter, the information acquired by the operation information acquisition unit 107 from the information terminal device 20 is described.

The shelving unit display request information is information that requests a store layout image representing the layout of product shelving units in a store, and includes a terminal identifier that identifies the request-source information terminal device 20, a store identifier that identifies the store to be displayed, and content that requests the store layout image.

The mode change instruction information is information that instructs a change from the ordinary mode to the calibration mode, and includes a terminal identifier, a shelving unit identifier of a product shelving unit that is targeted for access detection by the range measurement sensor that is targeted for calibration, and content that instructs the mode change.

The exclusion designation instruction information is information that instructs calibration target exclusion with respect to a position where it has been determined in the state inspection that there is an abnormality, and includes a terminal identifier, a shelving unit identifier, and exclusion designation information that indicates a position to be excluded.

The exclusion designation end information is information indicating that the exclusion designation instruction has ended, and includes a terminal identifier, and content indicating that the exclusion designation instruction has ended.

The calibration processing start instruction information is information that instructs calibration to be carried out with respect to a range measurement sensor with which it has been detected that there is an abnormality, and includes a terminal identifier, a sensor identifier of the range measurement sensor that is targeted for calibration, a shelving unit identifier of the product shelving unit associated with that range measurement sensor, and content with which calibration is carried out.

The calibration processing end instruction information is information that instructs the end of calibration, and includes a terminal identifier, and content that instructs the end of calibration.

(8) UI Control Unit 108

The UI control unit 108 has a function to acquire information relating to an image to be displayed by the information terminal device 20, in accordance with information received from the operation information acquisition unit 107. Furthermore, the UI control unit 108 stores mode information indicating whether the current mode is the ordinary mode or the calibration mode, in a predetermined storage region (hereinafter, mode storage region). It is possible for other constituent elements to specify the mode that is currently set by referring to the content of this mode storage region.

Hereinafter, a function corresponding to information acquired from the operation information acquisition unit 107 is described in detail.

(8-1) in the Case of Shelving Unit Display Request Information

When the UI control unit 108 receives shelving unit display request information from the operation information acquisition unit 107, store information that includes the store identifier included in the received shelving unit display request information is acquired from the layout information storage unit 101 and is temporarily stored, and the acquired store information is output to the display command output unit 109 in order to be transmitted to the information terminal device 20 identified by the terminal identifier included in the shelving unit display request information.

(8-2) in the Case of Mode Change Instruction Information

When the UI control unit 108 receives mode change instruction information from the operation information acquisition unit 107, the mode stored in the mode storage region is changed from the ordinary mode to the calibration mode, and the shelving unit identifier included in the received mode change instruction information is output to the calibration processing unit 104.

When the UI control unit 108 receives only a normal message transmission instruction from the calibration processing unit 104, the product shelving unit information that includes the received shelving unit identifier is acquired from store information that is being temporarily stored, and the acquired product shelving unit information and a normal message are output to the display command output unit 109.

When the UI control unit 108 receives all of the coordinates in which it has been specified that there is an abnormality, and a normal message transmission instruction from the calibration processing unit 104, the positions of product storage columns of shelves indicated by each of the received coordinates are specified. The UI control unit 108 generates exclusion designation graphics as graphics to be displayed at the specified positions, and outputs the generated exclusion designation graphics, the product shelving unit information including the received shelving unit identifier, and the normal message to the display command output unit 109. Here, the exclusion designation graphics indicate that the abnormalities at the positions where these graphics are displayed are exclusion targets, and are configured from bitmaps, for example.

When the UI control unit 108 receives all of the coordinates in which it has been specified that there is an abnormality, and an indication that there is an abnormality from the calibration processing unit 104, the positions of product storage columns of shelves indicated by each of the received coordinates are specified. The UI control unit 108 generates either exclusion designation graphics or abnormality detection graphics as graphics to be displayed at the specified positions, in accordance with the value indicated by exclusion designation flags associated with coordinates included in the specified positions, and outputs the generated graphics, and the product shelving unit information including the received shelving unit identifier to the display command output unit 109. Here, the abnormality detection graphics indicate that abnormalities have been detected at the positions where these graphics are displayed, and are configured from bitmaps, for example. Furthermore, a side surface sensor detects an object and the position thereof by a laser emitted from the side surface sensor being reflected by the object. Therefore, the side surface sensor is not able to detect the state ahead of the position at which the object was actually detected in the laser optical path, or in other words, whether or not the object is present ahead of the position at which the object was actually detected in the laser optical path. However, in practice, since there is a high possibility of the object also being present, or in other words, of an abnormality state also being detected, in the area ahead of the position at which the object was actually detected in the laser optical path, an abnormality detection graphic may be displayed also for that area.

(8-3) In the Case of Exclusion Designation Instruction Information

When the UI control unit 108 receives exclusion designation instruction information from the operation information acquisition unit 107, the shelving unit identifier included in the exclusion designation instruction information, and exclusion designation information are output to the calibration processing unit 104. The UI control unit 108 repeats the aforementioned output each time exclusion designation instruction information is received from the operation information acquisition unit 107. Thus, in the calibration processing unit 104, as a result of a shelving unit identifier and exclusion designation information being repeatedly received, it is possible for one or more items of exclusion designation information to be written in the exclusion designation information group associated with a received shelving unit identifier, in the exclusion designation information table T100.

The UI control unit 108 generates an exclusion designation graphic, and outputs a graphic change instruction that changes the graphic to be displayed in an exclusion designation position indicated by the received exclusion designation information to the exclusion designation graphic, and the generated exclusion designation graphic, to the display command output unit 109.

(8-4) In the Case of Exclusion Designation End Information

When the UI control unit 108 receives exclusion designation end information from the operation information acquisition unit 107, a processing start confirmation message for confirming the start of calibration processing is generated, and the generated processing start confirmation message, and a confirmation message superimposition instruction that indicates an instruction to superimpose the processing start confirmation message on the image currently being displayed, are output to the display command output unit 109.

(8-5) In the Case of Calibration Processing Start Instruction Information

When the UI control unit 108 receives calibration processing start instruction information from the operation information acquisition unit 107, a calibration start instruction is output to the calibration processing unit 104. Thereafter, as in the case where mode change instruction information is received, the UI control unit 108 receives any of only a normal message transmission instruction, the combination of all coordinates where it has been specified that there are abnormalities and a normal message transmission instruction, or the combination of all coordinates where it has been specified that there are abnormalities and an indication that there are abnormalities, from the calibration processing unit 104 in accordance with the result of the state detection. As in the case where mode change instruction information is received, the UI control unit 108 generates a message corresponding to the received information, or a graphic. In addition, as in the case where mode change instruction information is received, the UI control unit 108 outputs an instruction corresponding to the received information, and the generated message or graphic to the display command output unit 109.

When the UI control unit 108 receives information indicating that calibration is not possible from the calibration processing unit 104, an error message indicating that calibration is not possible is generated, and the generated error message, and an error message superimposition instruction that indicates an instruction to superimposes the error message on the image currently being displayed, are output to the display command output unit 109.

(8-6) In the Case of Calibration Processing End Instruction Information

When the UI control unit 108 receives calibration processing end instruction information from the operation information acquisition unit 107, the mode stored in the mode storage region is changed from the calibration mode to the ordinary mode, and the processing related to calibration ends.

(9) Display Command Output Unit 109

The display command output unit 109 has a function to transmit information received from the UI control unit 108, to the information terminal device 20 that is the source of the request for information.

To be specific, when the display command output unit 109 receives information corresponding to a user request or instruction from the UI control unit 108, the terminal identifier included in information transmitted with the user request or instruction is set as the destination, and display command information that includes the information received from the UI control unit 108 is generated and transmitted via the transmitting/receiving unit 110 to the information terminal device 20 identified by the terminal identifier.

(10) Transmitting/Receiving Unit 110

The transmitting/receiving unit 110 includes the aforementioned NIC, and has a function to carry out the transmitting/receiving of information among the sensor management device 10, the information terminal device 20, and the range measurement sensors 31, . . . , and 38 via the Internet 40.

To be specific, the transmitting/receiving unit 110 transmits request information received from the display command output unit 109 to the information terminal device 20 via the Internet 40. Furthermore, when the transmitting/receiving unit 110 receives information from any of the information terminal device 20 and the range measurement sensors 31, . . . , and 38 via the Internet 40, output is performed to any of the access information acquisition unit 102, the inspection information acquisition unit 103, and the operation information acquisition unit 107 in accordance with the received information.

1.3 Information Terminal Device 20

Here, the functional configuration of the information terminal device 20 is described. The information terminal device 20 is a portable terminal having a touch panel function, and is a tablet-type personal computer, for example.

Figure 10:
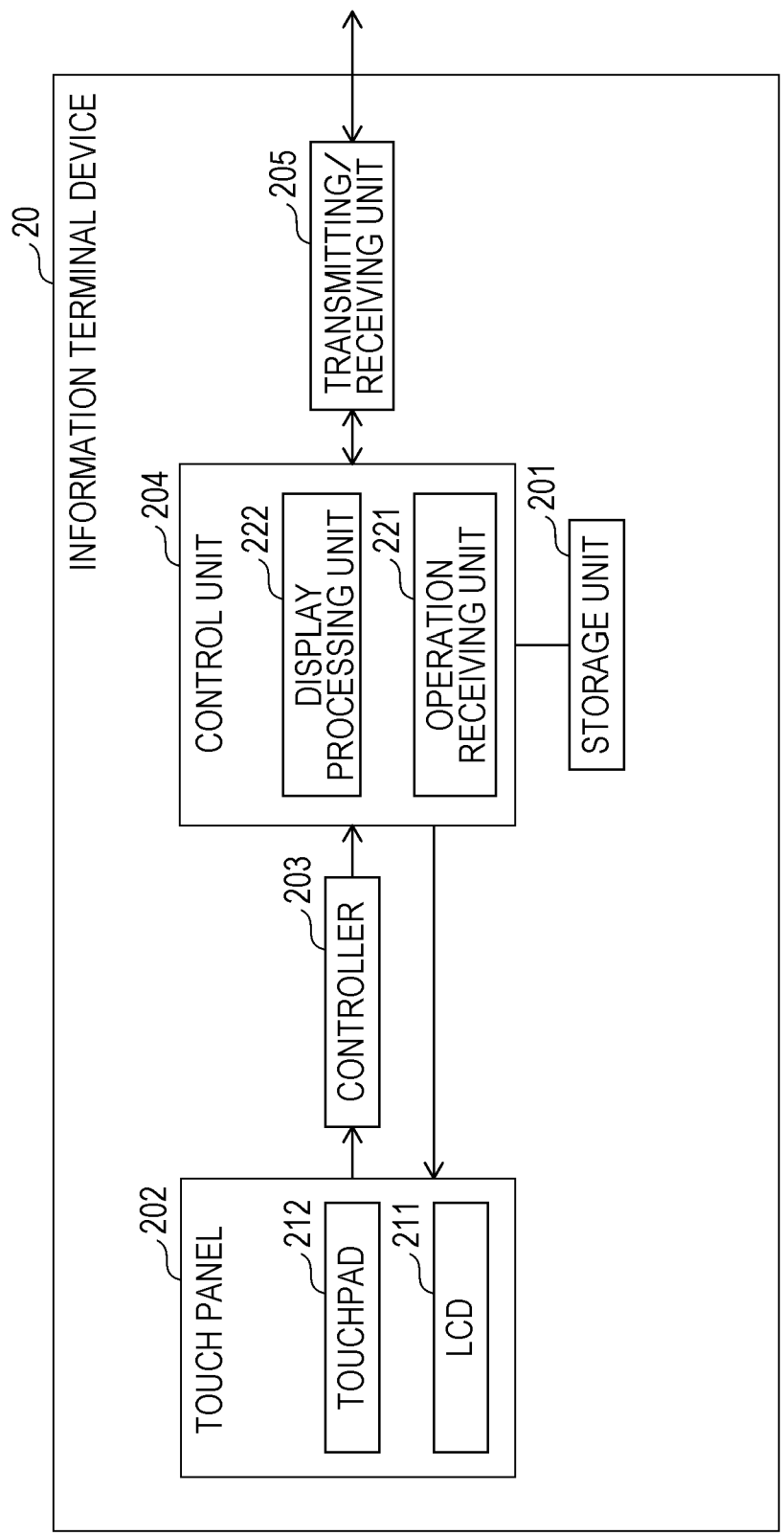
FIG. 10 is a block diagram depicting the configuration of an information terminal device.

As depicted in FIG. 10, the information terminal device 20 is configured from a storage unit 201, a touch panel 202, a controller 203, a control unit 204, and a transmitting/receiving unit 205.

The information terminal device 20 is configured including a processor, a memory, and an NIC, and the functions of the control unit 204 are realized by the processor executing a program stored in the memory. Furthermore, the transmitting/receiving of information via the Internet 40 carried out by the information terminal device 20 is carried out using the NIC.

(1) Storage Unit 201

The storage unit 201 is a memory region in which a terminal identifier for uniquely identifying the information terminal device 20 is stored.

(2) Touch Panel 202

The touch panel 202 includes a liquid crystal display (LCD) 211 and a touchpad 212.

The touchpad 212 is an electrostatic capacitive touch sensor, and the touchpad 212 is provided superimposed on the LCD 211. Furthermore, the touchpad 212 is configured using a transparent member, and is configured in such a way that an image displayed on the LCD 211 is able to be seen.

(3) Controller 203

The controller 203 detects contact such as a finger of the user on the touchpad 212 of the touch panel 202, and while such contact is being detected, outputs the coordinate position of the contact position on the touchpad 212, to the control unit 204 every unit time (for example, 25 ms).

(4) Control Unit 204

The control unit 204 controls all of the functions of the information terminal device 20.

Hereinafter, from among all of the functions of the information terminal device 20, a function relating to the calibration of a range measurement sensor is described.

As depicted in FIG. 10, the control unit 204 has an operation receiving unit 221 and a display processing unit 222.

(4-1) Operation Receiving Unit 221

The operation receiving unit 221 receives a user operation, and transmits information corresponding to the received operation to the sensor management device 10.

To be specific, when an image generated based on information from the sensor management device 10 is being displayed by the LCD 211, the operation receiving unit 221 uses the coordinate position of the contact position on the touchpad 212 received from the controller 203 to specify the user operation, generates any of shelving unit display request information, mode change instruction information, exclusion designation instruction information, exclusion designation end information, calibration processing start instruction information, and calibration processing end instruction information in accordance with the specified operation, and transmits the generated information to the sensor management device 10 via the transmitting/receiving unit 205.

(4-2) Display Processing Unit 222

The display processing unit 222 has a function to generate an image to be displayed by the LCD 211, and cause the generated image to be displayed on the LCD 211.

To be specific, when the display processing unit 222 receives store information from the sensor management device 10, the display processing unit 222 generates a store layout image that represents the arrangement of each product shelving unit in the store, from floor shape coordinates included in the received store information, and shelving unit arrangement information and a shelving unit icon bitmap included in each item of product shelving unit information S-1, S-2, ..., and S-N. At such time, the generated store layout image is arranged on a layout screen plane that is the lowest layer from among the plane layers. In the product shelving unit information S-1, S-2, ..., and S-N, if information (for example, the value "1") indicating that notification to the user is necessary is set in the abnormality notification information, the display processing unit 222 arranges a notification icon bitmap included in the product shelving unit information, on a graphic plane that is a higher level than the layout screen plane. At such time, the notification icon bitmap is arranged in a position corresponding to the position of the product shelving unit where it has been determined that there is an abnormality, arranged on the layout screen plane.

If the display processing unit 222 has received product shelving unit information from the sensor management device 10, the display processing unit 222 generates a shelving unit layout image from each item of shelf arrangement information included in the product shelving unit information, and shelf icon bitmaps corresponding thereto. At such time, the generated shelving unit layout image is arranged on the layout screen plane that is the lowest layer from among the plane layers.

If the display processing unit 222 has received a processing start confirmation message, a normal message, or an error message, the received message is arranged on a message screen plane.

If the display processing unit 222 has received an exclusion designation graphic and/or an abnormality detection graphic, the exclusion designation graphic and/or the abnormality detection graphic is arranged on the graphic plane. At such time, the exclusion designation graphic and/or the abnormality detection graphic is arranged in a position corresponding to the position of a product storage column of a shelf where it has been determined that there is an abnormality, arranged on the layout screen plane.

The display processing unit 222 combines the image, message, and graphics arranged on these planes, and thereby causes an image corresponding to the user operation to be displayed on the LCD 211.

(5) Transmitting/Receiving Unit 205

The transmitting/receiving unit 205 is configured including an NIC. The transmitting/receiving unit 205 has a function to receive information transmitted from the sensor management device 10, and to transmit information generated by the control unit 204 to the sensor management device 10, via the Internet 40.

1.4 Range Measurement Sensor 31

Here, the functional configuration of the range measurement sensor 31 is described. Note that the range measurement sensors 32, ..., and 38 have the same configuration as the range measurement sensor 31, and therefore descriptions thereof have been omitted here.

Figure 11:
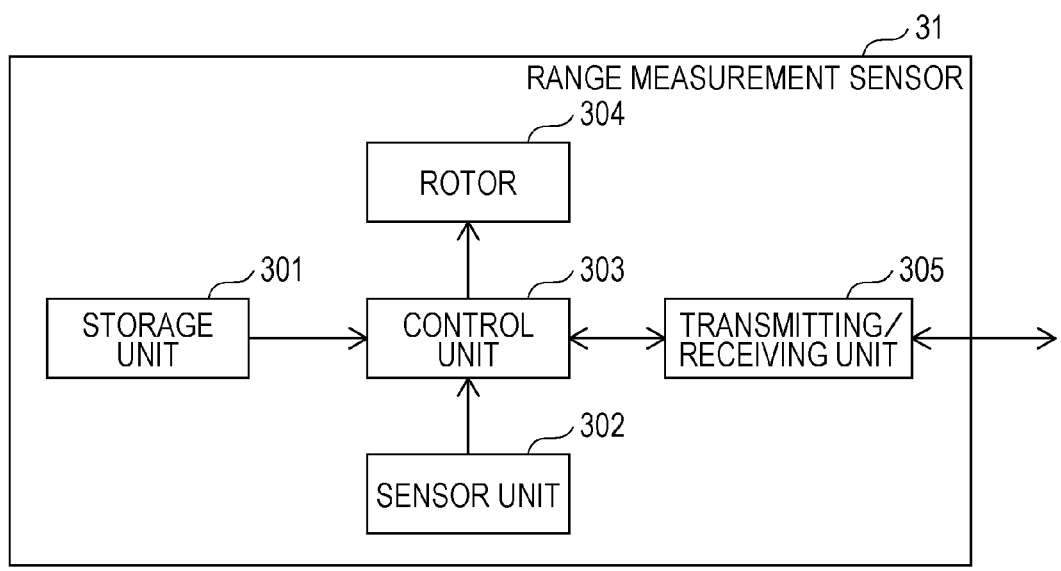
FIG. 11 is a block diagram depicting the configuration of a range measurement sensor.

As depicted in FIG. 11, the range measurement sensor 31 is configured from a storage unit 301, a sensor unit 302, a control unit 303, a rotor 304, and a transmitting/receiving unit 305.

The range measurement sensor 31 is configured including a processor, a memory, and an NIC, and the functions of the control unit 303 are realized by the processor executing a program stored in the memory. Furthermore, the transmitting/receiving of information via the Internet 40 carried out by the range measurement sensor 31 is carried out using the NIC.

(1) Storage Unit 301

The storage unit 301 is a memory region in which a shelving unit identifier allocated to a product shelving unit where the range measurement sensor 31 detects access to products, and a sensor identifier that uniquely identifies the range measurement sensor 31 are stored.

(2) Sensor Unit 302

The sensor unit 302 has a function to project laser light from the light projection opening 31a depicted in FIG. 4B, and receive reflection light reflected by an object, and is provided with the light projector 311, the light receiver 312, the half mirror 313, the polygon mirror 314, and the electric motor 315 depicted in FIG. 5. These constituent elements have already been described, and therefore descriptions thereof have been omitted here.

(3) Control Unit 303

The control unit 303 has a function to carry out overall control of the range measurement sensor 31.

Hereinafter, control relating to measurement and control relating to calibration are described.

(3-1) Control Relating to Measurement

The control unit 303 uses the wavelength of laser light projected by the sensor unit 302, and the wavelength of received reflection light to calculate, by the phase difference method, the distance from the range measurement sensor 31 to an object by which the laser light has been reflected. The phase difference method is already known, and a separate description thereof has therefore been omitted.

The control unit 303 generates access information for which the destination is set as the sensor management device 10, including the light projection angle of laser light, the distance measured at the angle, and a shelving unit identifier stored by the storage unit 301, and the generated access information is transmitted to the sensor management device 10 via the transmitting/receiving unit 305.

(3-2) Control Relating to Calibration

When the control unit 303 receives a calibration command for which the destination matches the sensor identifier stored by the storage unit 301, from the sensor management device 10 via the transmitting/receiving unit 305, the rotor 304 is made to rotate to a calibration angle in the horizontal direction, in accordance with calibration content and the calibration angle included in the received calibration command.

When the calibration by the rotor 304 is completed, the control unit 303 transmits a calibration completion notification to the sensor management device 10 via the transmitting/receiving unit 305.

(4) Rotor 304

The rotor 304 is a rotor that is able to rotate in the horizontal direction, provided in the support depicted in FIG. 4B.

Due to the control performed by the control unit 303, the rotor 304 rotates to an angle indicated by the calibration angle in the direction indicated by the calibration content of the calibration command received by the control unit 303 from the sensor management device 10.

(5) Transmitting/Receiving Unit 305

The transmitting/receiving unit 305 is configured including an NIC. The transmitting/receiving unit 305 has a function to receive a calibration command transmitted from the sensor management device 10, and to transmit access information generated by the control unit 303 to the sensor management device 10, via the Internet 40.

1.5 Regarding Displayed Images

Figure 12:
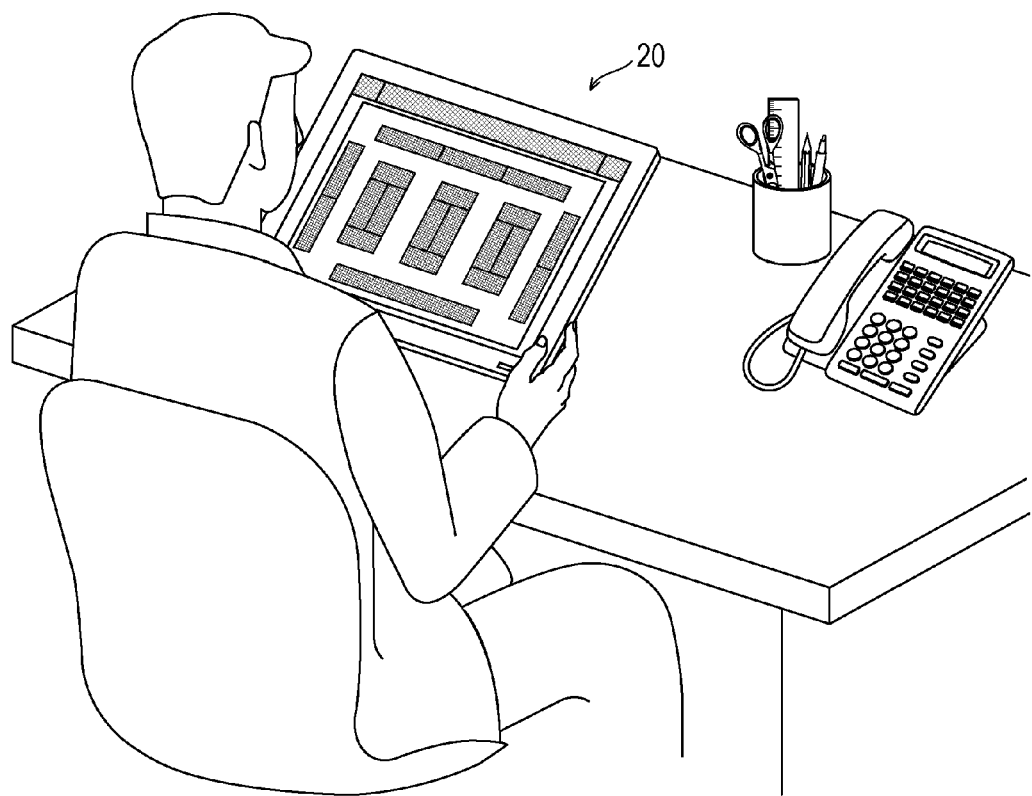
FIG. 12 is a drawing depicting an example of a situation in which an information terminal device is used.

FIG. 12 is a drawing depicting an example of a situation in which the information terminal device 20 is used. The information terminal device 20 is able to display various images such as a store layout image and a shelving unit layout image by receiving touch operations on the screen. The information terminal device 20 is possessed by a staff member such as the manager of a store, and is provided to be used by that staff member.

The display of a store layout image is carried out by store information being received after the information terminal device 20 has transmitted shelving unit display request information.

Figure 13:
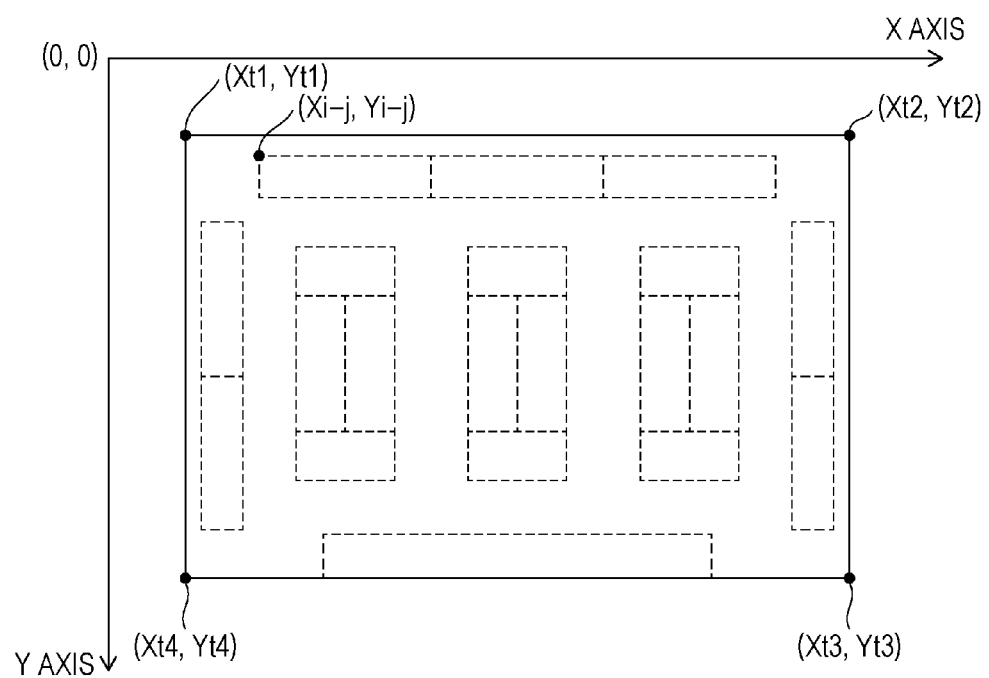
FIG. 13 is a drawing in which shelving unit arrangement information (Xi-j, Yi-j) constituted by product shelving arrangement coordinates, and (Xt1, Yt1), (Xt2, Yt2), (Xt3, Yt3), and (Xt4, Yt4) constituted by floor shape coordinates are plotted in a screen coordinate system.

FIG. 13 is a drawing in which shelving unit arrangement information (Xi-j, Yi-j) constituted by product shelving unit arrangement coordinates, and (Xt1, Yt1), (Xt2, Yt2), (Xt3, Yt3), and (Xt4, Yt4) constituted by floor shape coordinates are plotted in a screen coordinate system. The horizontal direction represents the X axis, and the vertical direction represents the Y axis. In the coordinate system of the screen, if (Xt1, Yt1), (Xt2, Yt2), (Xt3, Yt3), and (Xt4, Yt4) are joined by a line, the overall shape of the floor is drawn in the screen coordinate system. Product shelving unit icons are then arranged in such a way that the upper left becomes (Xi-j, Yi-j).

Figure 14:
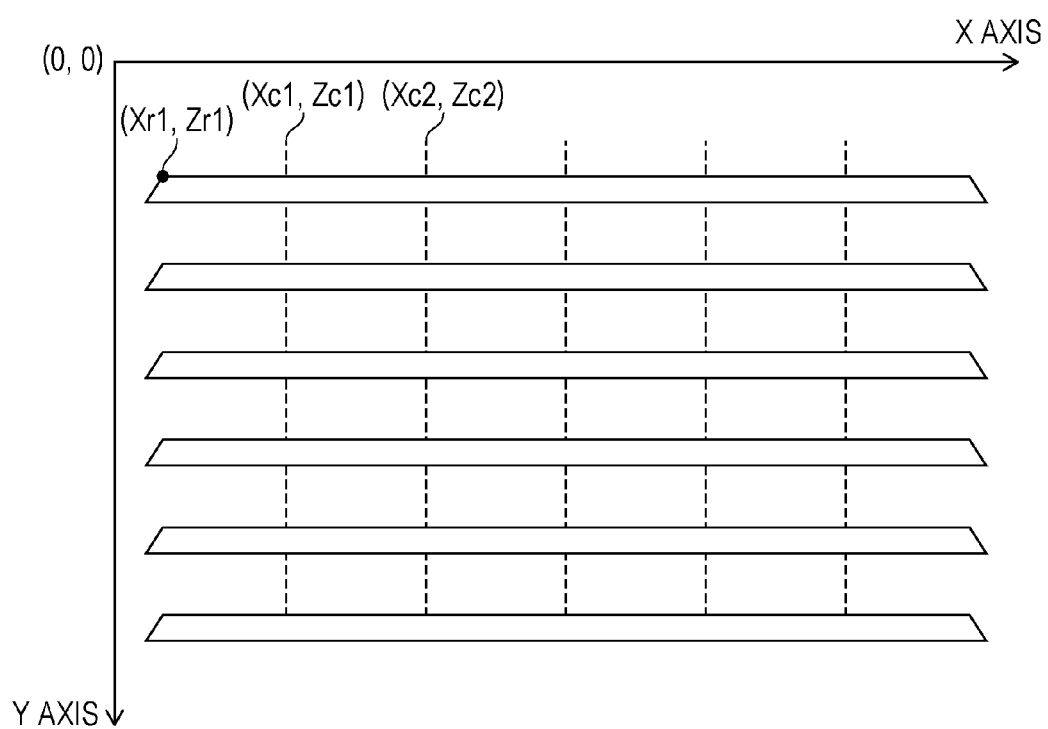
FIG. 14 is a drawing in which shelf arrangement information indicating the arrangement coordinates of shelves, and storage columns indicating the coordinates of product storage columns are plotted in a screen coordinate system.

FIG. 14 is a drawing in which shelf arrangement information indicating the arrangement coordinates of shelves, and storage columns C-1 to C-m and indicating the coordinates of product storage columns are plotted in the screen coordinate system. The horizontal direction represents the X axis, and the vertical direction represents the Y axis. In the coordinate system of the screen, by drawing lines (dashed lines) in the vertical direction from points indicated by the storage columns C-1 to C-m, the regions of the product storage columns in each shelf are drawn. Shelf icons are arranged in such a way that the upper left becomes (Xr1, Zr1).

Figure 15:
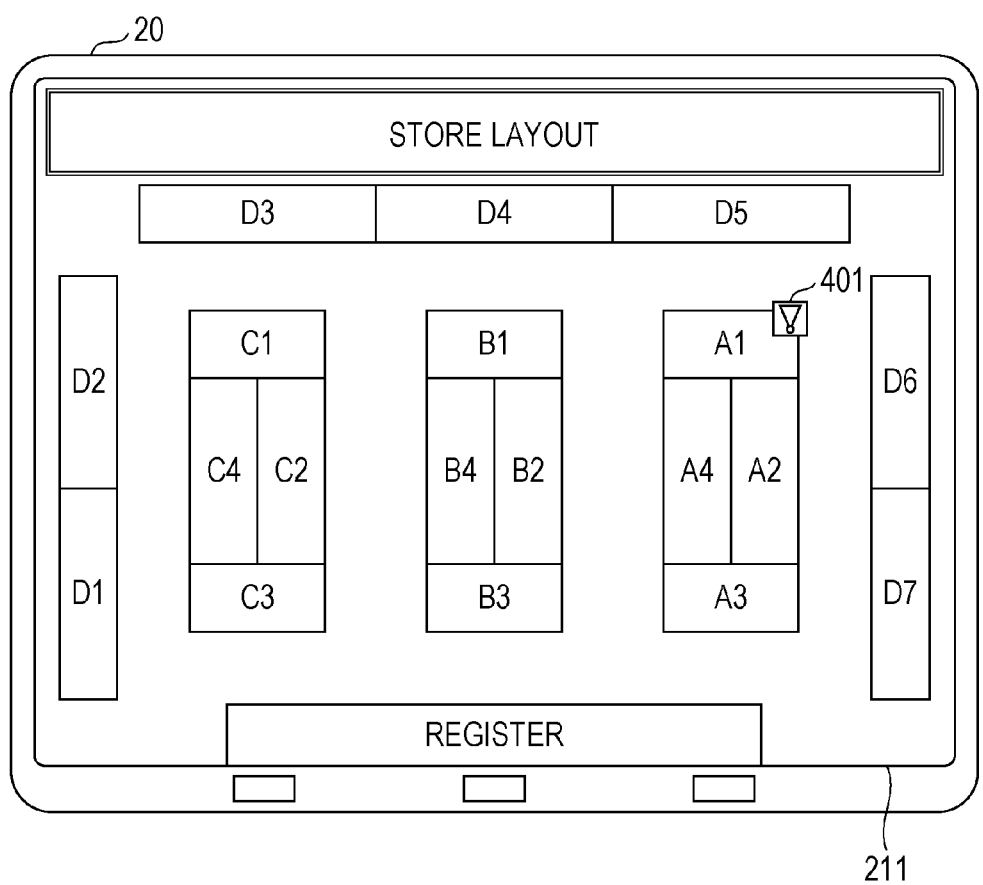
FIG. 15 is a drawing depicting an example of a store layout image created in accordance with product shelving unit arrangement coordinates and floor shape coordinates.

FIG. 15 depicts an example of a store layout image created in accordance with product shelving unit arrangement coordinates and floor shape coordinates. The store layout image is arranged on a layout screen plane that is the lowest layer from among the plane layers.

A1, A2, . . . , B1, B2, . . . , C1, C2, . . . , and D1, D2, . . . depicted in FIG. 15 are shelving unit identifiers of the product shelving units that correspond to the product shelving unit icons displayed. In FIG. 15, a notification icon bitmap (hereinafter, simply referred to as a "notification icon") 401 is superimposed and displayed on the store layout image. In FIG. 15, it is being notified that there is an abnormality in the product shelving unit having the shelving unit identifier "A1".

Figure 16A:
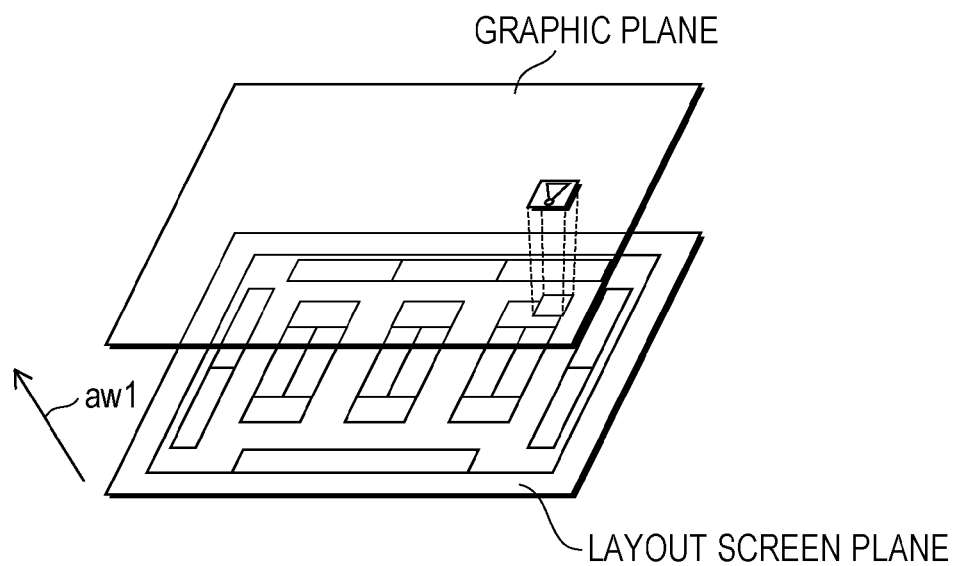
FIG. 16A is a drawing depicting the combining of a graphic plane and a layout screen plane from among plane layers.

FIG. 16A depicts the combining of a graphic plane and a layout screen plane from among the plane layers. As depicted in FIG. 16A, the store layout image is stored on the layout screen plane that is the lowest layer. The notification icon is stored on the graphic plane. The arrow aw1 in FIG. 16A indicates the combining order. That is, the image to be displayed is obtained in the order of the graphic plane being arranged at the side nearest to the front, and the layout screen plane being combined at the rear of this graphic plane.

Figure 16B:
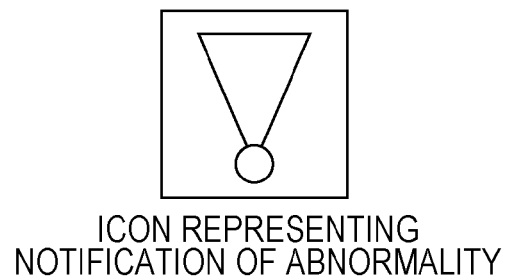
FIG. 16B is a drawing depicting a notification icon that is an example of an item to be superimposed.

In accordance with user operations, either a store layout image or a shelving unit layout image is arranged on the layout screen plane, and notification icons, abnormality detection graphics, and exclusion designation graphics are arranged on the graphic plane. FIG. 16B depicts a notification icon that is an example of an item to be superimposed.

Figure 17:
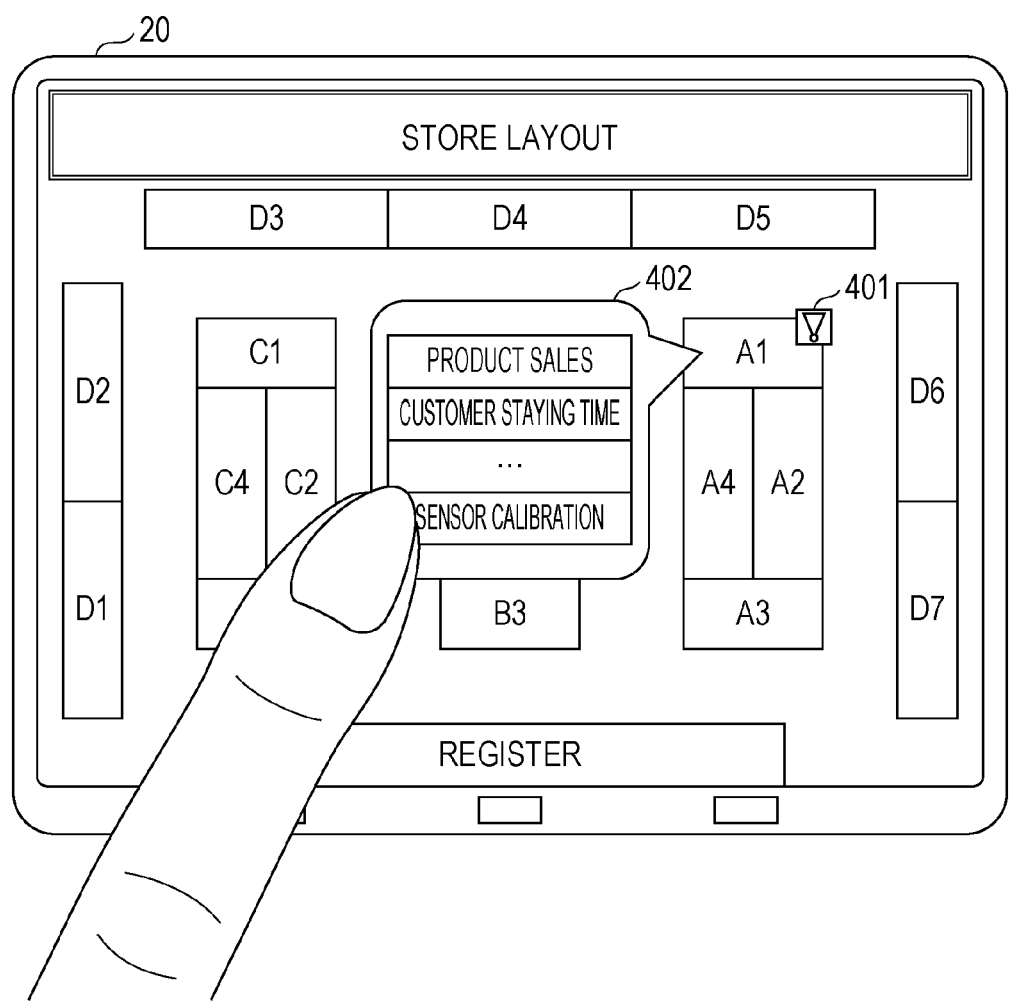
FIG. 17 is a drawing depicting an example of an image that is displayed when a product shelving unit on which a notification icon is being displayed has been pressed.

In the case where the store layout image of FIG. 15 is being displayed, when the user presses a shelving unit icon, a processing menu relating to the pressed product shelving unit is displayed. FIG. 17 depicts an image of when the product shelving unit (the product shelving unit having the A1 shelving unit identifier) on which the notification icon is being displayed in FIG. 15 has been pressed. When the user presses "sensor calibration" in the menu, the information terminal device 20 transmits mode change instruction information to the sensor management device 10. To be specific, the operation receiving unit 221 of the information terminal device 20 acquires product shelving unit information corresponding to the product shelving unit being displayed in the position that has been pressed in the store layout image, from store information received from the sensor management device 10, and temporarily stores the product shelving unit information. Thereafter, when sensor calibration is pressed from the menu being displayed, mode change instruction information that includes the shelving unit identifier included in the product shelving unit information being temporarily stored, and that has the sensor management device 10 set as the destination is generated and transmitted to the sensor management device 10.

After the mode change instruction information has been transmitted, the information terminal device 20 receives, from the sensor management device 10, information for displaying the result of a state inspection from the range measurement sensor that is targeted for calibration.

Figure 18:
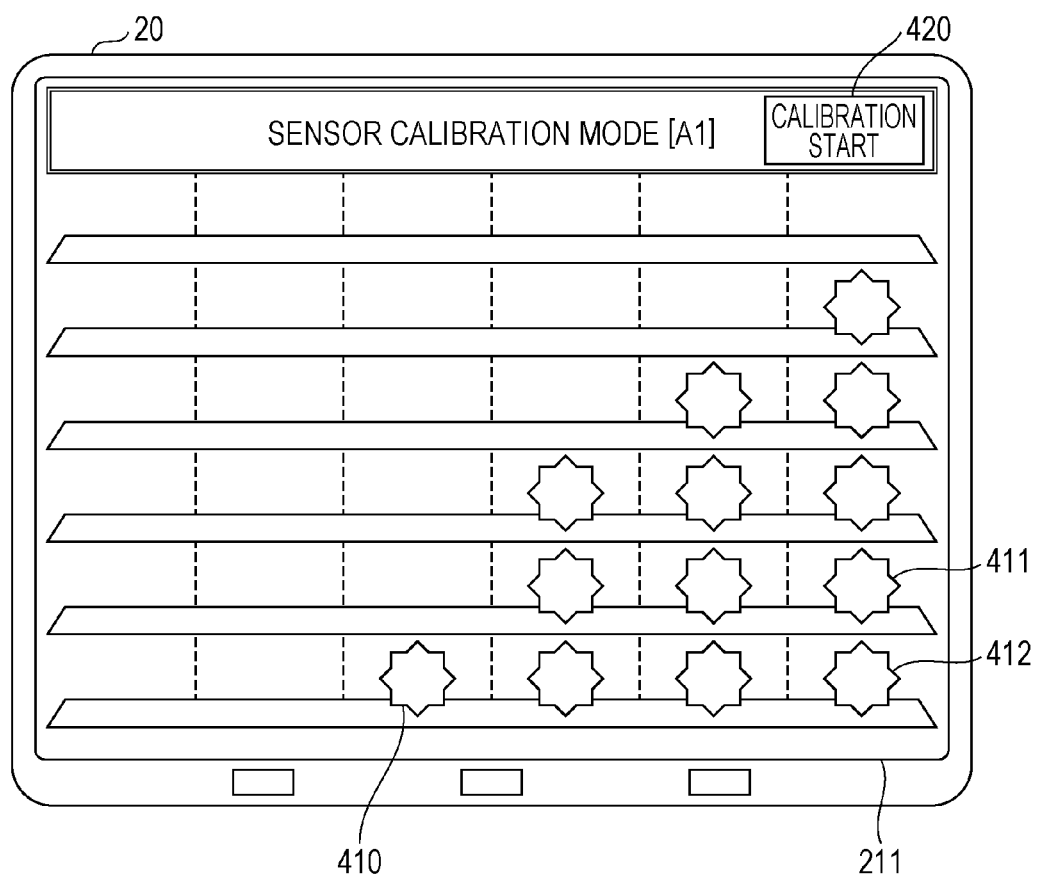
FIG. 18 is a drawing depicting an example of an image in which the result of a state inspection is superimposed on a shelving unit layout image created in accordance with shelf arrangement information and storage columns.

FIG. 18 depicts an example of an image in which the result of a state inspection is superimposed on a shelving unit layout image created in accordance with shelf arrangement information and storage columns C-1 to C-m. Here, as previously mentioned, the shelving unit layout image is arranged on the layout screen plane that is the lowest layer from among the plane layers.

An abnormality detection graphic 410 depicted in FIG. 18 is superimposed and displayed in the arrangement position of a product storage column corresponding to a location where it has been determined that there is an abnormality in the state inspection. Here, as previously mentioned, the abnormality detection graphic 410 is arranged on the graphic plane from among the plane layers. That is, an image to be displayed is obtained in the order of the layout screen plane being combined at the rear of the graphic plane on which the abnormality detection graphic 410 is arranged.

When a calibration start button 420 is pressed while the result of the state inspection depicted in FIG. 18 is being displayed, the information terminal device 20 transmits exclusion designation end information to the sensor management device 10. To be specific, when the calibration start button 420 is pressed, the information terminal device 20 generates exclusion designation end information that includes the terminal identifier stored in the storage unit 201 and has the sensor management device 10 set as the destination, and transmits the exclusion designation end information to the sensor management device 10.

Figure 19:
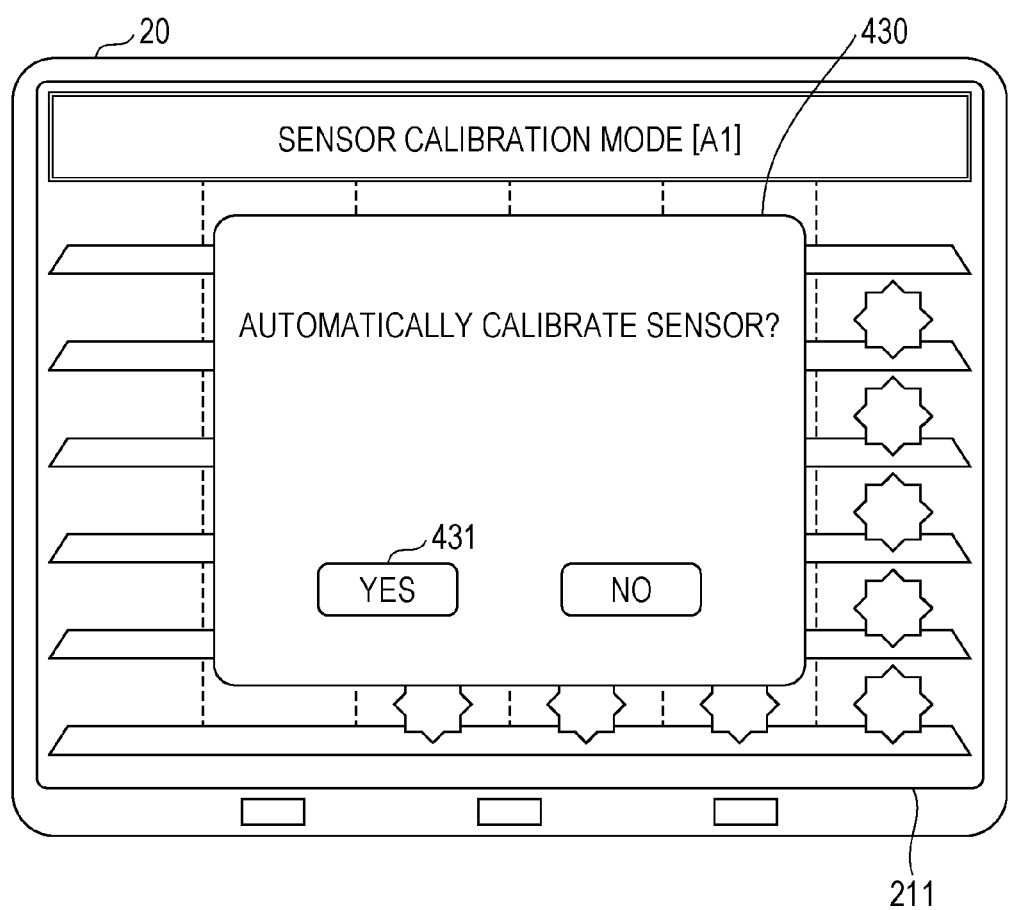
FIG. 19 is a drawing depicting an example of an image in which a processing start confirmation message is superimposed on a shelving unit layout image.

After the exclusion designation end information has been transmitted, the information terminal device 20 receives a processing start confirmation message, and displays the received processing start confirmation message. FIG. 19 depicts an example of an image in which a processing start confirmation message 430 is superimposed on the shelving unit layout image. The shelving unit layout image is arranged on the layout screen plane that is the lowest layer from among the plane layers.

Figure 20:
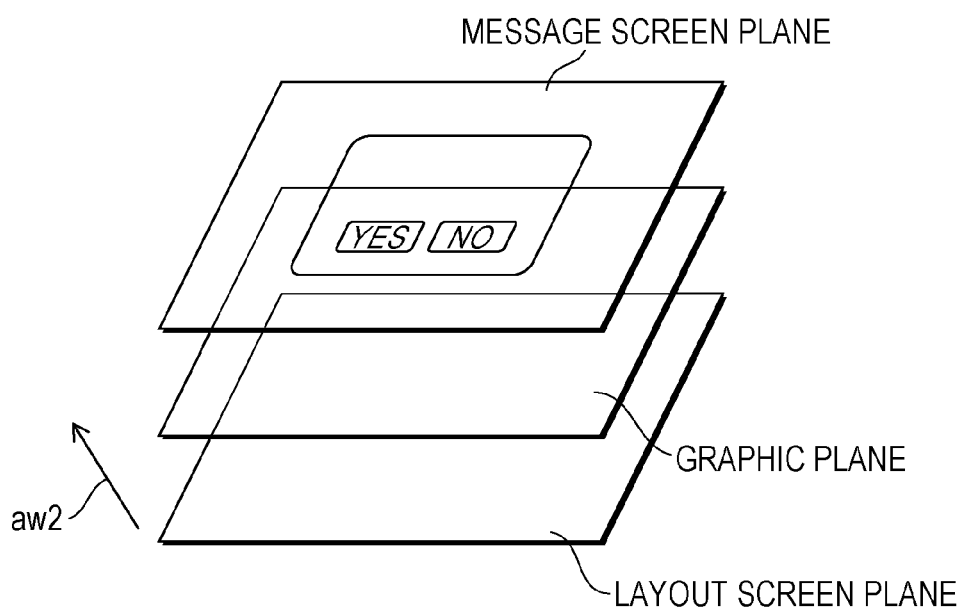
FIG. 20 is a drawing depicting the combining of a message screen plane, a graphic plane, and a layout screen plane from among plane layers.

FIG. 20 depicts the combining of a message screen plane, a graphic plane, and a layout screen plane from among the plane layers. As depicted in FIG. 20, the shelving unit layout image is stored on the layout screen plane that is the lowest layer. A graphic that represents the result of the state inspection is arranged on the graphic plane, and the processing start confirmation message 430 is arranged on the message screen plane. The arrow aw2 in FIG. 20 indicates the combining order. That is, an image to be displayed is obtained in the order of the message screen plane being arranged at the side nearest to the front, the graphic plane being arranged next, and the layout screen plane being combined at the rear of this graphic plane.

In FIG. 19, when the "YES" button 431 in the processing start confirmation message 430 being displayed is pressed, the information terminal device 20 transmits calibration processing start instruction information to the sensor management device 10. To be specific, when the button 431 is pressed, the information terminal device 20 acquires a shelving unit identifier and a sensor identifier from the product shelving unit information being temporarily stored, generates calibration processing start instruction information that includes the shelving unit identifier and the sensor identifier acquired and has the sensor management device 10 set as the destination, and transmits the calibration processing start instruction information to the sensor management device 10.

Figure 21:
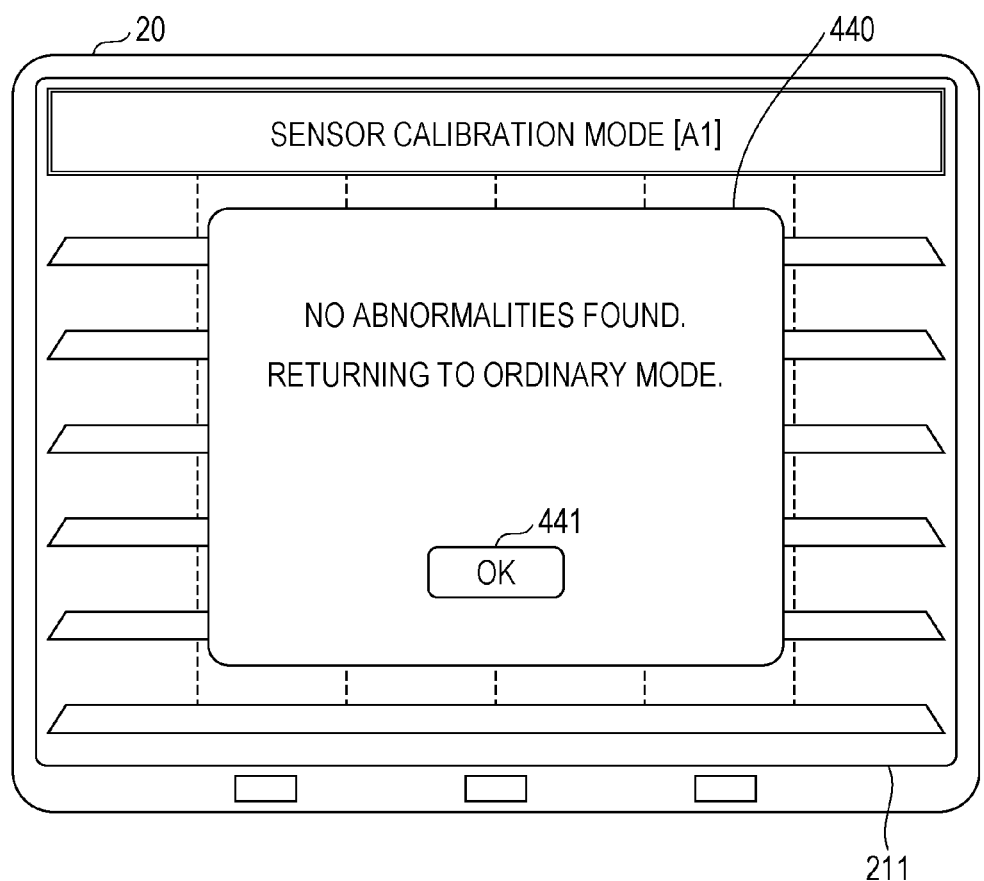
FIG. 21 is a drawing depicting an example of an image that is displayed when there were no abnormalities in a state inspection carried out after calibration.

Thereafter, in the information terminal device 20, information for displaying the result of a state inspection carried out after calibration is received, and an image generated based on the received information is displayed. FIG. 21 depicts an example of an image when there were no abnormalities in the state inspection carried out after calibration. As depicted in FIG. 21, if there are no abnormalities, an image is displayed in which a normal message 440 that is arranged on the message screen plane is superimposed on a shelving unit layout arranged on the layout screen plane, without any graphics been arranged on the graphic plane. Here, when a button 441 in the normal message 440 is pressed, calibration processing end instruction information is transmitted to the sensor management device 10, and mode switching from the calibration mode to the ordinary mode is carried out in the sensor management device 10. The operation relating to calibration processing thereby ends.

Heretofore, images that are displayed based on screen transitions when exclusion designation is not carried out have been described. Hereinafter, images that are displayed based on screen transitions when exclusion designation has been carried out are described.

Figure 22:
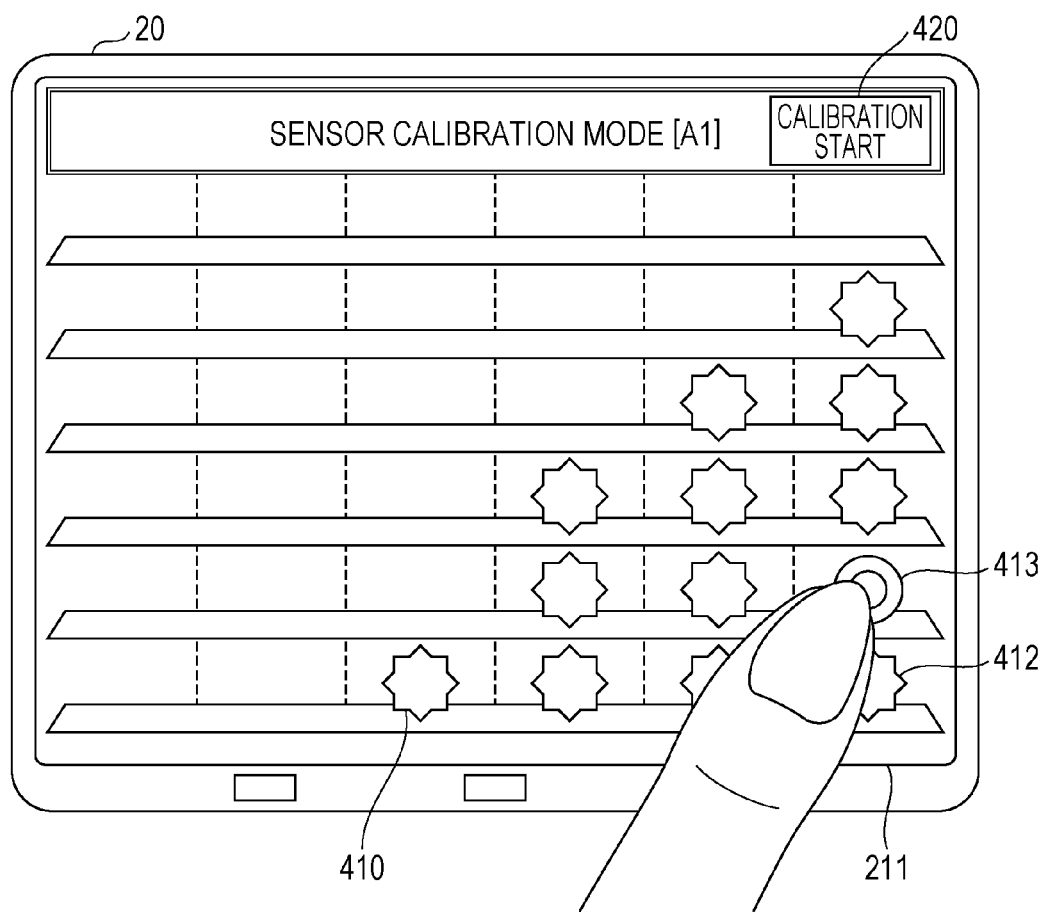
FIG. 22 is a diagram illustrating exclusion designation.
Figure 23:
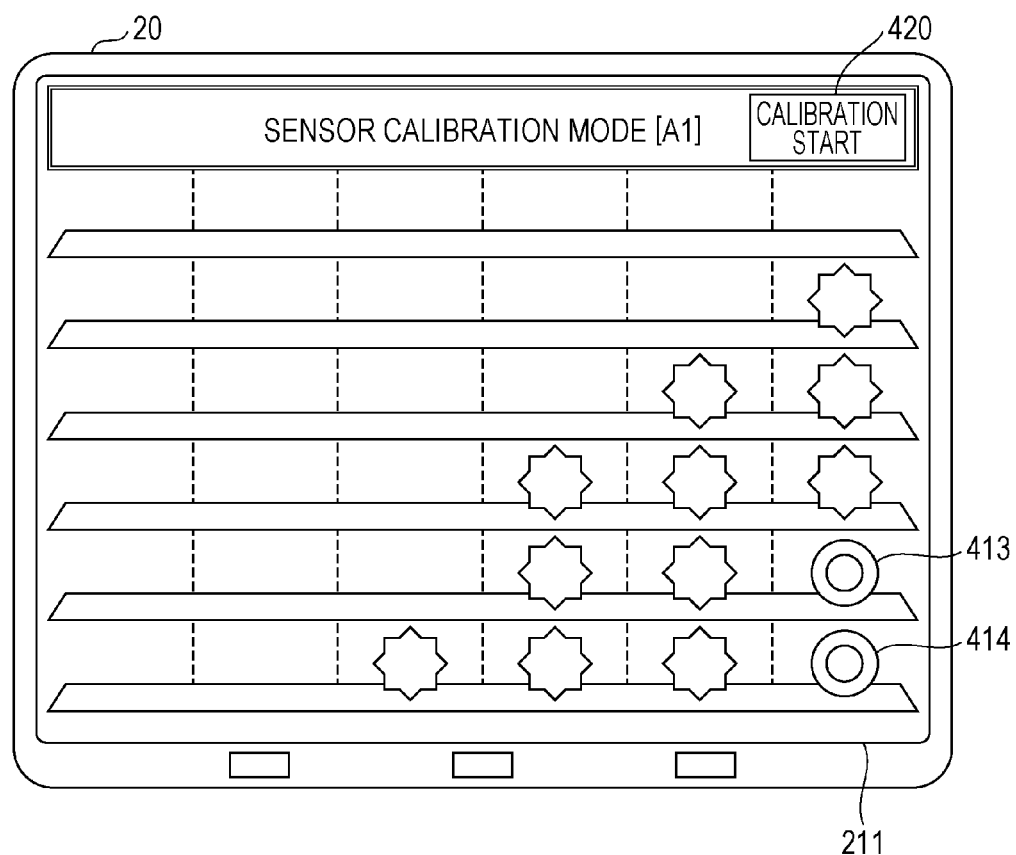
FIG. 23 is a drawing depicting an example of an image that is displayed after exclusion designation has been carried out.

When the user designates a location to be excluded, an abnormality detection graphic that is displayed in a location that the user wishes to be excluded is pressed from among abnormality detection graphics displayed on the LCD 211. For example, in the case where the image depicted in FIG. 18 is being displayed, it is possible to designate the exclusion of the location where an abnormality detection graphic 411 is being displayed, by pressing the abnormality detection graphic 411. At such time, as depicted in FIG. 22, the graphic displayed in the exclusion-designated location is changed from the abnormality detection graphic 411 to an exclusion designation graphic 413. FIG. 23 depicts the result of the abnormality detection graphics 411 and 412 having been pressed in the image depicted in FIG. 18. When the calibration start button 420 is pressed in this state, the information terminal device 20 transmits exclusion designation end information to the sensor management device 10.

Figure 24:
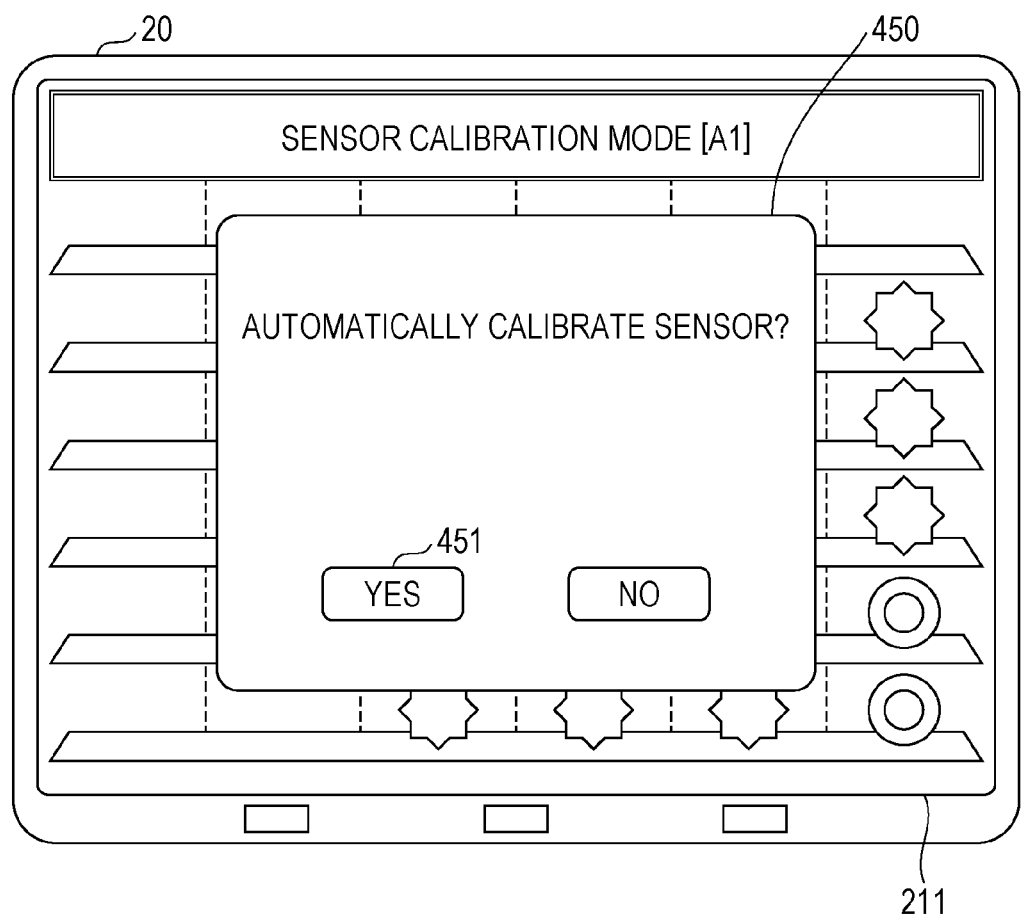
FIG. 24 is a drawing depicting an example of an image in which a processing start confirmation message is superimposed after exclusion designation has been carried out.

After the exclusion designation end information has been transmitted, as previously mentioned, the information terminal device 20 receives a processing start confirmation message from the sensor management device 10, and superimposes and displays the received processing start confirmation message on the image (the image depicted in FIG. 23) currently being displayed. FIG. 24 depicts an example of an image in which a processing start confirmation message 450 is superimposed on the image currently being displayed. As previously mentioned, the image depicted in FIG. 24 is obtained in the order of the message screen plane on which the processing start confirmation message is arranged being arranged at the side nearest to the front, the graphic plane being arranged next, and the layout screenplay being combined at the rear of this graphic plane.

In FIG. 24, when a "YES" button 451 in the processing start confirmation message 450 being displayed is pressed, the information terminal device 20 transmits calibration processing start instruction information to the sensor management device 10.

Figure 25:
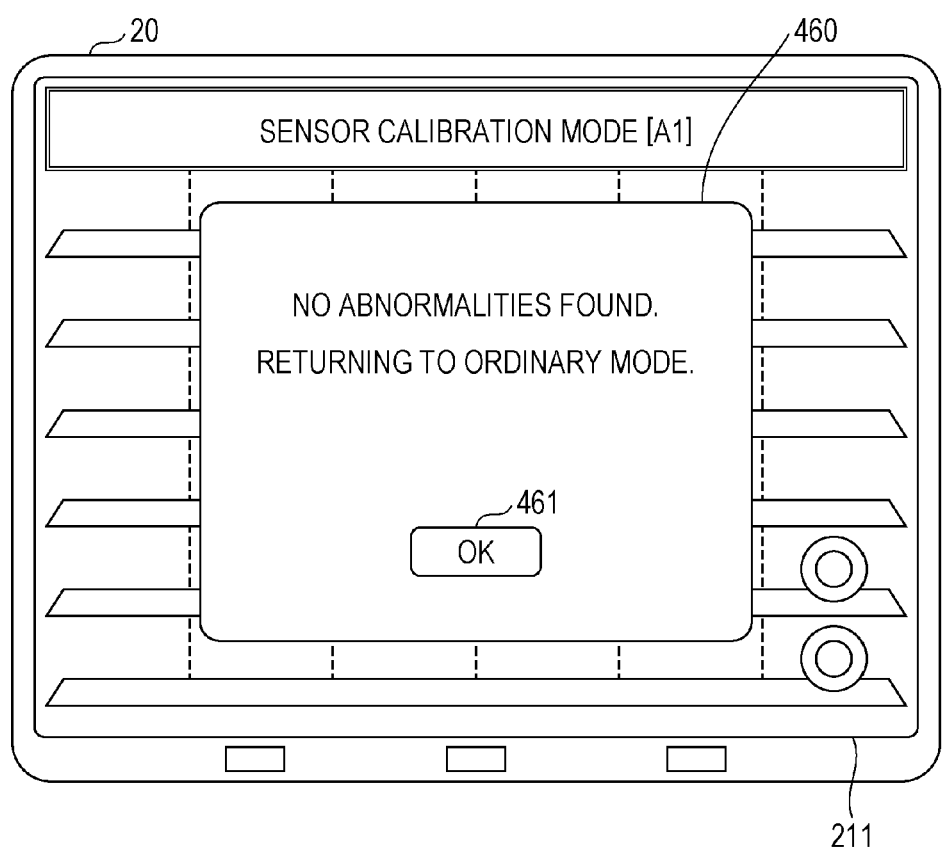
FIG. 25 is a drawing depicting an example of an image that is displayed when there were no abnormalities in a state inspection carried out after exclusion designation and calibration.

Thereafter, the information terminal device 20 receives information for displaying the result of a state inspection carried out after calibration, and displays an image generated based on the received information. FIG. 25 depicts an example of an image when there were no abnormalities in the state inspection carried out after calibration. As depicted in FIG. 25, if there are no abnormalities other than the exclusion-designated locations, only the exclusion designation graphics are arranged on the graphic plane, and an image is displayed that is formed from the combination of the shelving unit layout arranged on the layout screen plane, the exclusion designation graphics arranged on the graphic plane, and a normal message 460 arranged on the message screen plane. Here, when a button 461 in the normal message 460 is pressed, calibration processing end instruction information is transmitted to the sensor management device 10, and mode switching from the calibration mode to the ordinary mode is carried out in the sensor management device 10.

Heretofore, images that are displayed based on screen transitions when exclusion designation has been carried out have been described.

Next, images that are displayed when the sensor management device 10 determines that calibration is not possible are described.

Figure 26:
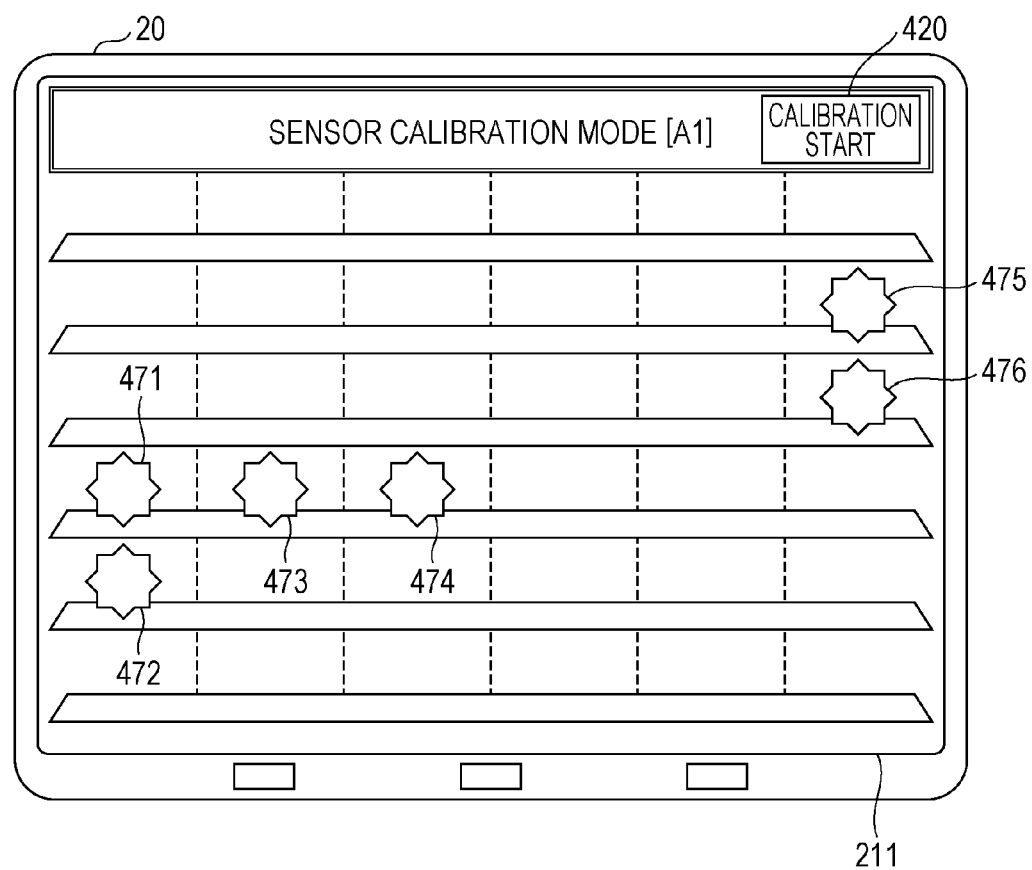
FIG. 26 is a drawing depicting an example of an image that displays the result of a state inspection.

FIG. 26 is a drawing depicting an example of an image that displays the result of a state inspection. FIG. 26 depicts a state in which there are abnormality detection graphics 471, 472, 473, and 474 at the left side when facing the product shelving unit and abnormality detection graphics 475 and 476 at the right side when facing the product shelving unit, not a state in which the locations where there are abnormalities are concentrated in locations at either the left side, right side, or center when facing the product shelving unit. This kind of state is referred to as a state having scattered abnormality locations. In a state having scattered abnormality locations, in FIG. 26 for example, when the range measurement sensor is rotated to the right, the abnormalities indicated by each of the abnormality detection graphics 475 and 476 are resolved; however, the abnormalities at the locations indicated by each of the abnormality detection graphics 471, 472, 473, and 474 are not resolved. Furthermore, when the range measurement sensor is rotated to the left, the abnormalities indicated by each of the abnormality detection graphics 471, 472, 473, and 474 are resolved; however, the abnormalities at the locations indicated by each of the abnormality detection graphics 475 and 476 are not resolved. Therefore, in the case of a state having scattered abnormality locations, the calibration processing unit 104 of the sensor management device 10 determines that calibration is not possible.

In the image depicted in FIG. 26, when the calibration start button 420 is pressed, the information terminal device 20 transmits exclusion designation end information to the sensor management device 10. Thereafter, in the processing start confirmation message that is displayed, when the button (the button 431 depicted in FIG. 19) that instructs the start of calibration processing is pressed, the information terminal device 20 transmits calibration processing start instruction information to the sensor management device 10. At such time, in the sensor management device 10, as previously mentioned, it is determined that calibration is not possible, and an error message is transmitted to the information terminal device 20.

Figure 27:
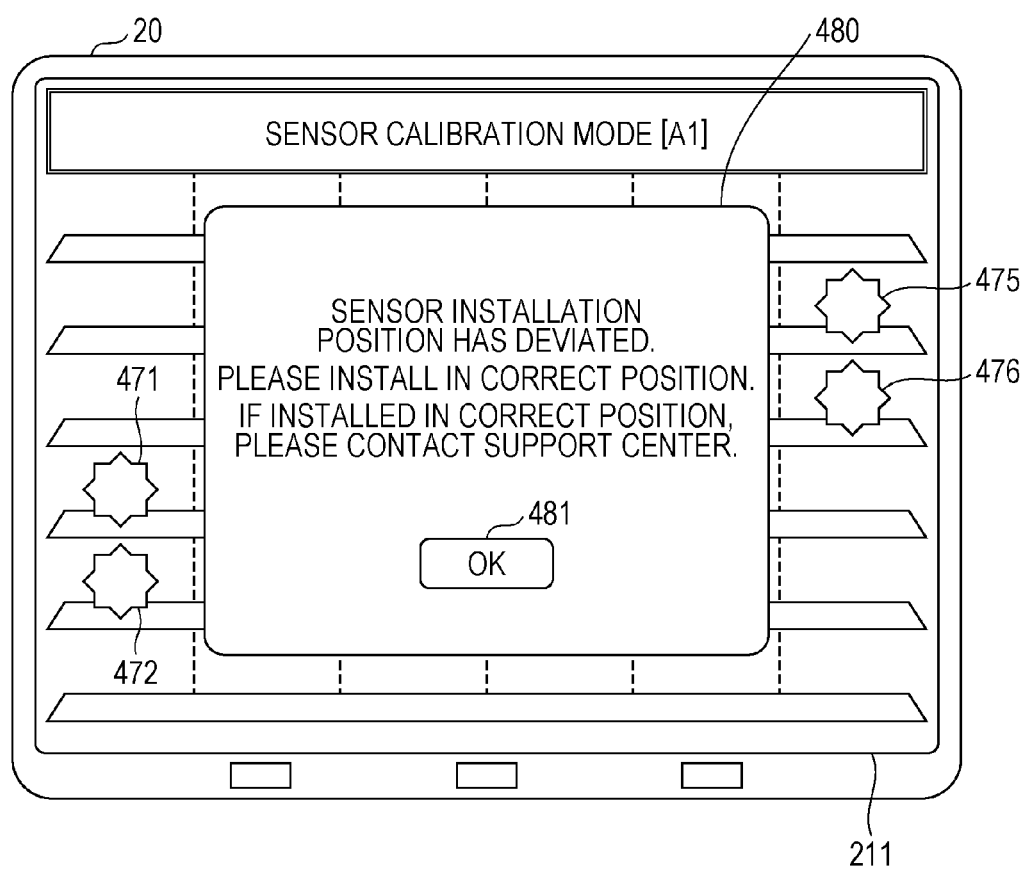
FIG. 27 is a drawing depicting an example of a screen that displays an error message.

FIG. 27 is a drawing depicting an example of a screen that displays an error message. In FIG. 27, an error message 480 is superimposed and displayed on an image displaying the result of the state inspection. To be specific, an image is displayed that is formed from the combination of a shelving unit layout arranged on the layout screen plane, the graphic plane on which abnormality detection graphics are arranged, and the error message 480 arranged on the message screen plane. Here, when a button 481 in the error message 480 is pressed, calibration processing end instruction information is transmitted to the sensor management device 10, and mode switching from the calibration mode to the ordinary mode is carried out in the sensor management device 10.

1.6 Operation

Hereinafter, operations relating to the sensor control system 1 are described.

(1) Processing Performed by the Sensor Control System 1

Figure 28:
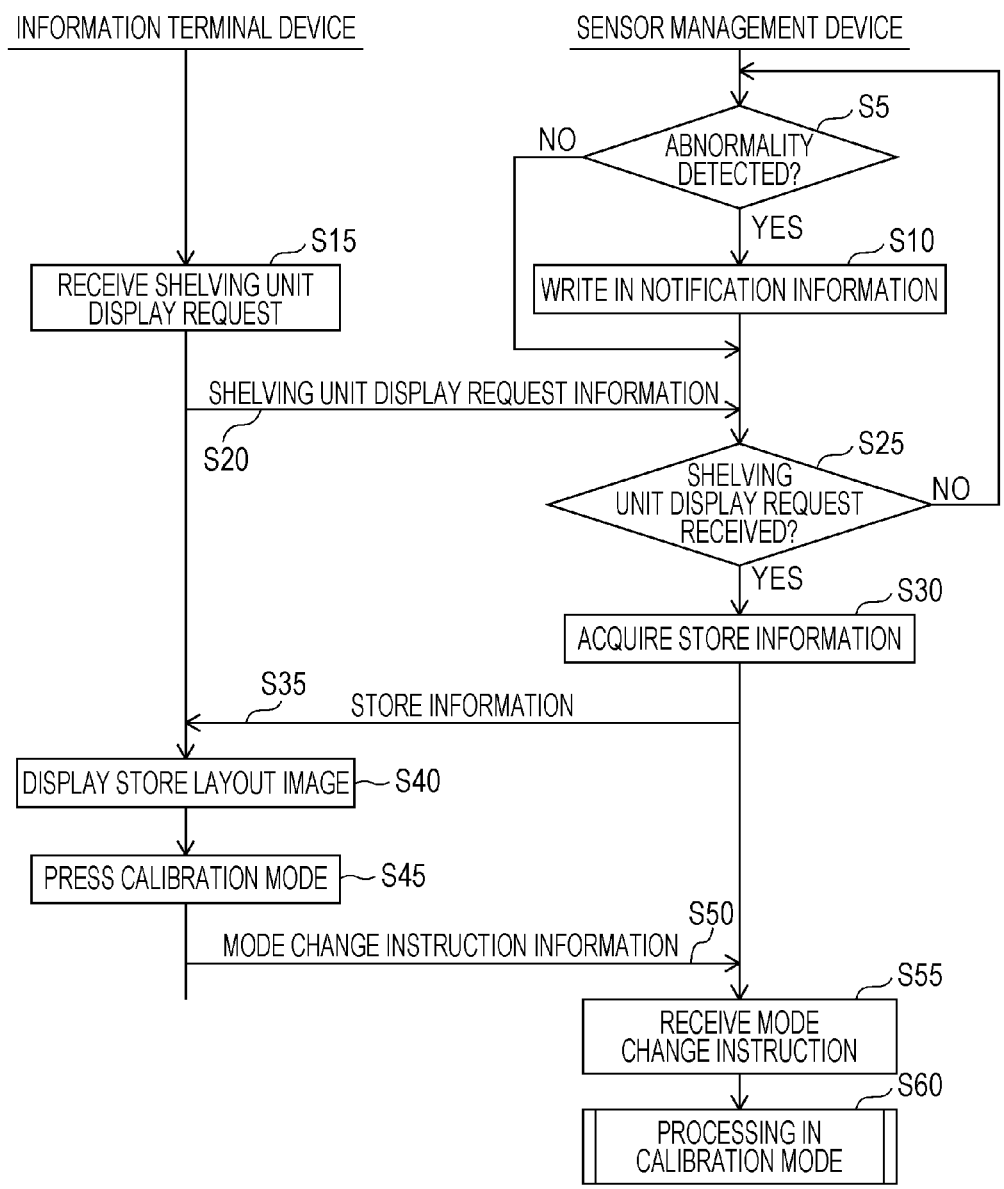
FIG. 28 is a flow diagram depicting processing carried out by a sensor control system up to calibration processing.

Here, the processing carried out by the sensor control system 1 up to the calibration processing is described using the flow diagram depicted in FIG. 28.

The access information acquisition unit 102 of the sensor management device 10 determines whether or not the same distance (a distance that is shorter than the distance to the shop floor) has been continuously measured for a predetermined time at the same light projection angle with respect to each range measurement sensor (step S5).

If the determination is positive ("yes" in step S5), information indicating that notification is required is written in abnormality notification information in the product shelving unit information of the product shelving unit corresponding to the range measurement sensor with which the same distance (a distance that is shorter than the distance to the shop floor) has been continuously measured for the predetermined time at the same light projection angle (step S10). If the determination is negative ("no" in step S5), processing transfers to step S25.

When the operation receiving unit 221 of the information terminal device 20 receives an operation relating to a shelving unit display request from the user (step S15), shelving unit display request information is transmitted to the sensor management device 10 (step S20).

The operation information acquisition unit 107 of the sensor management device 10 determines whether or not the shelving unit display request information has been received (step S25). If it is determined that the shelving unit display request information has not been received ("no" in step S25), processing returns to step S5.

If the operation information acquisition unit 107 determines that the shelving unit display request information has been received ("yes" in step S25), the UI control unit 108 acquires store information including a store identifier included in the shelving unit display request information from the layout information storage unit 101 (step S30), and transmits the store information to the information terminal device 20 (step S35).

The display processing unit 222 of the information terminal device 20 displays a store layout image on the basis of the store information received from the sensor management device 10 (step S40).

After a product shelving unit icon in the store layout image has been pressed, if "calibration mode" is pressed when the menu is displayed (step S45), the operation receiving unit 221 of the information terminal device 20 generates mode change instruction information, and transmits the mode change instruction information to the sensor management device 10 (step S50).

When the sensor management device 10 receives the mode change instruction information from the information terminal device 20 (step S55), the current mode is changed from the ordinary mode to the calibration mode, and processing in the calibration mode is executed (step S60).

(2) Operation of Sensor Management Device 10 During Calibration Mode

Figure 29:
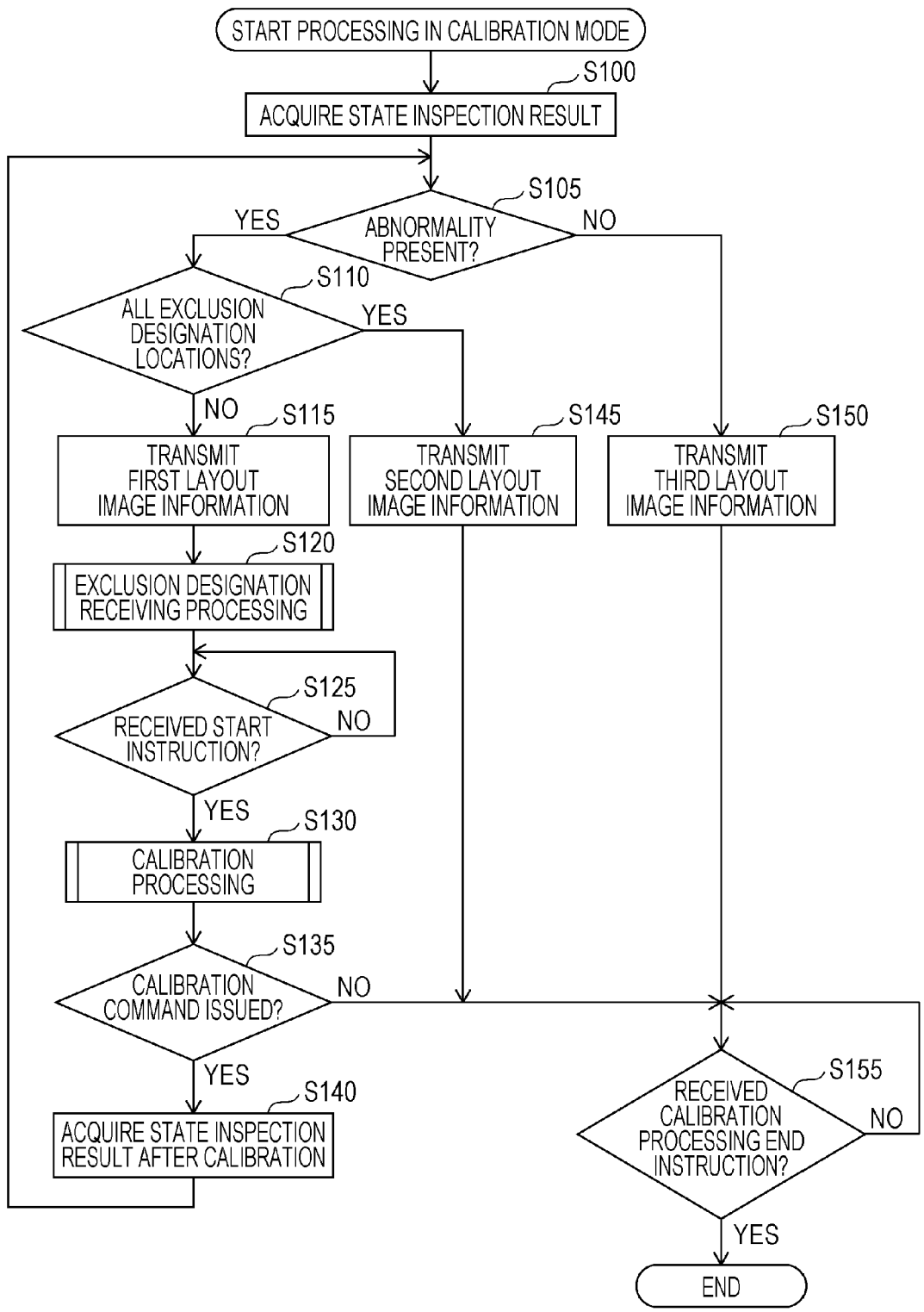
FIG. 29 is a flow diagram depicting processing performed by a sensor management device during a calibration mode.

Here, the processing performed by the sensor management device 10 during the calibration mode, carried out in step S60 depicted in FIG. 28, is described using the flow diagram depicted in FIG. 29.

The calibration processing unit 104 successively acquires access information that is the result of a state inspection, from a range measurement sensor that is targeted for calibration (step S100).

The calibration processing unit 104 determines whether or not there is an abnormality on the basis of the acquired access information (step S105).

If it is determined that there is an abnormality ("yes" in step S105), the calibration processing unit 104 uses the exclusion designation information table T100 to determine whether or not all of the locations where it has been determined that there is an abnormality are included in a range indicated by any of the exclusion designation information of the exclusion designation information group corresponding to the shelving unit identifier of the product shelving unit corresponding to the range measurement sensor that is targeted for calibration (step S110).

If the calibration processing unit 104 makes a negative determination, that is, if it is determined that at least one location where it has been determined that there is an abnormality is not included in the range indicated by an exclusion designation ("no" in step S110), the UI control unit 108 transmits information (hereinafter, referred to as "first layout image information") that includes at least one or more abnormality detection graphic and product shelving unit information of the product shelving unit corresponding to the range measurement sensor that is targeted for calibration, to the information terminal device 20 via the display command output unit 109 (step S115). Here, if none of the locations where it has been determined that there is an abnormality are included in the range indicated by an exclusion designation, an abnormality detection graphic and product shelving unit information are included in the first layout image information, and if some locations from among all of the locations where it has been determined that there is an abnormality are included in the range indicated by an exclusion designation, and the remaining locations are not included in the range indicated by the exclusion designation, an exclusion designation graphic, an abnormality detection graphic, and product shelving unit information are included in the first layout image information.

The sensor management device 10 carries out exclusion designation receiving processing after the first layout image information has been transmitted (step S120).

After the exclusion designation receiving processing has ended, the operation information acquisition unit 107 determines whether or not calibration processing start instruction information that instructs the start of calibration processing has been received from the information terminal device 20 (step S125).

If it is determined that the operation information acquisition unit 107 has received calibration processing start instruction information from the information terminal device 20 ("yes" in step S125), the sensor management device 10 carries out calibration processing (step S130). If it is determined that a calibration processing start instruction has not been received ("no" in step S125), processing waits for calibration processing start instruction information to be received.

After calibration processing has ended, the calibration processing unit 104 determines whether or not a calibration command has been issued by the sensor processing unit 106 (step S135).

If it is determined that a calibration command has been issued ("yes" in step S135), the calibration processing unit 104 acquires access information that is the result of a state inspection after calibration (step S140). Thereafter, processing returns to step S105.

If the calibration processing unit 104 determines that a calibration command has not been issued ("no" in step S135), the UI control unit 108 determines whether or not calibration processing end instruction information has been received from the information terminal device 20 (step S155).

If it is determined that calibration processing end instruction information has been received ("yes" in step S155), the UI control unit 108 changes the mode from the calibration mode to the ordinary mode, and processing ends.

If it is determined that calibration processing end instruction information has not been received ("no" in step S155), the UI control unit 108 waits for calibration processing end instruction information to be received.

If the calibration processing unit 104 determines that all of the locations where it has been determined that there is an abnormality are included in the range indicated by an exclusion designation ("yes" in step S110), the UI control unit 108 transmits information (hereinafter, referred to as "second layout image information") that includes an exclusion designation graphic, product shelving unit information of the product shelving unit corresponding to the range measurement sensor that is targeted for calibration, and a normal message, to the information terminal device 20 via the display command output unit 109 (step S145), and, thereafter, processing transfers to step S155.

If the calibration processing unit 104 determines that there are no abnormalities on the basis of the access information ("no" in step S105), the UI control unit 108 transmits information (hereinafter, referred to as "third layout image information") that includes product shelving unit information of the product shelving unit corresponding to the range measurement sensor that is targeted for calibration, and a normal message, to the information terminal device 20 via the display command output unit 109 (step S150), and, thereafter, processing transfers to step S155.

(3) Exclusion Designation Receiving Processing

Figure 30:
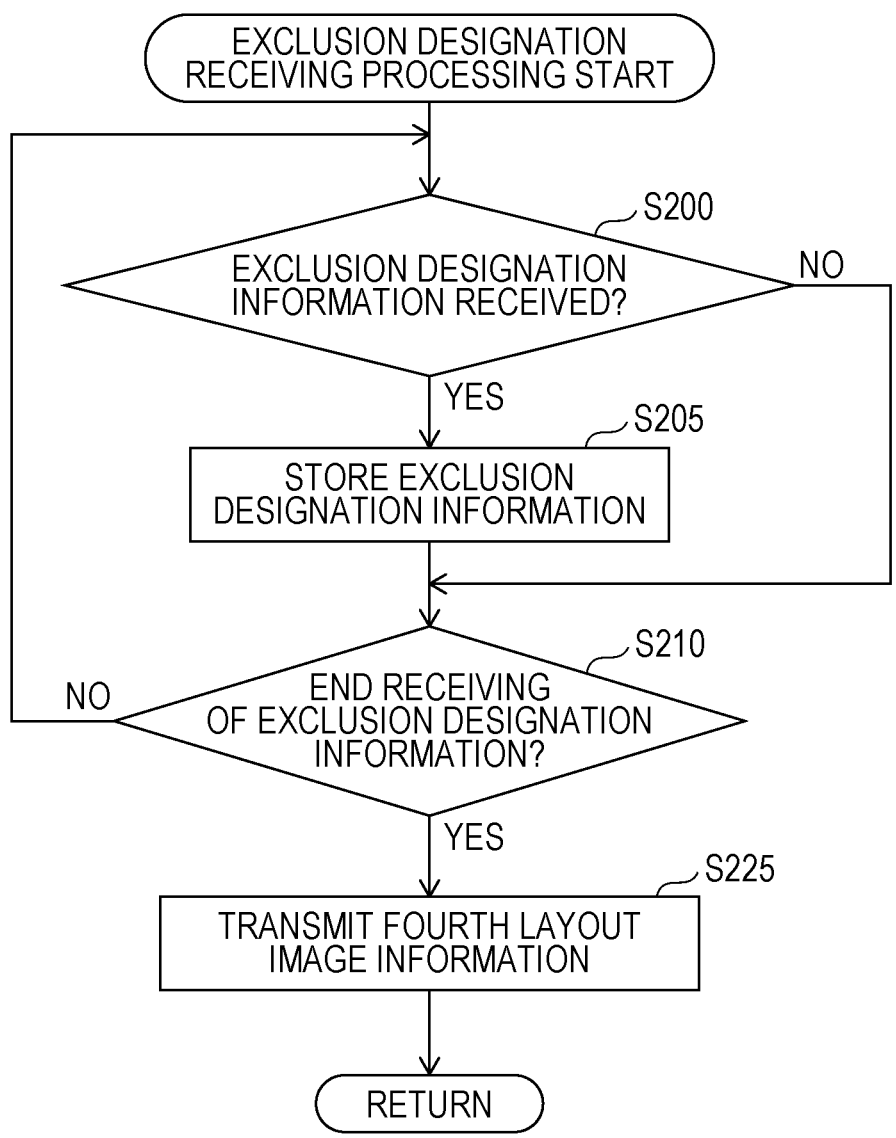
FIG. 30 is a flow diagram depicting exclusion designation receiving processing.

Here, the exclusion designation receiving processing carried out in step S120 depicted in FIG. 29 is described using the flow diagram depicted in FIG. 30.

The calibration processing unit 104 determines whether or not exclusion designation information has been received from the information terminal device 20 (step S200).

If it is determined that exclusion designation information has been received ("yes" in step S200), the calibration processing unit 104 writes the received exclusion designation information in the exclusion designation information storage unit 105 (step S205). At such time, the UI control unit 108 outputs a graphic change instruction and an exclusion designation graphic to the display command output unit 109.

The UI control unit 108 determines whether or not exclusion designation end instruction information has been received from the information terminal device 20 (step S210).

If it is determined that exclusion designation end instruction information has been received ("yes" in step S210), the UI control unit 108 transmits information (hereinafter, referred to as "fourth layout image information") that includes a processing start confirmation message and a confirmation message superimposition instruction, to the information terminal device 20 via the display command output unit 109 (step S225).

If it is determined that exclusion designation end instruction information has not been received ("no" in step S210), processing returns to step S200.

(4) Calibration Processing

Figure 31:
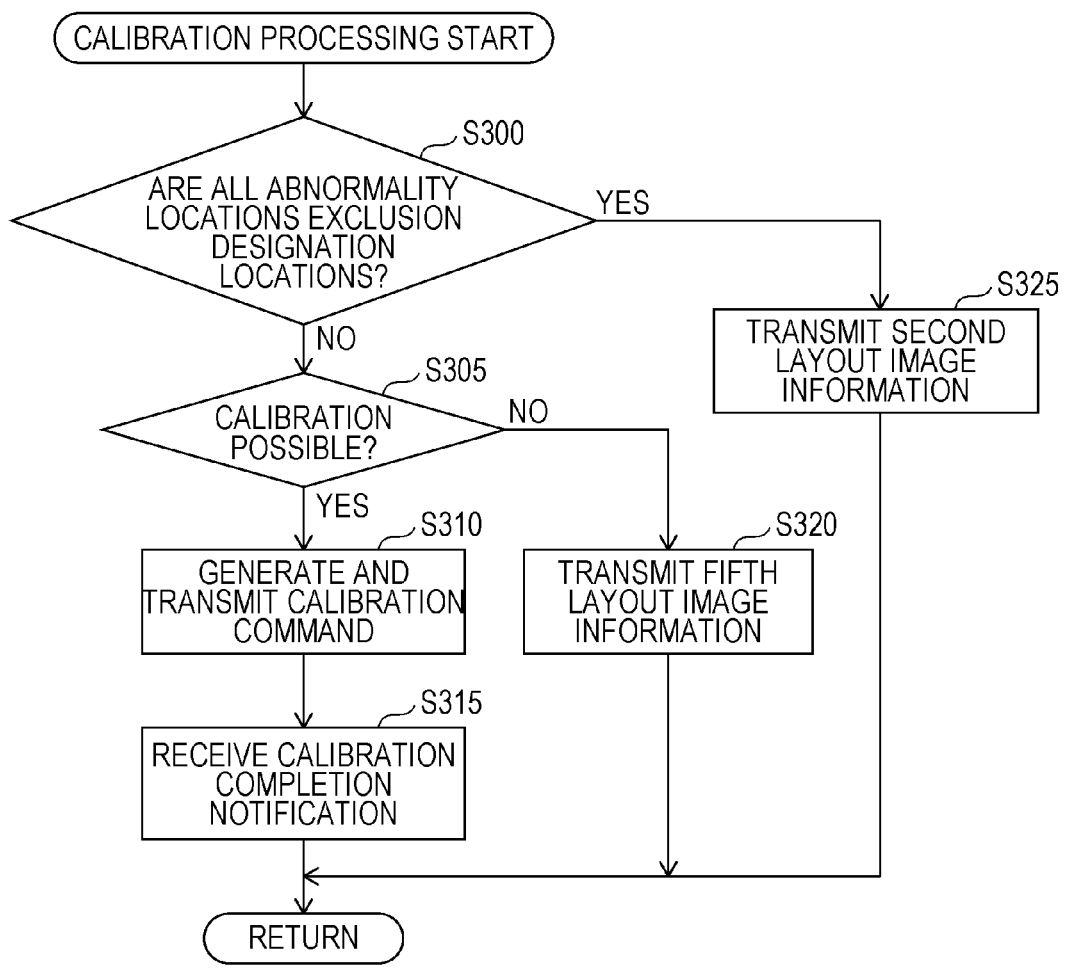
FIG. 31 is a flow diagram depicting calibration processing.

Here, the calibration processing carried out in step S130 depicted in FIG. 29 is described using the flow diagram depicted in FIG. 31.

The calibration processing unit 104 determines whether or not all of the locations where it has been determined that there is an abnormality are included in a range indicated by any of the exclusion designation information of the exclusion designation information group corresponding to the shelving unit identifier of the product shelving unit corresponding to the range measurement sensor that is targeted for calibration (step S300).

If the calibration processing unit 104 makes a negative determination, that is, if it is determined that at least one location where it has been determined that there is an abnormality is not included in a range indicated by any of the exclusion designation information of the exclusion designation information group ("no" in step S300), the calibration processing unit 104 determines whether calibration is possible (step S305).

If the calibration processing unit 104 determines that calibration is possible ("yes" in step S305), the sensor processing unit 106 generates a calibration command corresponding to the locations where it has been determined that there is an abnormality, and transmits the calibration command to the range measurement sensor that is targeted for calibration (step S310). Thereafter, when the calibration processing unit 104 receives a calibration completion notification from the range measurement sensor that is targeted for calibration (step S315), processing ends.

If the calibration processing unit 104 determines that calibration is not possible ("no" in step S305), the UI control unit 108 transmits information (hereinafter, referred to as "fifth layout image information") that includes an error message and an error message superimposition instruction, to the information terminal device 20 via the display command output unit 109 (step S320).

If the calibration processing unit 104 determines that all of the locations where it has been determined that there is an abnormality are included in the range indicated by any of the exclusion designation information of the exclusion designation information group ("yes" in step S300), the UI control unit 108 transmits second layout image information to the information terminal device 20 via the display command output unit 109 (step S325).

(5) Processing Performed by the Information Terminal Device 20

Figure 32:
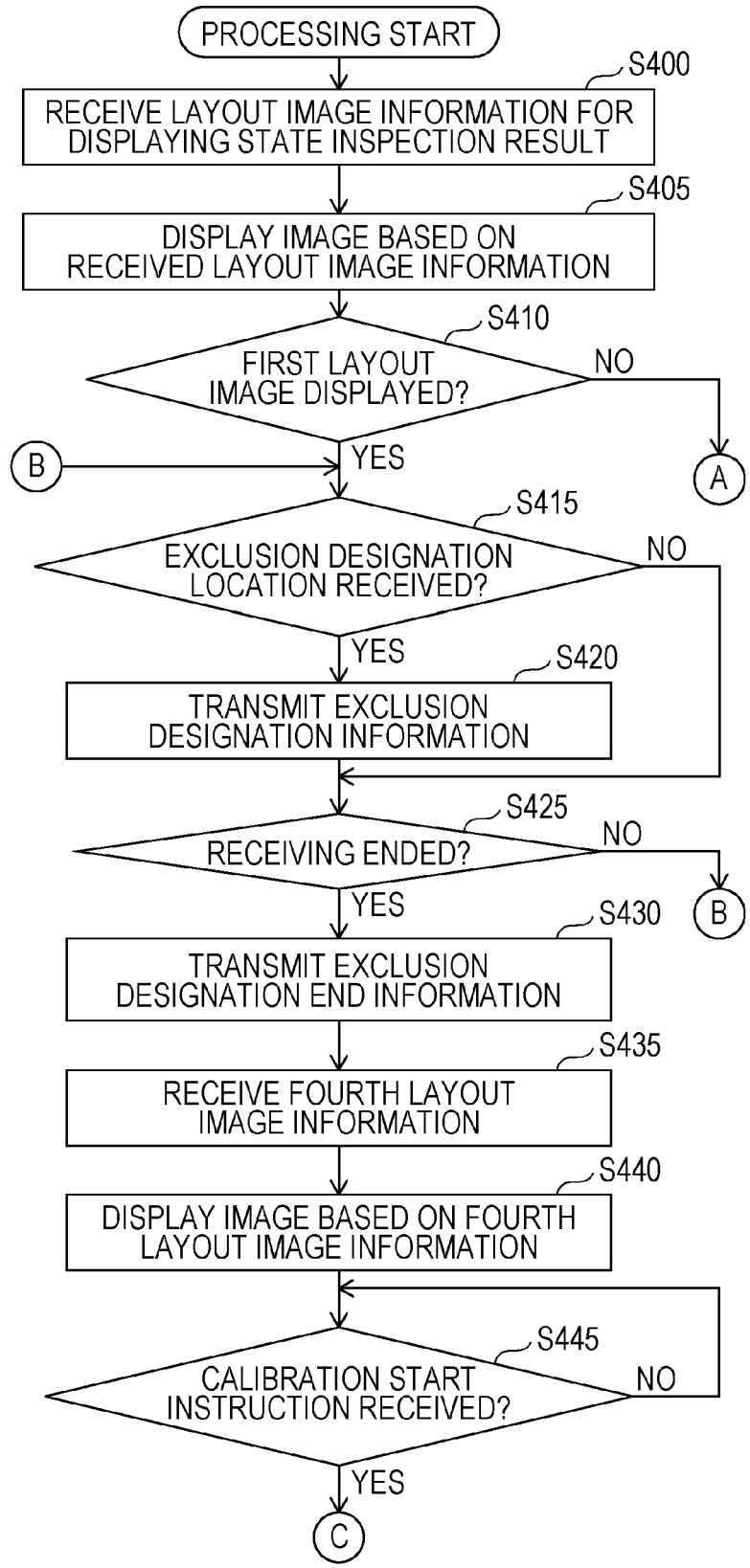
FIG. 32 is a flow diagram depicting processing performed by an information terminal device. Continues to FIG. 33.
Figure 33:
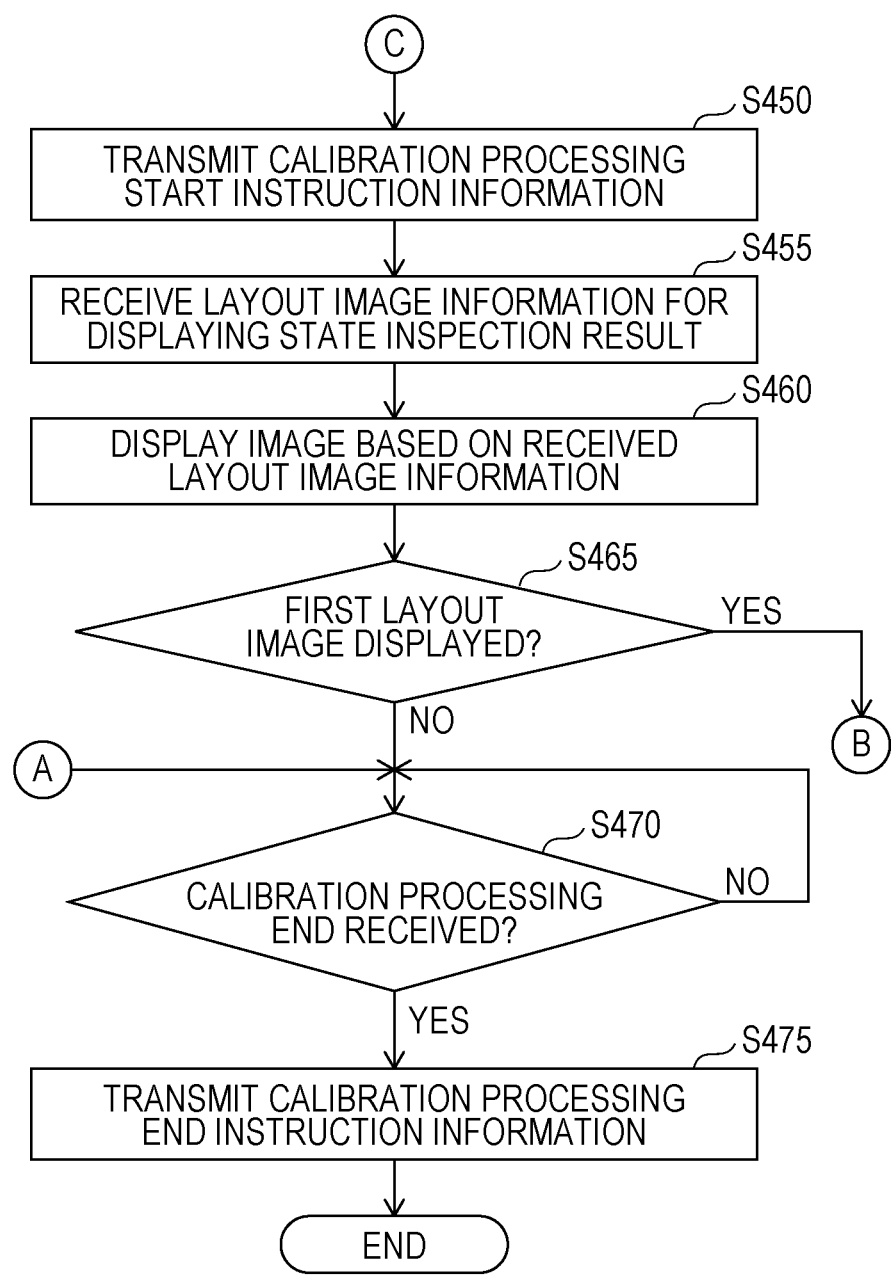
FIG. 33 is a flow diagram depicting processing performed by an information terminal device. Continued from FIG. 32.

Here, the processing carried out by the information terminal device 20 during the calibration mode is described using the flow diagrams depicted in FIGS. 32 and 33.

The display processing unit 222 of the information terminal device 20 receives layout image information corresponding to the result of a state inspection from the sensor management device 10 via the Internet 40 (step S400). Here, the layout image formation received by the information terminal device 20 is any of the layout image information from among the aforementioned first to third layout image information.

Based on the received layout image information, the display processing unit 222 generates a layout image to be displayed, and causes the layout image to be displayed on the LCD 211 (step S405).

The operation receiving unit 221 determines whether or not a first layout image is being displayed (step S410), and if it is determined that a first layout image is being displayed ("yes" in step S410), in addition, the operation receiving unit 221 determines whether or not an exclusion designation location has been received by way of a user operation (step S415).

If it is determined that an exclusion designation location has been received ("yes" in step S415), the operation receiving unit 221 generates exclusion designation information on the basis of the received exclusion designation location, and transmits the generated exclusion designation information to the sensor management device 10 via the transmitting/receiving unit 205 (step S420). The generation of exclusion designation information, for example, is realized by specifying the coordinates of each of a start point and an end point for representing the smallest rectangle that includes an abnormality detection icon that has been pressed.

The operation receiving unit 221 determines whether or not the calibration start button 420 has been pressed, that is, whether or not the receiving of an exclusion designation has ended (step S425).

If it is determined that the receiving of an exclusion designation has ended ("yes" in step S425), the operation receiving unit 221 generates and transmits exclusion designation end information (step S430). Thereafter, the display processing unit 222 receives fourth layout image information from the sensor management device 10 (step S435), and causes an image based on the received fourth layout image information to be displayed on the LCD 211 (step S440). The image based on the fourth layout image information is, for example, the image depicted in FIG. 19 or FIG. 24.

The operation receiving unit 221 determines whether or not a button that instructs the start of calibration processing has been pressed, that is, whether or not a calibration start instruction has been received (step S445).

If it is determined that a calibration start instruction has been received ("yes" in step S445), the operation receiving unit 221 generates calibration processing start instruction information, and transmits the calibration processing start instruction information to the sensor management device 10 via the transmitting/receiving unit 205 (step S450).

Thereafter, the display processing unit 222 receives layout image information corresponding to the result of a state inspection carried out after calibration, from the sensor management device 10 via the Internet 40 (step S455).

Based on the received layout image information, the display processing unit 222 generates a layout image to be displayed, and causes the layout image to be displayed on the LCD 211 (step S460).

The operation receiving unit 221 determines whether or not a first layout image is being displayed (step S465), and if it is determined that a first layout image is not being displayed ("no" in step S465), in addition, the operation receiving unit 221 determines whether or not a button that instructs the end pf calibration processing has been pressed by way of a user operation, that is, whether or not a calibration processing end instruction has been received (step S470).

If it is determined that a calibration processing end instruction has been received ("yes" in step S470), the operation receiving unit 221 generates calibration processing end instruction information, and transmits the calibration processing end instruction information to the sensor management device 10 via the transmitting/receiving unit 205 (step S475).

In the determination step of step S410, if the operation receiving unit 221 determines that a first layout image is not being displayed ("no" in step S410), processing transfers to step S470.

In the determination step of step S425, if the operation receiving unit 221 determines that the receiving of an exclusion designation has not ended ("no" in step S425), processing transfers to step S415.

In the determination step of step S465, if the operation receiving unit 221 determines that a first layout image is being displayed ("yes" in step S465), processing transfers to step S415.

If it is determined that a calibration processing end instruction has not been received ("no" in step S470), the operation receiving unit 221 waits for a calibration processing end instruction to be received.

(6) Processing Performed by Range Measurement Sensor

Figure 34:
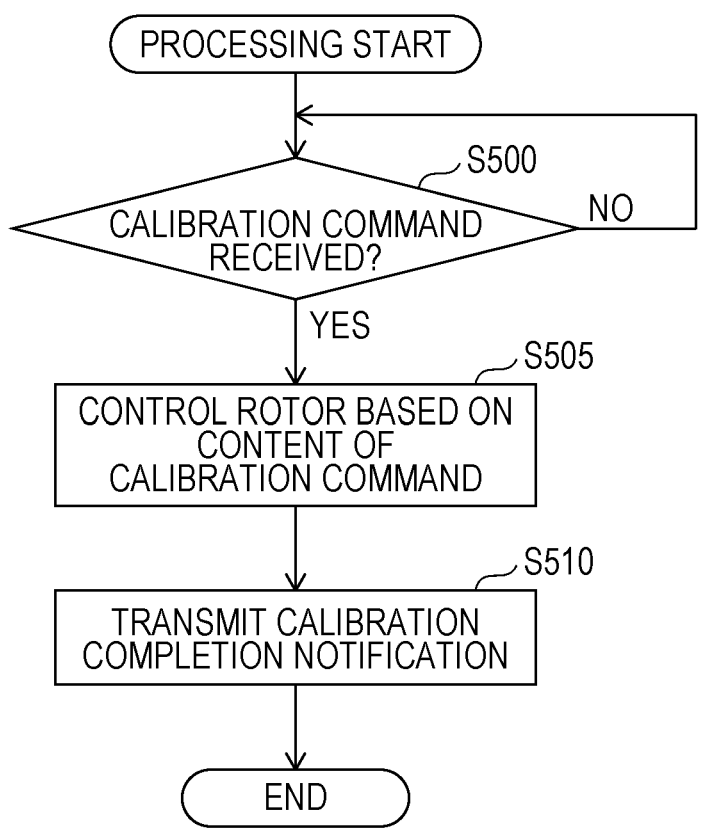
FIG. 34 is a flow diagram depicting processing performed by a range measurement sensor.

Here, the processing carried out by a range measurement sensor during the calibration mode is described using the flow diagram depicted in FIG. 34. Note that, here, the range measurement sensor 31 is described as a calibration target.

The control unit 303 of the range measurement sensor 31 determines whether or not a calibration command has been received from the sensor management device 10 (step S500).

If it is determined that a calibration command has been received ("yes" in step S500), the control unit 303 controls the rotation of the rotor 304 on the basis of calibration content of the received calibration command, and a calibration angle (step S505).

When the calibration is completed, the control unit 303 transmits a calibration completion notification to the sensor management device 10 via the transmitting/receiving unit 305 (step S510).

If it is determined that a calibration command has not been received ("no" in step S500), processing waits for a calibration command to be received.

1.7 Modified Example 1

Heretofore, a description has been given based on an embodiment; however, the present disclosure is not restricted to the aforementioned embodiment. For example, a modified example such as the following is also feasible.

The sensor control system 1 broadly includes a computer system formed from a client computer and a server computer, a cloud network computer system having a form in which applications are loaded in a cloud server, and a computer system in which computers carry out peer-to-peer connection.

Hereinafter, a description is given with respect to the case where the sensor control system 1 is formed by a cloud network computer system.

Here, a description is given with respect to an embodiment in which applications corresponding to each function of the access information acquisition unit 102, the inspection information acquisition unit 103, the calibration processing unit 104, the sensor processing unit 106, the operation information acquisition unit 107, the UI control unit 108, and the display command output unit 109, and applications corresponding to each function of the operation receiving unit 221 and the display processing unit 222 are activated on a cloud network, and services are provided from the cloud network.

FIG. 35A depicts a computer system for implementing sensor control. The computer system is configured from a group of a plurality of devices 1000 (including a home gateway 1100 and devices 1101, 1102, . . . ), a data operation center 3000 (including a cloud server 3001 and a big data storage group 3002), a service provision center 2000 (including a server 2001), and an information terminal device 4001.

The device group 1000 constitutes a network inside a store, is configured from an assembly of devices installed in the store, and includes the home gateway 1100 and the devices 1101, 1102, . . . .

The service provision center 2000 is a point of contact for persons receiving the provision of services by the service provision center, receives access requests in which a URL is designated, and carries out data management data directly linked to the store work of the user. Such data management may include user registration. As user registration, the registration of a user is received from a user when a store is newly opened, and the user for whom the user registration is carried out is managed as a member who uses the computer system. This user registration includes the registration of store information that is targeted for sensor control, and member registration in order for the user to become a member. The service provision center 2000 manages the store information that is registered in this way, and the user registration information that is input in the member registration. The server 2001 is one of the computers that make up this service provision center 2000. The server 2001 is drawn with a dashed line because there are cases where the service provision center 2000 does not possess the server 2001. For example, the server 2001 is not required in cases such as when the cloud server 3001 carries out all of the data management.

The data operation center 3000 is the main entity that carries out work behind the scenes for the service provision center. The data operation center 3000 is not restricted to a company that carries out only data management and the management of the cloud server 3001 and so forth. For example, if the device manufacturer that develops and manufactures the devices 1101 and 1102 also carries out data management and the management of the cloud server 3001 and so forth, the computers of the device manufacturer correspond to the data operation center 3000 (see FIG. 35B). Furthermore, the data operation center 3000 is not restricted to one company. For example, if the device manufacturer and another management company are carrying out data management and the operation of the cloud server 3001 on a joint or shared basis, the computers of both or either one of the device manufacturer and the other management company correspond to the data operation center 3000 (see FIG. 35C). An example of the other management company is a security company or a power company.

The cloud server 3001 is a virtual server that exists within the data operation center 3000 and is able to equally access both an in-house intranet installed in a data center operation company and the outside Internet, and manages big data in cooperation with various devices via the Internet.

The big data storage group 3002 is configured from a plurality of storages in which big data is distributed and stored. The big data in the present embodiment is the store information of each store, and the exclusion designation information and the access information for each product shelving unit of each store.

Next, the flow of information in the aforementioned services is described. First, the devices 1101 and 1102 of the device group generate access information each time a laser light is projected, and accumulate generated access information in the big data storage group 3002 of the data operation center 3000 via the cloud server 3001 (see arrow a1). There are cases where the access information is provided directly to the cloud server 3001 from the plurality of devices 1101 and 1102 themselves via the Internet. Furthermore, there are also cases where the access information is accumulated in the home gateway 1100, and provided to the cloud server 3001 from the home gateway 1100.

Next, the cloud server 3001 of the data operation center 3000 provides the accumulated access information to the service provision center 2000 in fixed units. For the units used in this provision, units with which it is possible for the data center operation company to organize and provide the accumulated information to the service provision center 2000, and units requested by the service provision center 2000 are feasible. Although fixed units have been mentioned, the units do not have to be fixed, and there are cases where the amount of information provided varies according to the situation.

The access information is also saved in the server 2001 of the service provision center 2000 as required, via a storage of the cloud server 3001 (see arrow b1). Then, in the service provision center 2000, the access information is organized into information that conforms with a service to be provided to a user, and is provided to the user. For the users who are the receivers of the organized information, both a user AAA who uses the plurality of devices 1101 and 1102, and an external user ZZZ are assumed. For the method for providing services to the user, provision routes such as those indicated by arrows f1 and e1 also exist.

Furthermore, for the method for providing services to the user, there are also provision routes such as those indicated by arrows c1 and d1, that is, providing services to the user by once again going through the cloud server 3001 of the data operation center 3000. The cloud server 3001 of the data operation center 3000 has a function to organize the access information so as to conform with a service to be provided to a user. There are also cases where information obtained by the organizing function is provided to the service provision center 2000.

Figure 36:
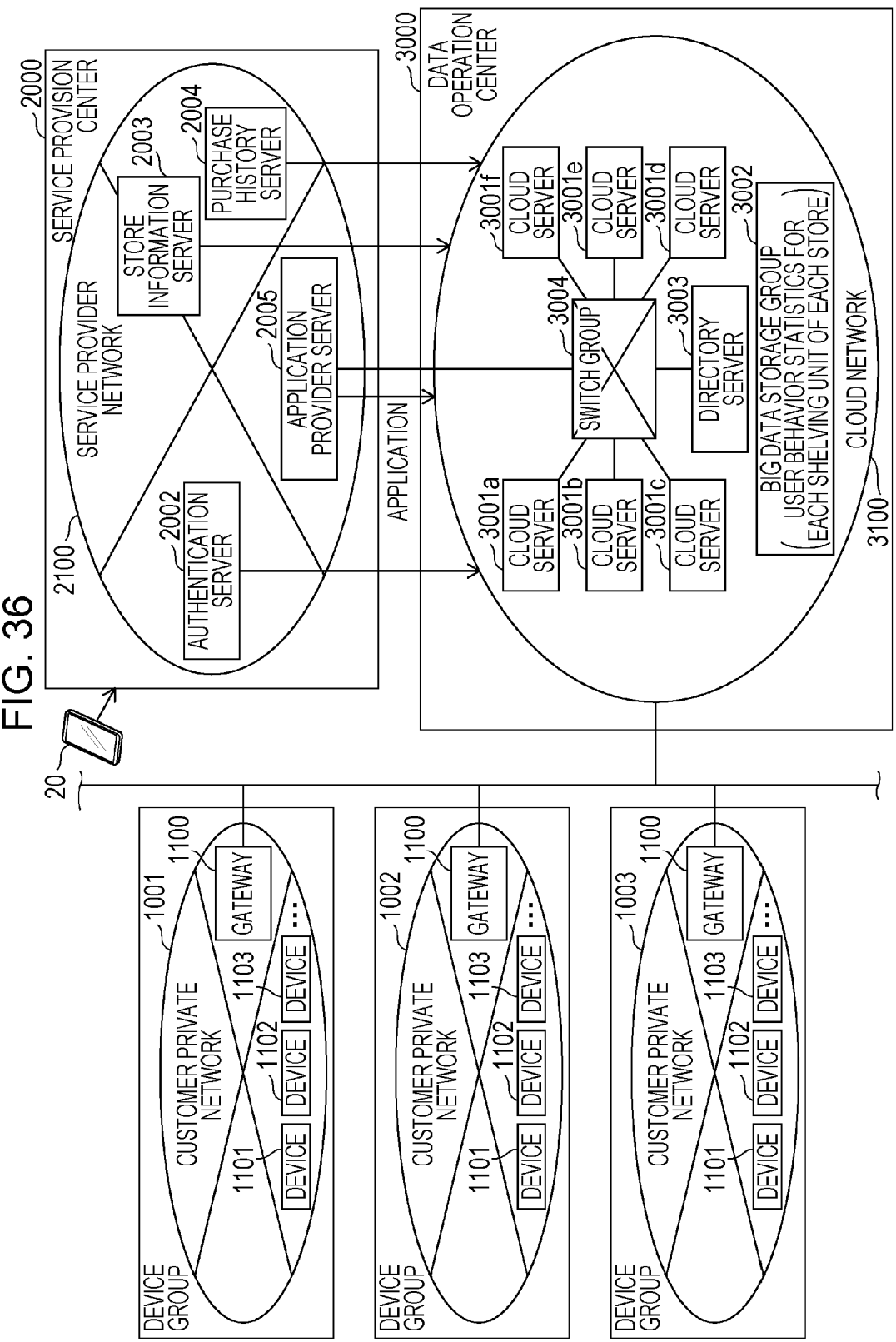
FIG. 36 is a drawing depicting the network configuration of the computer system depicted in FIG. 35A.

FIG. 36 is a drawing depicting the network configuration of the aforementioned computer system. In FIG. 36, customer private networks 1001, 1002, and 1003 are drawn as device groups. Furthermore, in FIG. 36, a cloud network 3100 is drawn as the specific form of the data operation center 3000 depicted in FIG. 35, and a service provider network 2100 is drawn as the specific form of the service provision center 2000.

The customer private networks 1001 to 1003 are private networks that form part of device groups installed in stores. From among these, the customer private network 1001 is configured from a home gateway 1100 and devices 1101, 1102, . . . .

The service provider network 2100 is an intranet in the service provision center, and includes an authentication server 2002 that authenticates user validity when a user login operation is received, a store information server 2003 that manages store information of each store, a purchase history server 2004 that acquires a purchase history from a POS system of each store and manages the purchase histories, and an application provider server 2005 that provides an application required for the provision of a service.

The cloud network 3100 is a virtual local area network (VLAN) that is handled in an integral manner with the service provider network in the data provision center by using integrated Elastic Cloud Computing (iEC2) architecture or the like, and is configured from: cloud servers 3001a, b, c, d, e, and f; a big data storage group 3002; a directory server 3003 that manages the location of an instance in the cloud network, and the location of a switch that connects with a cloud server, in association with the combination of the IP address and the MAC address of a processing request-source node, and the IP address and the MAC address of a processing request-destination node; and a switch group 3004 for interconnecting the cloud servers. The above is a description of the network configuration. Next, the internal configuration of the cloud servers, which form the core of the cloud network, is described.

Figure 37B:
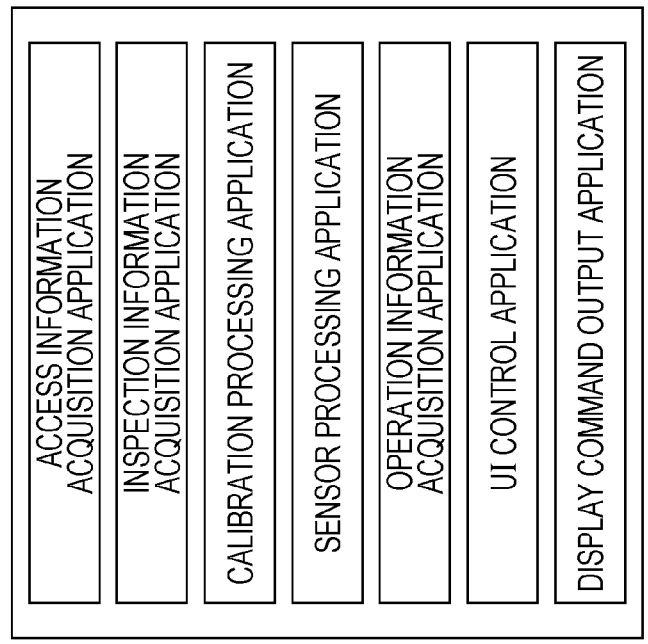
FIG. 37B is a drawing depicting the internal configuration of an application.
Figure 37A:
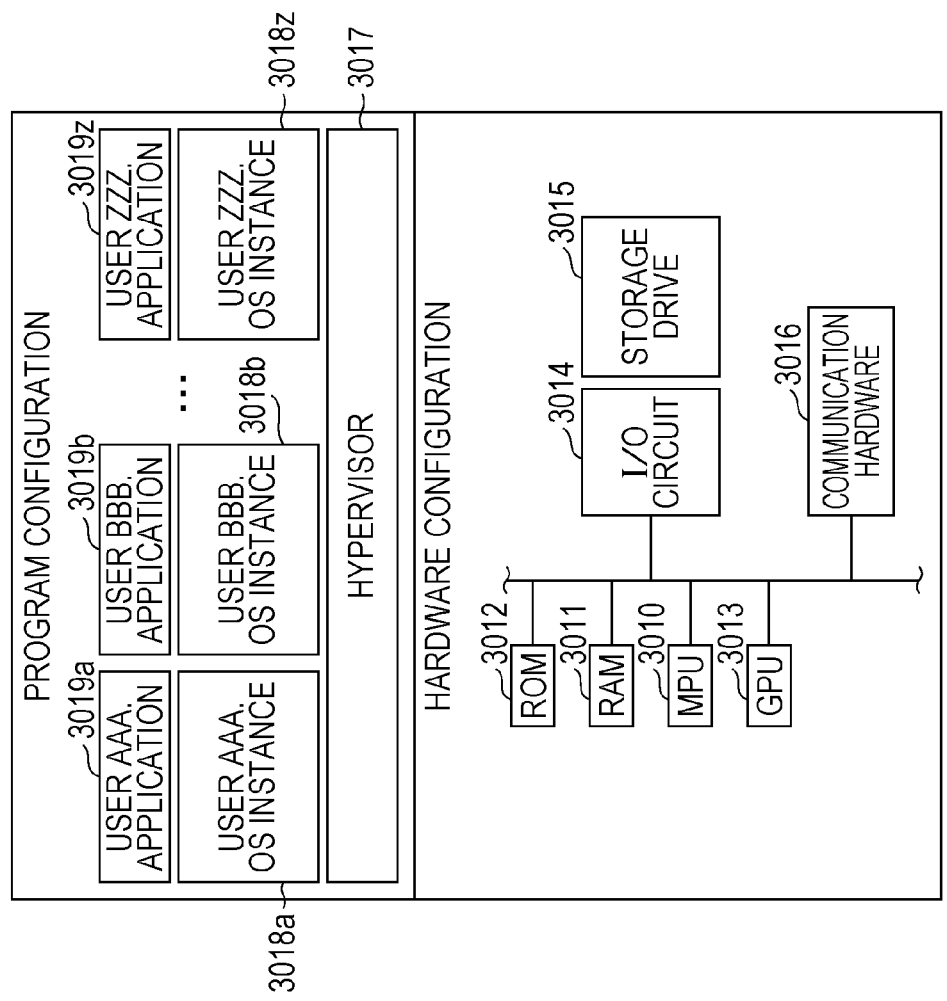
FIG. 37A is a drawing depicting the internal configuration of a cloud server.

FIG. 37A depicts the internal configuration of a cloud server. The hardware configuration of a cloud server includes a microprocessor unit (MPU) 3010, a random-access memory (RAM) 3011, a read-only memory (ROM) 3012, a graphic processor unit (GPU) 3013, an I/O circuit 3014, a storage drive 3015, and communication hardware 3016.

The program configuration of a cloud server includes a hypervisor 3017 that monitors operating systems (OS), generates OS instances in accordance with requests from terminals, and manages the states of the OS instances; OS instances 3018a, b, . . . , and z of each user generated for each logged-in user by the hypervisor 3017 (user AAA.OS instance, user BBB.OS instance, . . . , and user ZZZ.OS instance in FIG. 37A); and applications 3019a, b, . . . , and z that are activated by an OS instance and the states of which are managed (user AAA application, user BBB application, . . . , and user ZZZ application in FIG. 37A).

A user.OS instance is an instance of a library program that carries out processing for middleware. Examples of an instance of a library program are: an instance of a graphic rendering engine that draws a GUI such as a window and a menu in accordance with an API call from an application; an instance of an event module that monitors operations with respect to the GUI and, if there is an operation, outputs an event indicating the content of that operation; an instance of a network file system for acquiring various files from a network drive and a local drive; an instance of a kernel that activates applications and manages the states of the applications; and an instance of a protocol stack that executes various protocols for connecting servers. As described above, it is clear that, in the cloud network, the function of a library program that carries out processing for middleware is provided from the cloud server 3001 not an information terminal device.

FIG. 37B depicts the internal configuration of an application 3019. As depicted in FIG. 37B, each of the applications 3019 includes an access information acquisition application that acquires access information during the normal mode, an inspection information acquisition application that requires access information that is the result of a state inspection during the calibration mode, a calibration processing application that carries out processing in relation to calibrating a range measurement sensor, a sensor processing application that issues a calibration command and carries out processing for the range measurement sensor, an operation information acquisition application that acquires information relating to a user operation, a UI control application that controls a UI, and a display command output application that outputs a display command.

Figure 38:
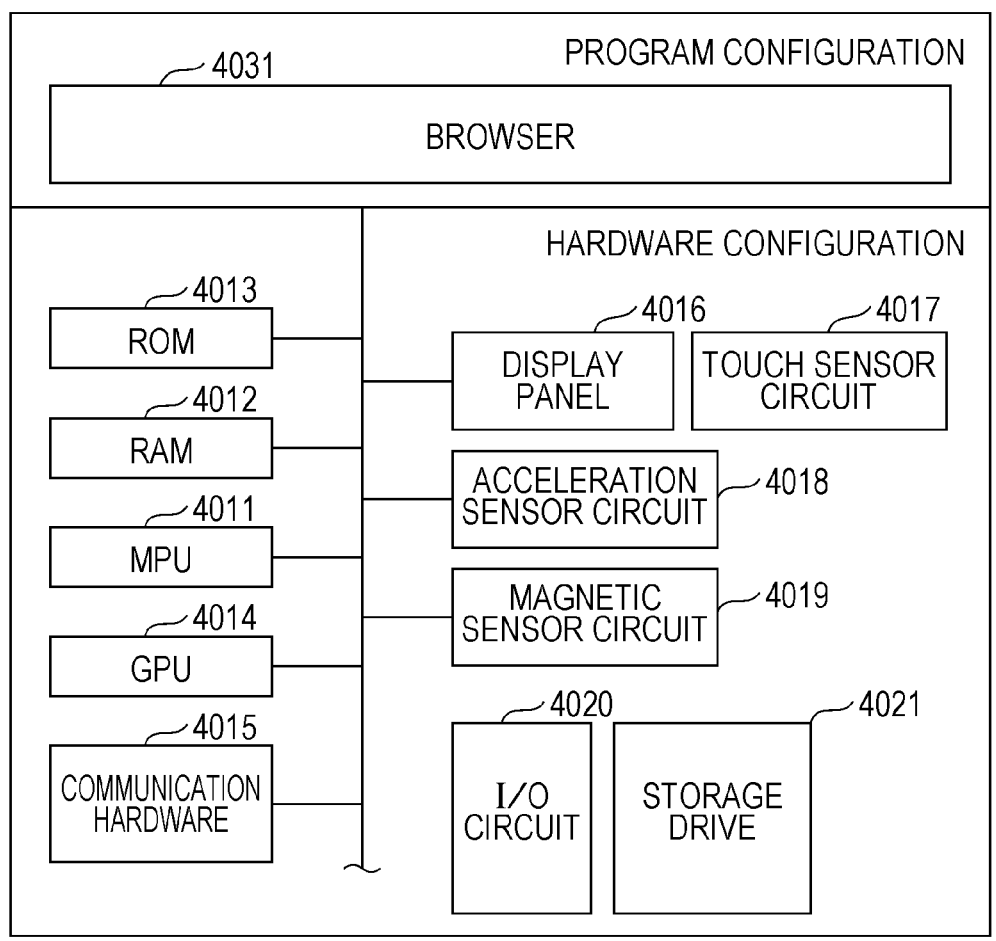
FIG. 38 is a drawing depicting the internal configuration of an information terminal device.

FIG. 38 depicts the hardware configuration of the information terminal device 20. The hardware configuration of the information terminal device includes a microprocessor unit (MPU) 4011, a random-access memory (RAM) 4012, a read-only memory (ROM) 4013, a graphic processor unit (GPU) 4014, communication hardware 4015, a display panel 4016, a touch sensor circuit 4017, an acceleration sensor circuit 4018, a magnetic sensor circuit 4019, an I/O circuit 4020, and a storage drive 4021. Compared with the hardware configuration of the cloud server, the hardware configuration of the information terminal device 20 is different in that the display panel 4016, the touch sensor circuit 4017, the acceleration sensor circuit 4018, and the magnetic sensor circuit 4019 are provided in order to construct an operation environment for the user. In the touch sensor circuit 4017 in the aforementioned hardware configuration, a touch operation by the user is optically or electrically detected. One example of this detection is surface-type electrostatic capacitive detection. A surface-type electrostatic capacitance system has a structure in which a transparent electrode film (conductive layer) is laid on a glass substrate therein, and a protective cover is arranged on the surface. A voltage is applied to electrodes in four corners of the glass substrate and a uniform low-voltage electric field is generated over the entirety of the panel, variation in electrostatic capacitance when a finger touches the surface is measured in the four corners of the panel, and the coordinates of the finger are specified. It is thereby possible to detect the coordinates of a touch operation.

Furthermore, compared with the program configuration of the cloud server, there is a difference in that, in the program configuration of the information terminal device 20, there is no hierarchy acting as an operating system, and there is only a browser program 4031. This browser program realizes the processing performed by the operation receiving unit 221 and the display processing unit 222 of the information terminal device 20. The program configuration of the information terminal device 20 consists of only a browser because it is presumed that all of the applications that carry out processing in relation to the control of range measurement sensors will be loaded into cloud servers. Furthermore, various processing for which applications are utilized are carried out by a user.OS instance at the cloud server side, and it is sufficient as long as the information terminal device 20 inspects the processing result of that user.OS instance. Thus, the browser of the information terminal device 20 transmits a screen creation request event and a screen update request event to an application on the cloud server, and carries out control for when screens corresponding to those requests are received from the application on the cloud server and displayed.

A cloud server that has connected to a server of the service provider network, and has loaded an access information acquisition application, an inspection information acquisition application, a calibration processing application, a sensor processing application, an operation information acquisition application, a UI control application, and a display command output application constitutes the sensor management device 10. FIGS. 39A to D are variations of an application and a user.OS instance being loaded to either the service provision center 2000 or the data operation center 3000. FIGS. 39A to D depict four cloud service models.

FIGS. 39A to D have the following three points in common. Firstly, the applications 3019 and the user.OS instances 3018 exist on a cloud server of the data operation center 3000, secondly, as depicted by arrow 3321, access information is transmitted from the device group 1000 to the data center cloud server 3001, and thirdly, as depicted by arrow 3322, the data center cloud server 3001 provides information to the information terminal device 20.

(Service Model 1: Type where a Company Itself Serves as a Data Center)

FIG. 39A depicts service model 1 (type where a company itself serves as a data center). In this model, the service provision center 2000 acquires information from the device group 1000, and provides a service to a user. In this model, the service provision center 2000 has the functions of a data center operation company. In other words, the service provider possesses the cloud server 3001 that manages big data. Accordingly, there is no data center operation company.

In this model, a data center of the service provision center 2000 operates and manages the cloud server 3001. Furthermore, the service provision center 2000 manages the user.OS instances 3018 and the applications 3019. The service provision center 2000 uses the user.OS instances 3018 and the applications 3019 managed by the service provision center 2000 to provide services 3322 to the user.

(Service Model 2: IaaS-Utilizing Type)

FIG. 39B depicts service model 2 (IaaS-utilizing type). IaaS here is an abbreviation for infrastructure as a service, and is a cloud service provision model in which an infrastructure for constructing and running a computer system is itself provided as a service via the Internet.

In this model, a data operation company operates and manages a data center (this corresponds to the cloud server 3001). Furthermore, the service provision center 2000 manages the user.OS instances 3018 and the applications 3019. The service provision center 2000 uses the user.OS instances 3018 and the applications 3019 managed by the service provision center 2000 to provide services 3322 to the user.

(Service Model 3: PaaS-Utilizing Type)

FIG. 39C depicts service model 3 (PaaS-utilizing type). PaaS here is an abbreviation for platform as a service, and is a cloud service provision model in which a platform that is a foundation for constructing and running software is provided as a service via the Internet.

In this model, the data operation center 3000 operates and manages the user.OS instances 3018, and manages a data center (corresponds to the cloud server 3001). Furthermore, the service provision center 2000 manages the applications 3019. The service provision center 2000 uses the user.OS instances 3018 managed by the data center operation company and the applications 3019 managed by a service provider network 2100 to provide services 3322 to the user.

(Service Model 4: SaaS-Utilizing Type)

FIG. 39D depicts service model 4 (SaaS-utilizing type). SaaS here is an abbreviation for software as a service, and is a cloud service provision model that has a function with which it is possible for, for example, a company/individual (user) that does not possess a data center (cloud server) to use an application provided by a platform provider that does possess a data center (cloud server), via a network such as the Internet.

In this model, the data operation center 3000 manages the applications 3019, manages the user.OS instances 3018, and operates and manages a data center (corresponds to the cloud server 3001). Furthermore, the service provision center 2000 uses the user.OS instances 3018 and the applications 3019 managed by the data operation center 3000 to provide services 3322 to the user.

The main entity for providing services is the service provision center 2000 in all of the aforementioned models. Furthermore, for example, it is possible for the development of an OS, an application, or a database for big data and so forth to be carried out by the service provider or the data center operation company itself, or to be outsourced to a third party.

Next, the communication sequence when the collection of log information and provision are carried out via a cloud server is described.

FIG. 40A is a basic representation of the communication sequence for the cloud server 3001 and the information terminal device 20. In FIG. 40A, a range measurement sensor 1101 that is a device connects to a network (S1501), and transmits a behavior log to the cloud server 3001 for processing 1 to 3 to be carried out in one batch by the cloud server 3001. This processing 1 (step S1503), processing 2 (step S1504), and processing 3 (step S1505) are the plurality of procedures indicated in the aforementioned embodiment extracted and depicted as three items of processing. For example, measurement of the distance to an object using laser light is taken as processing 1, determining whether or not there is an abnormality by using the calibration processing unit 104 is taken as processing 2, and creating a shelving unit layout image to be depicted is taken as processing 3.

Command transmission (step S1506) represents the processing result of these items of processing 1 to 3. In the information terminal device 20, display is carried out in accordance with the transmitted command (step S1507). FIG. 40B is a variation of FIG. 40A, and depicts a sequence in which processing 3 from among processing 1 to 3 carried out by the cloud server 3001 is executed at the information terminal device 20 side. FIG. 40C is yet another variation of FIG. 40A, and depicts a sequence in which processing 2 and 3 from among processing 1 to 3 carried out by the cloud server 3001 are executed at the information terminal device 20 side.

According to the present embodiment as described above, it is possible for sensor control having a high degree of scalability to be realized by loading an access information acquisition application, an inspection information acquisition application, a calibration processing application, a sensor processing application, an operation information acquisition application, a UI control application, and a display command output application in a cloud server, and carrying out processing in which these applications are used, on a cloud network.

Note that it is desirable for a private corporate network, a service provider network, and a cloud network to be each configured by using a packet switching network in the present modified example. In a virtual private network (VPN) constructed using a layer-3 protocol such as multiprotocol label switching (MPLS), it is desirable for the cloud network to be configured by using a virtual stub that is identified by a common VLAN tag. In a customer's private network, it is desirable for a network node that functions as a router or a switch to be capable of layer-3 communication in which MPLS (L3MPLS) is used, and to be capable of layer-2 communication in which Ethernet and virtual private LAN services (VPLS) are used.

Furthermore, it is desirable for an autoscaler to be implemented in the cloud server indicated in the present modified example. An autoscaler carries out performance monitoring, scaling management, and instance management. In performance monitoring, the performance data of a series of user.OS instances are collected, system performance is calculated based on a performance metric calculated based on the collected performance data, and a metric indicating the average number of requests completed each second and the response time and so forth is generated. In scaling management, it is assessed whether or not resources in the cloud network are to be adjusted in response to an elastic request or an inelastic request. In instance management, connection is made to a series of server OS instances via a secure plane connection in the data link layer, and server OS instances generated in the cloud network are managed. In addition, it is desirable for a load distribution device to be implemented in the cloud network of the present modified example. A load distribution device connects to a series of user.OS instances via a secure plane connection in the data link layer, and distributes work between an internal server and/or the series of user.OS instances. This distribution may include methods such as weighted round-robin, shortest connection, and fastest processing.

In the present modified example, the cumulative visit time, the number of times customers extend a hand toward a product, the number of times customers stop in front of a product, and the number of purchases that are accumulated daily for each product shelving unit in a large number of stores under the umbrella of a franchise chain are managed, and consequently the amount of data therefor becomes very large. However, the aforementioned autoscaler and load distribution device vary the number of generated user.OS instances in accordance with the requests from the information terminal device 20, and therefore, even when the cumulative visit time, the number of times customers extend a hand toward a product, the number of times customers stop in front of a product, and the number of purchases that are accumulated daily from a large number of stores come to a very large amount of data, it is possible to respond to information provision requests from the information terminal device 20 in a prompt manner.

1.8 Other Modified Examples

Heretofore, a description has been given based on embodiment 1 and modified example 1; however, the present disclosure is not restricted to the aforementioned embodiment 1 and modified example 1. For example, modified examples such as the following are also feasible.

(1) In the aforementioned embodiment, in the case where the installation state of a range measurement sensor is to be calibrated, a rotor is made to rotate in the horizontal direction; however, the present disclosure is not restricted to this.

In the case where the installation state of the range measurement sensor is to be calibrated, the elevation angle direction may be changed, that is, the rotor may be made to rotate vertically.

Furthermore, both the azimuth angle and the elevation angle may be changed.

(2) In the aforementioned embodiment, the range measurement sensor is installed on the ceiling of a store; however, the present disclosure is not restricted to this.

It is sufficient as long as the range measurement sensor is installed in a location where it is possible to detect whether or not a product shelving unit has been accessed.

(3) In the aforementioned embodiment, a range measurement sensor is used to detect access to a product shelving unit; however, the present disclosure is not restricted to this. A scanning-type light-wave range finder that is able to output data regarding the physical shape of a space is sufficient to detect access to a product shelving unit.

(4) In the aforementioned embodiment, exclusion designation information is formed from the combination of the coordinates of a start point and the coordinates of an end point representing a rectangle; however, the present disclosure is not restricted to this.

It is sufficient as long as the exclusion designation information is information that indicates the position of a product storage column of a shelf.

For example, an identifier that indicates the position of a product storage column may be allocated in advance to each product storage column, and the exclusion designation information may be an identifier that is allocated to a product storage column to be excluded.

(5) In the aforementioned embodiment, a tablet-type personal computer is given as an example of an information terminal device; however, the present disclosure is not restricted to this.

It is sufficient as long as the information terminal device is a portable personal computer. Alternatively, the information terminal device may be a notebook personal computer or a desktop personal computer.

(6) The aforementioned embodiment and the modified examples may be combined.

1.9 Supplement (1) A control method used in a computer system including a sensor that detects the presence of an object in a predetermined sensing range in a store, and a terminal device, the control method comprising: controlling the sensor to emit a laser, along an aisle between product shelving units installed in the store and to scan the laser reflected from the aisle; determining that there is the object in the sensing range if the emitted laser is reflected from a position in an optical path of the emitted laser leading from the sensor to the aisle, a first distance from the sensor to the position being shorter than a second distance from the sensor to the aisle; and notifying a first inspection result, which is the determination that there is the object, to a user, wherein the first inspection result is notified to the user by a site corresponding to the position where the emitted laser is reflected, the site being marked in a layout image representing the product shelving units, displayed on the terminal device.

According to the present disclosure, if it is determined that there is an abnormality in the sensing range, the location where that abnormality exists is reported to the user by displaying a mark at the site corresponding to the reflected position, from among the plurality of arrangement locations depicted in the layout image, and it is therefore possible for the user to easily determine in which arrangement position the abnormality has occurred in the layout image. For example, if the installation position of a product shelving unit has deviated, the laser emitted from the sensor hits the product shelving unit before reaching the aisle. If a position reflected midway in the optical path constitutes only part of the product shelving unit, it may be determined that restoration by adjusting the azimuth angle/elevation angle of the sensor is possible, and if the position reflected midway in the optical path extends across the entirety of the product shelving unit in the horizontal direction, it may be determined that restoration by adjusting the azimuth angle/elevation angle of the sensor is not possible. Thus, the user does not have to carry out unnecessary restoration attempts.

(2) In the aforementioned aspect, the phase difference between the emitted laser and the reflected laser may be used to measure the first distance, and it may be determined that there is the object in the sensing range if the measured first distance is shorter than the second distance.

According to the aforementioned aspect, it is possible to determine that there is an abnormality if the distance measured by the sensor is shorter than the distance from the sensor to the aisle. Ordinarily, when there are no customers, the laser emitted from a sensor reaches the aisle. However, if an object that obstructs access detection is present in the optical path, the laser does not reach the aisle. Therefore, by using the measured distance, it is possible to easily specify whether or not there is an abnormality midway in the optical path leading from the sensor to the aisle.

(3) In the aforementioned aspect, the sensor may include a light-projecting element and a mirror that reflects a laser emitted by the light-projecting element, the laser may be scanned due to the mirror rotating, and the corresponding site may be specified based on the measured first distance and a predetermined angle included in an angle by which the mirror rotates when the first distance is measured.

According to the aforementioned aspect, it is possible to specify a location where it has been determined that there is an abnormality, from the distance measured by the sensor and the predetermined angle. By notifying the specified location to the user, it is possible for the user to be aware of a location where there is an abnormality, and it is possible for a prompt response to be carried out.

(4) In the aforementioned aspect, first coordinate values of the corresponding site are expressed using a first coordinate system which uses a height direction and a width direction of the product shelving units represented in the layout image as reference axes, and second coordinate values of the position where the laser is reflected are expressed using a second coordinate system which uses the installed position of the sensor as a reference point and obtains the second coordinate values of the position based on the predetermined angle and the measured first distance from the reference point, the second coordinate values in the second coordinate system is converted into the first coordinate values in the first coordinate system.

According to the aforementioned aspect, it is possible to easily specify in which position of the layout image marking is to be carried out, by converting coordinate values of the second coordinate system expressed by using the measured distance and the predetermined angle, into coordinate values of the first coordinate system. Thus, locations where there is an abnormality specified in the layout image are marked and displayed, and it is therefore possible for the user to be visually aware of in which locations there are abnormalities.

(5) In the aforementioned aspect, each of the product shelving units represented by the layout image representing includes a plurality of product storage columns, the plurality of product storage columns being arranged side-by-side in a horizontal direction, and the corresponding site is marked by combining a predetermined graphic with an image corresponding to a range containing the position where the laser is reflected in the layout image.

According to the present aspect, the user is notified regarding in which locations corresponding to the product storage columns there are abnormalities, and it is therefore possible for the user to easily be aware of in which product storage columns of which product shelves of a product shelving unit there are abnormalities.

(6) In the aforementioned aspect, the method further comprising controlling the sensor to calibrate at least either an azimuth angle or an elevation angle of a range in which the reflected laser is scanned if it is determined that there is the object in the sensing range, and notifying a second inspection result, which it is determined that there is the object, to the user if it is re-determined that there is the object in the sensing range, when the reflected laser is rescanned after either the azimuth angle or the elevation angle is calibrated.

According to the aforementioned aspect, by scanning a laser once again after the orientation of the sensor has been calibrated, it is possible to determine whether or not the abnormality has been resolved. If the abnormality has not been resolved, it is possible to attempt to resolve the abnormality by calibrating the orientation of the sensor once again.

(7) In the aforementioned aspect, the method further comprising receiving from the terminal device exclusion designation information for designating the site corresponding to a position where whether or not there is the object is not to be determined when the first inspection result is being reported to the user, and determining that there is no the object in the range rescanned by the laser when the exclusion designation information is received, and the position where the rescanned laser is reflected corresponds to the site designated by the exclusion designation information, even if the rescanned laser is reflected before reaching the aisle.

According to the present aspect, it is possible to distinguish between whether there is an abnormality in a location at which a laser has been reflected midway in the optical path leading from the sensor to the aisle, or whether exclusion designation has been carried out, that is, it has been deemed that there is no abnormality.

(8) In the aforementioned aspect, the terminal device may have a touch panel, and the exclusion designation information may be transmitted to the computer system by a mark displayed in the layout image being pressed at the terminal device.

According to the present aspect, with the touch panel, it is possible for the user to visually carry out exclusion designation.

(9) In the aforementioned aspect, the method further comprising notifying to the user that at least either the azimuth angle or the elevation angle is to be calibrated when the emitted laser is reflected from a plurality of positions in a predetermined range included in the sensing range, and notifying to the user that neither the azimuth angle nor the elevation angle is to be calibrated when the emitted laser is reflected from the plurality of positions in a wider range than the predetermined range included in the sensing range.

According to the aforementioned aspect, it is possible to determine whether or not the orientation is to be calibrated, from the positional relationship of the plurality of positions where the laser has been reflected.

(10) In the aforementioned aspect, the method further comprising determining a direction of at least either the azimuth angle or the elevation angle, in accordance with the plurality of positions, and calibrating at least either the azimuth angle or the elevation angle to the determined direction.

According to the aforementioned aspect, because the direction of the azimuth angle or the elevation angle to be calibrated is determined in accordance with the positions where the laser has been reflected, it is possible to shorten the time relating to resolving abnormalities, compared to when the orientation is calibrated in a rash manner.

(11) In the aforementioned aspect, the terminal device may have a touch panel, and the layout image may include a button that receives an instruction for calibrating at least either the azimuth angle or the elevation angle, and at least either the azimuth angle or the elevation angle may be calibrated when it is detected that the button is touched.

According to the present aspect, with the touch panel, it is possible for the user to visually perform an instruction for calibrating the orientation.

(12) In the aforementioned aspect, the method further comprising detecting whether or not a customer is accessing one of the product shelving units, when it is determined that there is no object in the sensing range, notifying to the user information prompting the laser to be scanned in the sensing range when it is detected that the customer is accessing the one of the product shelving units in a predetermined range included in the sensing range and controlling the sensor to scan the laser in the sensing range if the user instructs that the laser is to be scanned in the sensing range.

According to the aforementioned aspect, when it is detected that a customer is accessing a product shelving unit included in the sensing range, the user is notified so as to scan the laser, and therefore the user is able to immediately investigate whether or not there is an abnormality in the sensing range of the laser.

(13) In the aforementioned aspect, the method further comprising transmitting to the terminal device a control command for marking an additional site corresponding to a region from the reflected position to the aisle in the optical path.

The present disclosure is effective in a system in which a sensor is used to detect access to a product shelving unit by a customer.

What is claimed is:
1. A control method used in a computer system including a sensor that detects the presence of an object in a predetermined sensing range in a store, and a terminal device, the control method comprising:
controlling the sensor to emit a laser, along an aisle between product shelving units installed in the store and to scan the laser reflected from the aisle;
determining that the object is in the sensing range if the emitted laser is reflected from a position in an optical path of the emitted laser leading from the sensor to the aisle, and when a first distance from the sensor to the position is shorter than a second distance from the sensor to the aisle; and
notifying a first inspection result, which is the determination that the object is in the sensing range, to a user, wherein the first inspection result is notified to the user by a site corresponding to the position where the emitted laser is reflected, the site being marked in a layout image representing the product shelving units, displayed on the terminal device,
controlling the sensor to calibrate at least one of an azimuth angle and an elevation angle of a range in which the reflected laser is scanned when it is determined that the object is in the sensing range, and
notifying a second inspection result, to the user, when the object is determined to be in the sensing range, if it is re-determined that the object is in the sensing range, when the reflected laser is rescanned after either the azimuth angle or the elevation angle has been calibrated,
receiving, from the terminal device, exclusion designation information for designating the site corresponding to a position where, whether or not the object is sensed is not to be determined when the first inspection result is notified to the user, and
determining that the object is not in the sensing range rescanned by the laser when the exclusion designation information is received, and the position where the rescanned laser is reflected corresponds to the site designated by the exclusion designation information, even if the rescanned laser is reflected before reaching the aisle.
2. The control method according to claim 1, wherein
a phase difference between the emitted laser and a reflected laser is used to measure the first distance, and it is determined that the object is in the sensing range when the measured first distance is shorter than the second distance from the sensor to the aisle.

3. The control method according to claim 2, wherein
the sensor includes a light-projector and a mirror that reflects a laser emitted by the light-projector,
the laser is scanned due to the mirror rotating, and
the corresponding site is specified based on the measured first distance and a predetermined angle included in an angle by which the mirror rotates when the first distance is measured.

4. The control method according to claim 3, wherein
first coordinate values of the corresponding site are expressed using a first coordinate system which uses a height direction and a width direction of the product shelving units represented in the layout image as reference axes, and
second coordinate values of the position where the laser is reflected are expressed using a second coordinate system which uses the installed position of the sensor as a reference point and obtains the second coordinate values of the position based on the predetermined angle and the measured first distance from the reference point, and the second coordinate values in the second coordinate system are converted into the first coordinate values in the first coordinate system.

5. The control method according to claim 1, wherein
each of the product shelving units represented by the layout image includes a plurality of product storage columns, the plurality of product storage columns being arranged side-by-side in a horizontal direction, and
the corresponding site is marked by combining a predetermined graphic with an image corresponding to a range containing the position where the laser is reflected in the layout image.

6. The control method according to claim 1, wherein
the terminal device has a touch panel, and
the exclusion designation information is transmitted to the computer system by a mark displayed in the layout image being pressed at the terminal device.

7. The control method according to claim 1, further comprising
notifying the user that at least one of the azimuth angle and the elevation angle is to be calibrated when the emitted laser is reflected from a plurality of positions in a predetermined range included in the sensing range, and
notifying the user that neither the azimuth angle nor the elevation angle is to be calibrated when the emitted laser is reflected from the plurality of positions in a wider range than the predetermined range included in the sensing range.

8. The control method according to claim 7, further comprising
determining a direction of at least one of the azimuth angle and the elevation angle, in accordance with the plurality of positions, and
calibrating at least one of the azimuth angle and the elevation angle to the determined direction.

9. The control method according to claim 1, wherein
the terminal device has a touch panel,
the layout image includes a button that receives an instruction for calibrating at least one of the azimuth angle and the elevation angle, and
at least one of the azimuth angle and the elevation angle is calibrated when a touch of the button is detected.

10. The control method according to claim 1, further comprising
detecting whether or not a customer is accessing one of the product shelving units, when it is determined that there is no object in the sensing range,
notifying the user, information prompting the laser to be scanned in the sensing range when it is detected that the customer is accessing the one of the product shelving units in a predetermined range included in the sensing range, and
controlling the sensor to scan the laser in the sensing range if the user instructs the laser to be scanned in the sensing range.

11. The control method according to claim 1, further comprising
transmitting, to the terminal device, a control command for marking an additional site corresponding to a region from the reflected position to the aisle in the optical path.

12. A control system comprising:
a sensor that detects the presence of an object in a predetermined sensing range in a store;
a server; and
a terminal device,
wherein the sensor scans a laser along an aisle between product shelving units installed in the store,
the server determines that the object is in the sensing range when the emitted laser is reflected from a position in an optical path of the emitted laser leading from the sensor to the aisle, and when a first distance from the sensor to the position is shorter than a second distance from the sensor to the aisle, and
the terminal device displays a layout image representing the product shelving units, and marks, in the layout image, a site corresponding to the position where the emitted laser has been reflected to notify, a user of a first inspection result, which is the determination that the object is in the sensing range,
the sensor being configured to calibrate at least one of an azimuth angle and an elevation angle of a range in which the reflected laser is scanned when it is determined that the object is in the sensing range, and
the terminal device notifies a second inspection result, to the user, when the object is determined to be in the sensing range, if it is re-determined that the object is in the sensing range, when the reflected laser is rescanned after either the azimuth angle or the elevation angle has been calibrated,
the terminal device transmits exclusion designation information for designating the site corresponding to a position where, whether or not the object is sensed is not to be determined when the first inspection result is notified to the user, and
the terminal device determines that the object is not in the sensing range rescanned by the laser when the exclusion designation information is received, and the position where the rescanned laser is reflected corresponds to the site designated by the exclusion designation information, even if the rescanned laser is reflected before reaching the aisle.

13. The control system according to claim 12, wherein
a phase difference between the emitted laser and a reflected laser is used to measure the first distance, and
the sensor determines that the object is in the sensing range when the measured first distance is shorter than the second distance from the sensor to the aisle.

14. The control system according to claim 13, wherein
the sensor includes a light-projector and a mirror that reflects a laser emitted by the light-projector,
the laser is scanned due to the mirror rotating, and
the corresponding site is specified based on the measured first distance and a predetermined angle included in an angle by which the mirror rotates when the first distance is measured.

15. The control system according to claim 14, wherein
first coordinate values of the corresponding site are expressed using a first coordinate system which uses a height direction and a width direction of the product shelving units represented in the layout image as reference axes, and
second coordinate values of the position where the laser is reflected are expressed using a second coordinate system which uses the installed position of the sensor as a reference point and obtains the second coordinate values of the position based on the predetermined angle and the measured first distance from the reference point, and the second coordinate values in the second coordinate system are converted into the first coordinate values in the first coordinate system.

16. The control system according to claim 12, wherein
each of the product shelving units represented by the layout image includes a plurality of product storage columns, the plurality of product storage columns being arranged side-by-side in a horizontal direction, and
the corresponding site is marked by combining a predetermined graphic with an image corresponding to a range containing the position where the laser is reflected in the layout image.

17. The control system according to claim 12, wherein
the terminal device has a touch panel, and
the exclusion designation information is transmitted to the server by a mark displayed in the layout image being pressed at the terminal device.

18. The control system according to claim 12, wherein
the terminal device has a touch panel,
the layout image includes a button that receives an instruction for calibrating at least one of the azimuth angle and the elevation angle, and
at least one of the azimuth angle and the elevation angle is calibrated when a touch of the button is detected.

19. The control system according to claim 12, further comprising
the terminal device notifies the user that at least one of the azimuth angle and the elevation angle is to be calibrated when the emitted laser is reflected from a plurality of positions in a predetermined range included in the sensing range, and
the terminal device notifies the user that neither the azimuth angle nor the elevation angle is to be calibrated when the emitted laser is reflected from the plurality of positions in a wider range than the predetermined range included in the sensing range.

20. The control system according to claim 19, further comprising
the sensor determines a direction of at least one of the azimuth angle and the elevation angle, in accordance with the plurality of positions, and
the sensor calibrates at least one of the azimuth angle and the elevation angle to the determined direction.

* * * * *